United States Patent
Uehara et al.

(10) Patent No.: US 7,050,020 B2
(45) Date of Patent: May 23, 2006

(54) 3D IMAGE/2D IMAGE SWITCHING DISPLAY APPARATUS AND PORTABLE TERMINAL DEVICE

(75) Inventors: Shin-ichi Uehara, Tokyo (JP); Nobuaki Takanashi, Tokyo (JP); Hiroshi Hayama, Tokyo (JP)

(73) Assignee: NEC Corporation, Tokyo (JP)

( * ) Notice: Subject to any disclaimer, the term of this patent is extended or adjusted under 35 U.S.C. 154(b) by 431 days.

(21) Appl. No.: 10/646,799

(22) Filed: Aug. 25, 2003

(65) Prior Publication Data

US 2004/0041747 A1 Mar. 4, 2004

(30) Foreign Application Priority Data

Aug. 27, 2002 (JP) ............................. 2002-247208

(51) Int. Cl.
*G09G 5/00* (2006.01)
(52) U.S. Cl. .............................. 345/6; 348/54; 359/464
(58) Field of Classification Search .................... 345/4, 345/6; 348/51, 54; 359/462, 464
See application file for complete search history.

(56) References Cited

U.S. PATENT DOCUMENTS

| 5,500,765 | A | 3/1996 | Eichenlaub |
| 5,825,541 | A | 10/1998 | Imai |
| 5,982,342 | A | 11/1999 | Iwata et al. |
| 6,005,645 | A * | 12/1999 | Hirakata et al. ............... 349/15 |
| 6,049,424 | A * | 4/2000 | Hamagishi ................... 359/464 |
| 6,157,242 | A | 12/2000 | Fukui |
| 2003/0067539 | A1* | 4/2003 | Doerfel et al. ................ 348/51 |
| 2004/0240777 | A1* | 12/2004 | Woodgate et al. ............ 385/16 |

FOREIGN PATENT DOCUMENTS

| EP | 0 829 744 A2 | 3/1998 |
| JP | 4-112273 | 4/1992 |
| JP | 8-68961 | 3/1996 |
| JP | 9-197343 | 7/1997 |
| JP | 2001-258051 | 9/2001 |

OTHER PUBLICATIONS

Patent Abstracts of Japan, vol. 2000, No. 26, Jul. 1, 2002, JP 2001 258051 A.

* cited by examiner

*Primary Examiner*—Ricardo Osorio
(74) *Attorney, Agent, or Firm*—Young & Thompson

(57) ABSTRACT

A 3D image/2D image switching display apparatus is provided with a liquid crystal display unit and first and second lenticular lenses. To display a 3D image, the first lenticular lens is arranged in such a way that the optical axis of the first lenticular lens coincides with the optical axis of the second lenticular lens so that pixels for a left eye display an image for a left eye and pixels for a right eye display an image for a right eye. To display a 2D image, the first lenticular lens is arranged in such a way that the optical axis of the first lenticular lens is shifted from the optical axis of the second lenticular lens by half a lens pitch so that the pixels for the left eye and the pixels for the right eye display the same image independently.

35 Claims, 37 Drawing Sheets

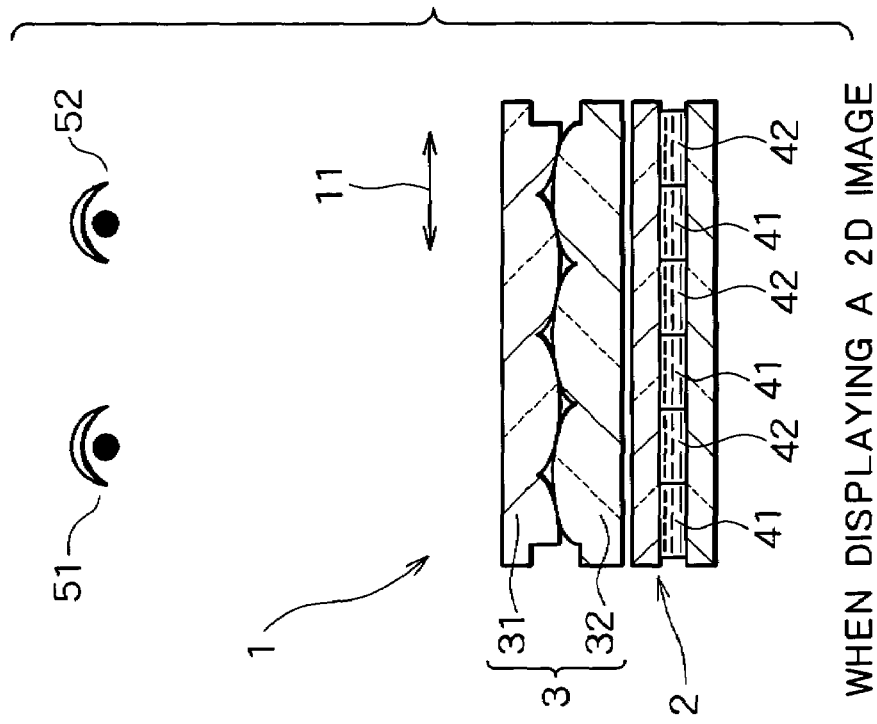
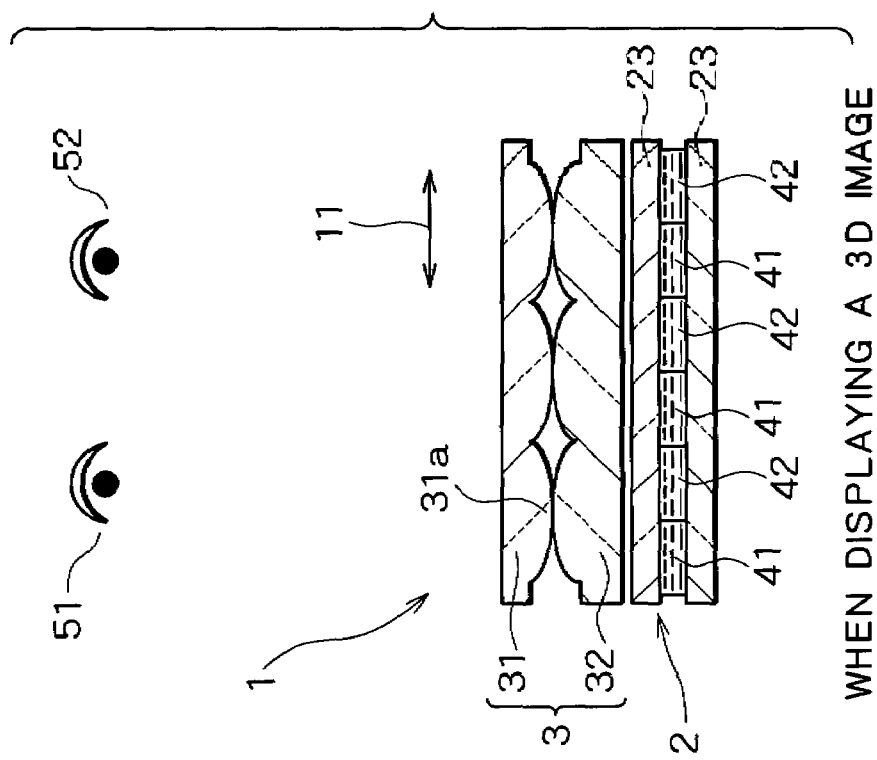

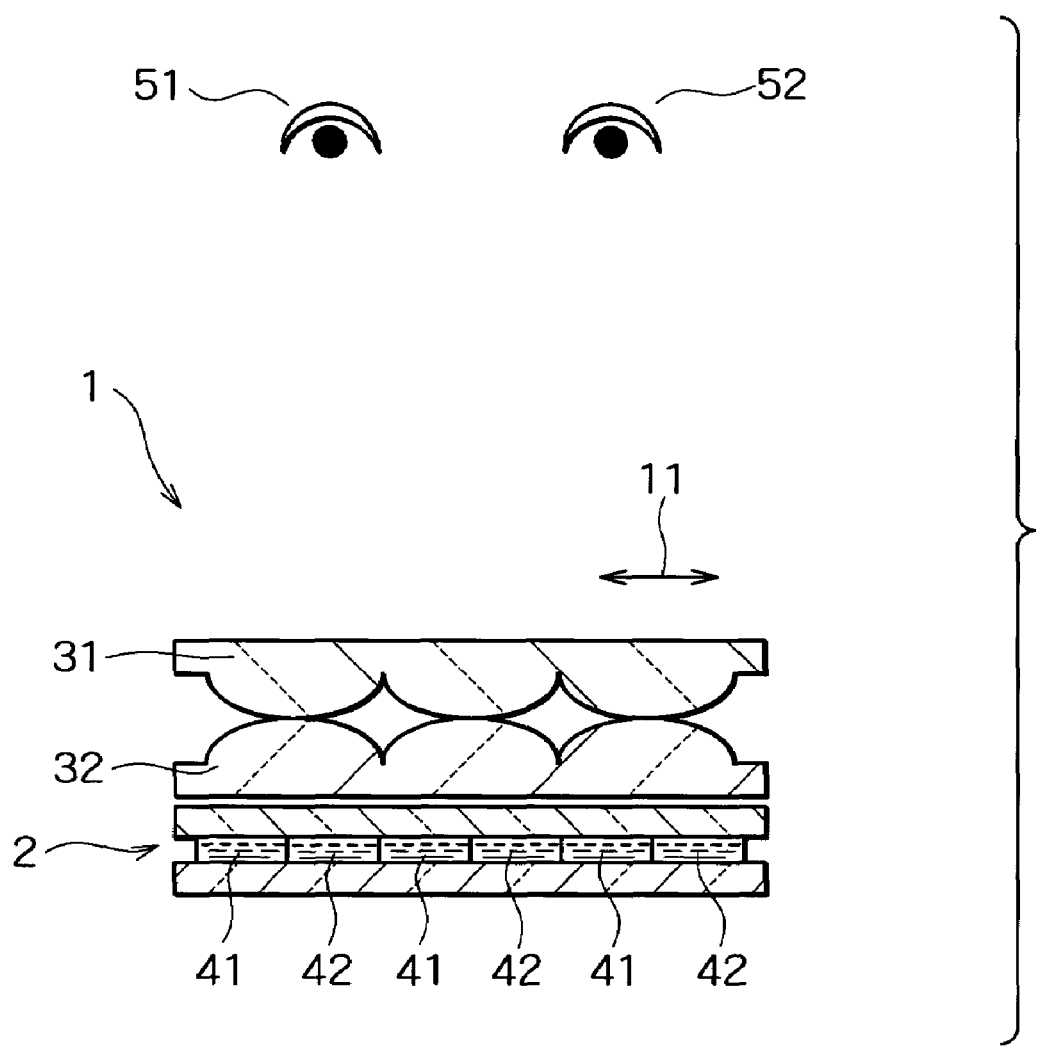

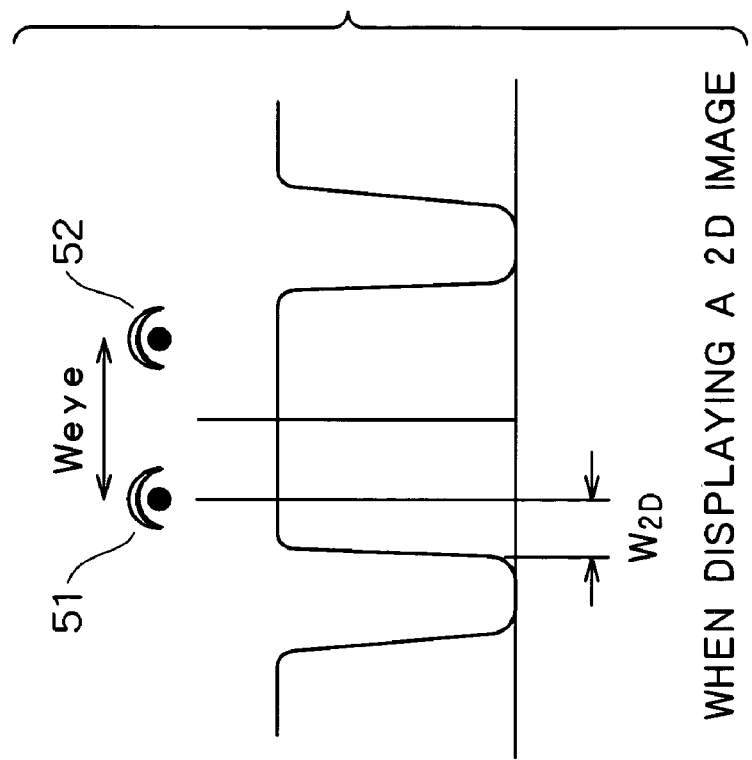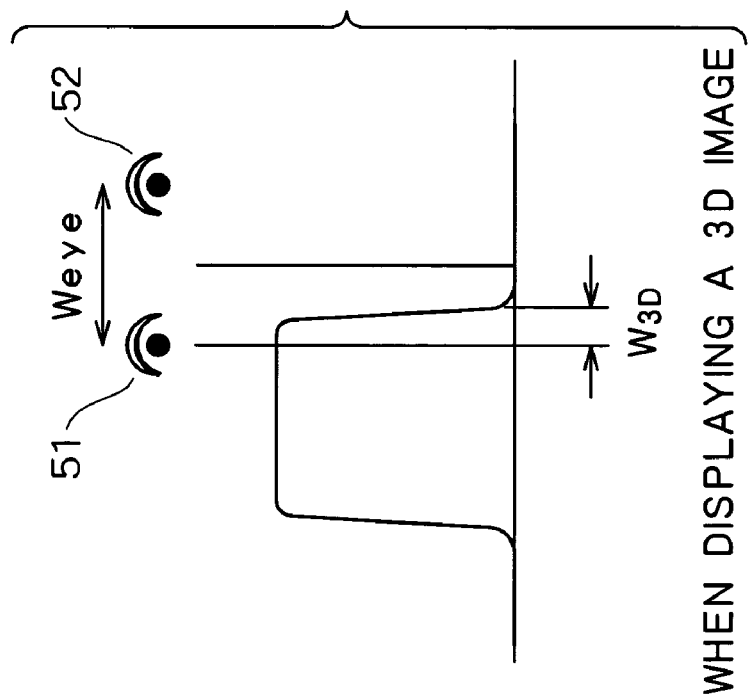

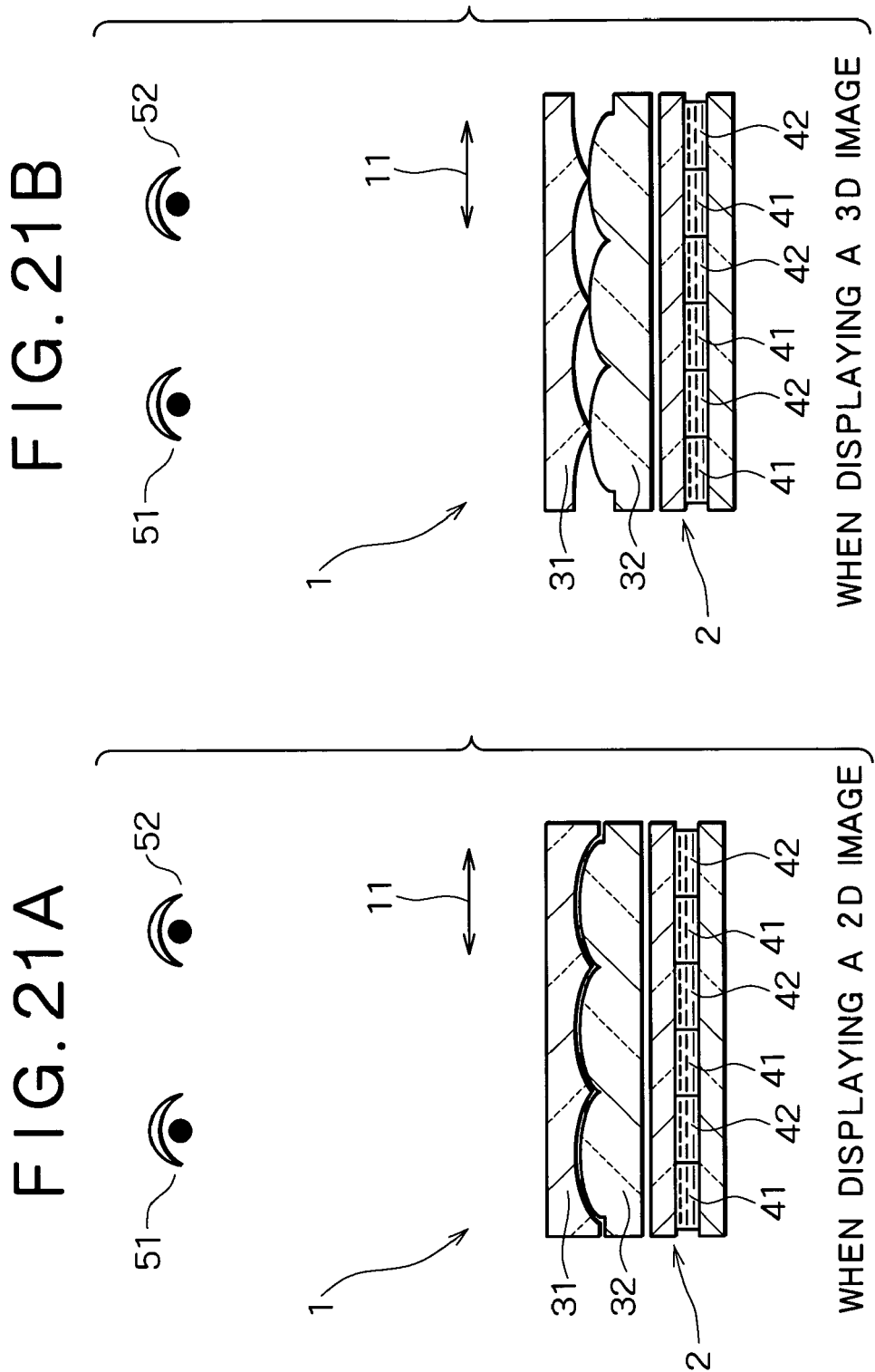

F I G. 24
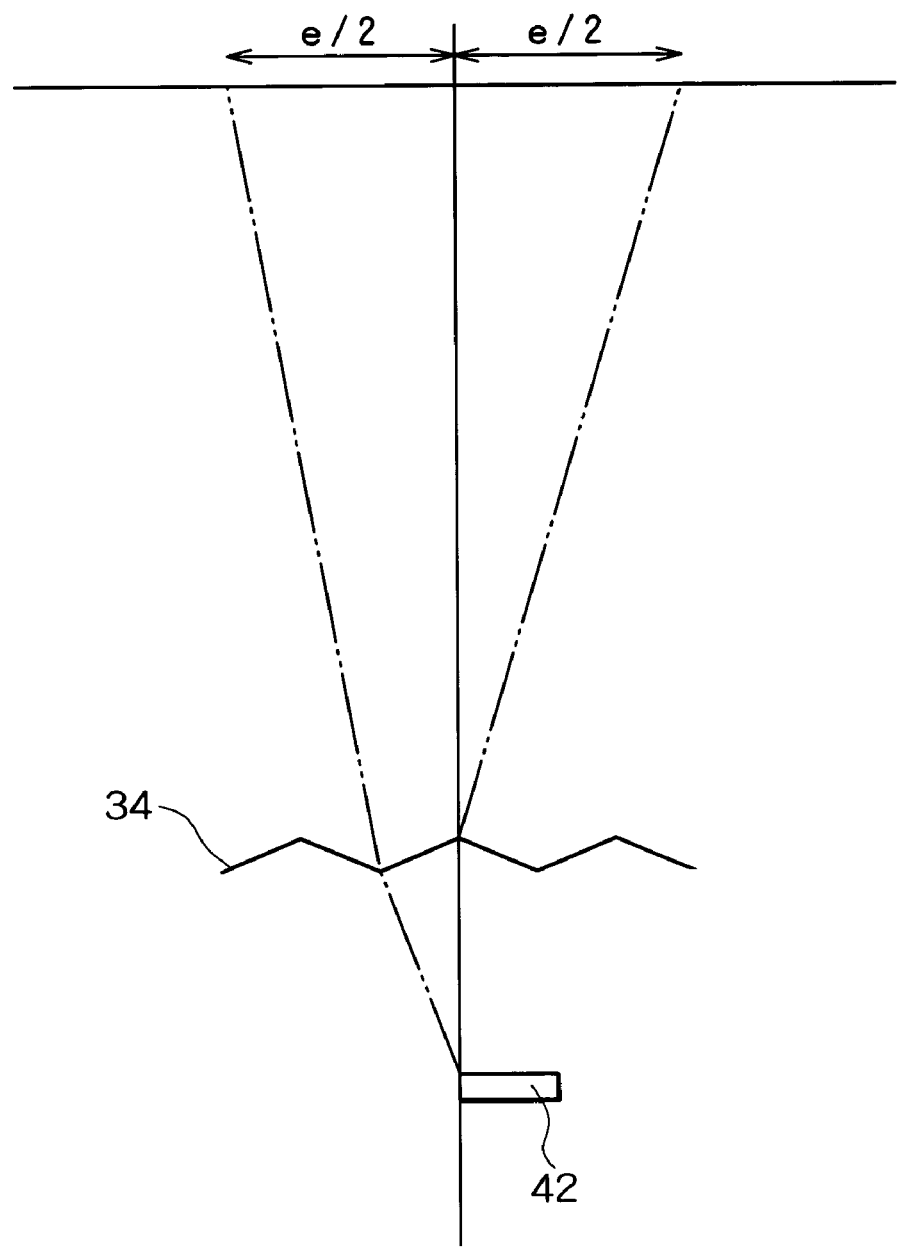

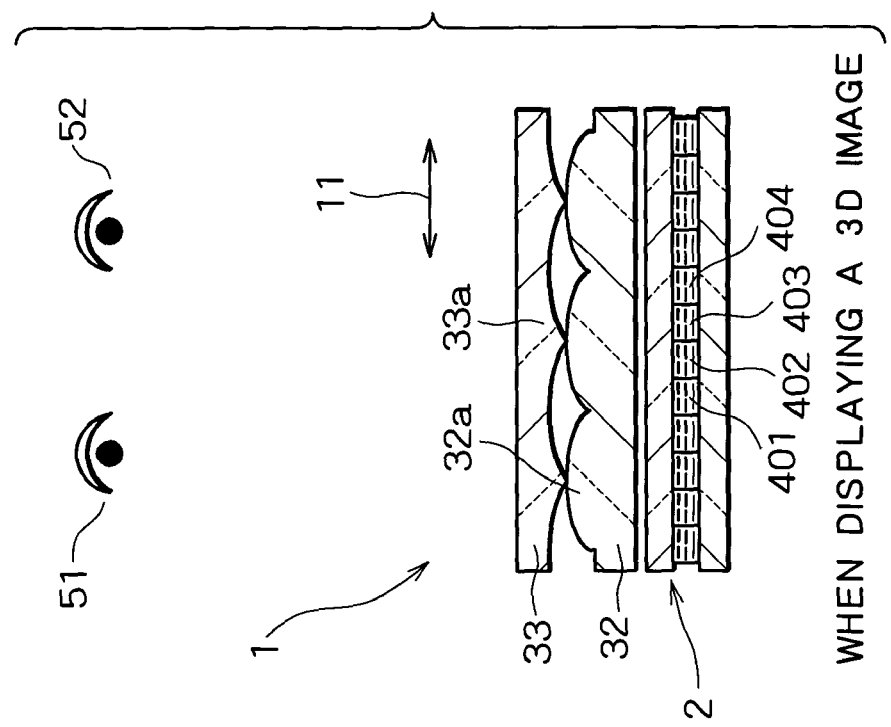
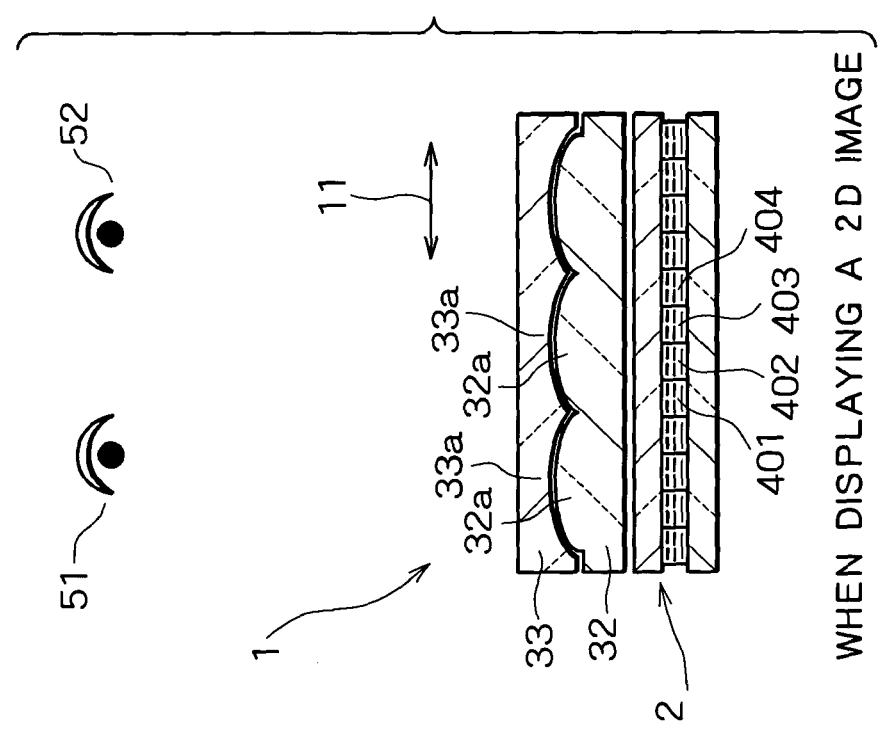

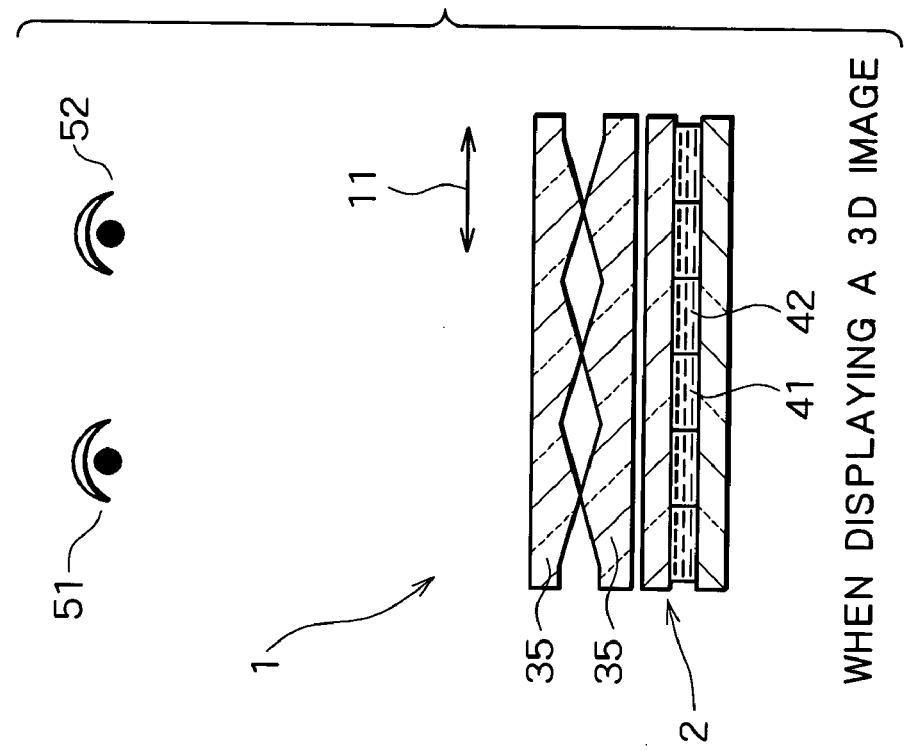
FIG. 28A WHEN DISPLAYING A 2D IMAGE
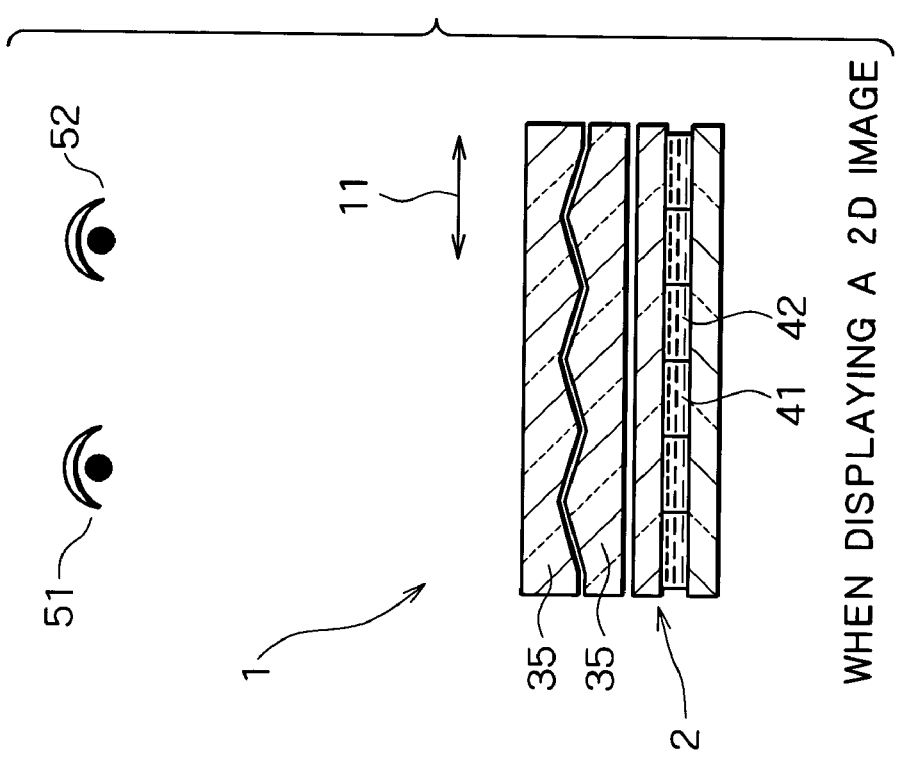
FIG. 28B WHEN DISPLAYING A 3D IMAGE

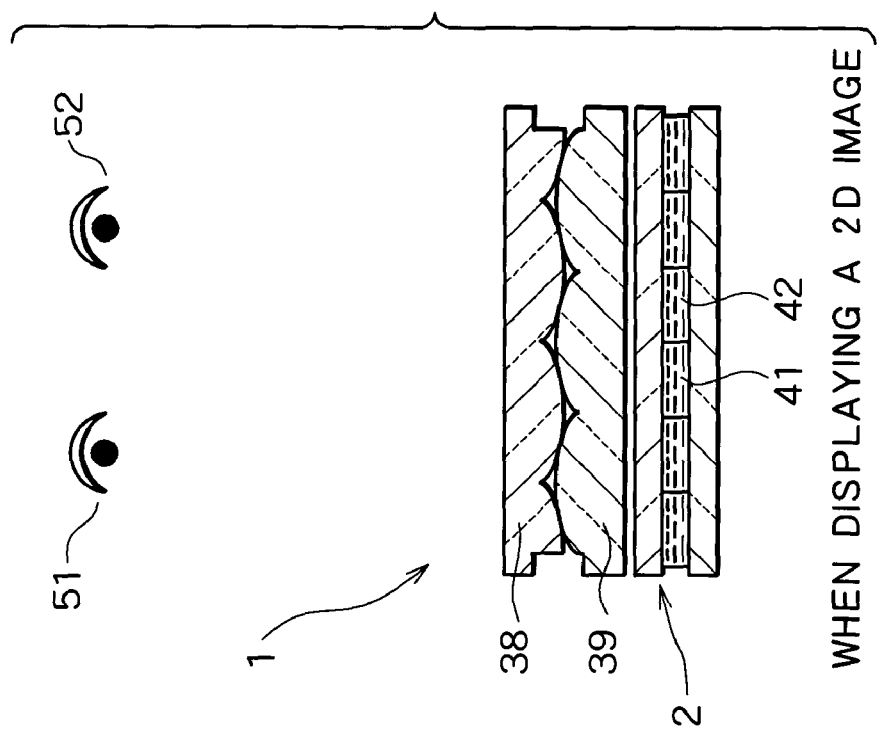
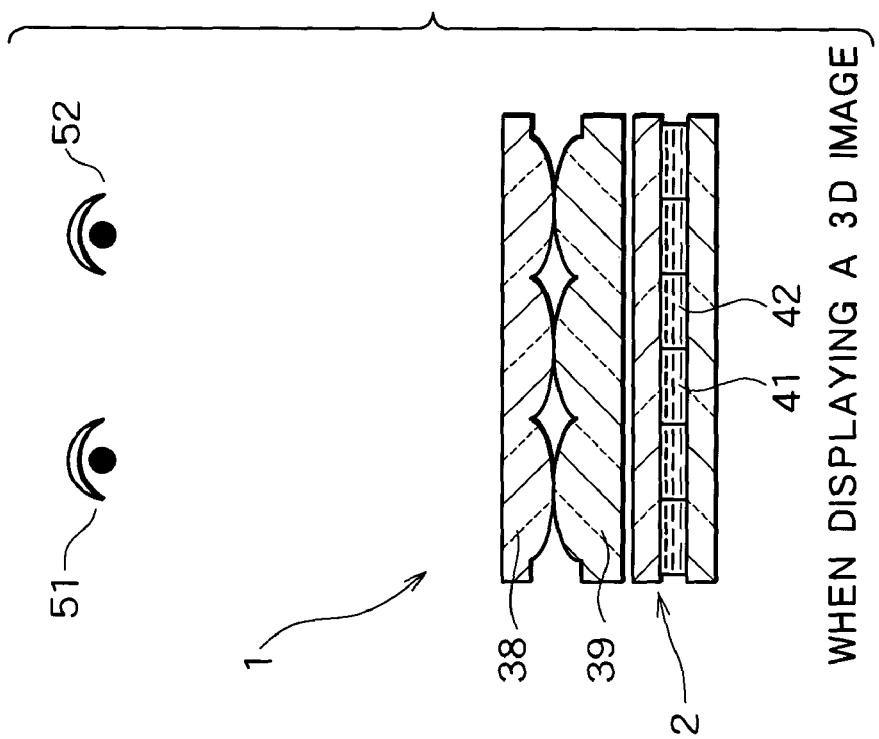

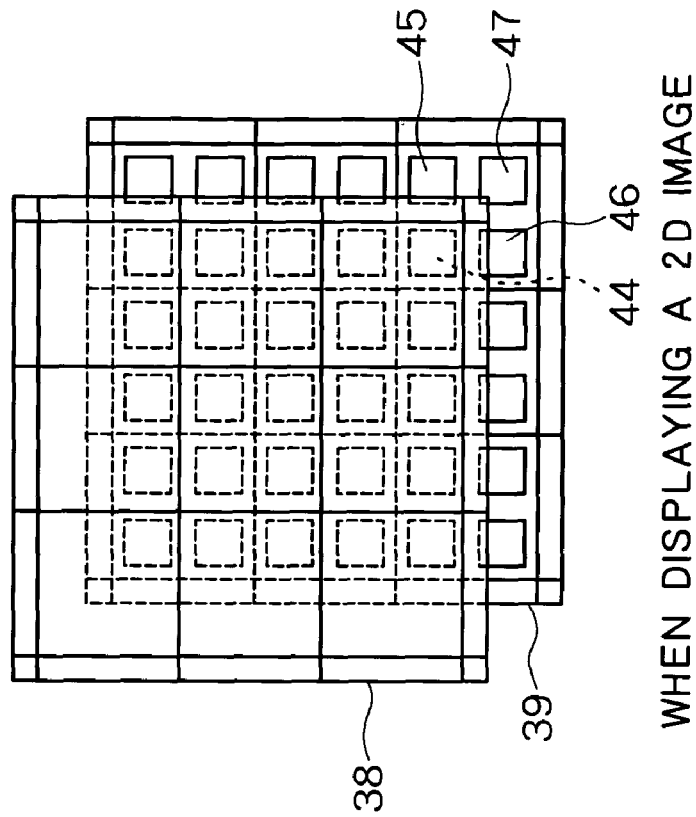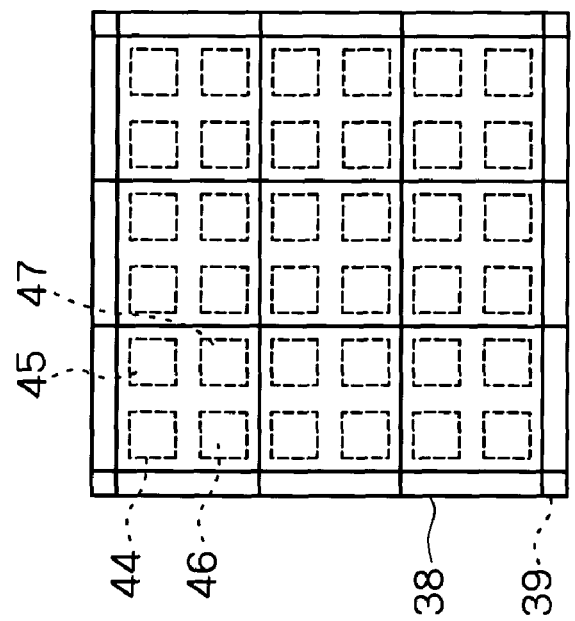

3D IMAGE/2D IMAGE SWITCHING DISPLAY APPARATUS AND PORTABLE TERMINAL DEVICE

BACKGROUND OF THE INVENTION

1. Field of the Invention

The present invention relates to a three-dimensional (3D) image/two-dimensional (2D) image switching display apparatus which can display a 3D image and a 2D image, switching them from one to the other, and a portable terminal device incorporating the 3D image/2D image switching display apparatus.

2. Description of the Related Art

Display apparatuses capable of displaying 3D images have been developed. 3D image display systems that have been studied so far can be classified into a type which uses glasses and a type which does not. With the use of the glasses-using type which includes an anaglyph type and a polarization glass type using polarization, a user cannot substantially avoid wearing glasses. In this respect, recently active studies have been made on glass-less 3D image display apparatuses which do not use glasses.

Glass-less 3D image display apparatuses include a parallax barrier type and a lenticular lens type. The parallax barrier type was conceived by Berthier in 1896 and verified by Ives in 1903. The parallax barrier has multiple thin vertical openings or slits formed therein. In the vicinity of the parallax barrier are laid out pixels for a right eye (hereinafter referred to as "right-eye pixels") and pixels for a left eye (hereinafter referred to as "left-eye pixels") in a direction perpendicular to the lengthwise direction of the slits. Lights from the pixels are partly shielded when passing the parallax barrier. Specifically, the pixels are laid out in such a way that while lights from the left-eye pixels reach the left eye but are shielded from going toward the right-eye pixels, lights from the right-eye pixels reach the right eye but do not reach the left eye. Accordingly, the lights from the left-eye pixels and the lights from the right-eye pixels respectively reach the left and right eyes, thus allowing the user to identify the image as a 3D image. At the time the parallax barrier was devised, the parallax barrier was arranged between the pixels and eyes and was therefore eyesore and provided a low visibility. The recent achievement of liquid crystal displays has made it possible to arrange the parallax barrier at the back of each display, improving the visibility. This has resulted in active studies on parallax barrier type display apparatuses at present.

The lenticular lens type display apparatus was invented in around 1910 by Ives et al. mentioned above, as described in, for example, "3D Display by Chihiro Masuda from Sangyo Tosho Publishing Co., Ltd. FIG. 1 is a perspective view showing the shape of a lenticular lens. As shown in FIG. 1, a lenticular lens 100 has two sides, one being flat and the other having a plurality of semicylindrical projections (cylindrical lenses) formed thereon extending in one direction. Right-eye pixels which display an image for the right eye and left-eye pixels which display an image for the left eye are alternately laid out on the focal plane of the lens. Therefore, light from each pixel is distributed by the lenticular lens 100 to directions respectively going to the right and left eyes. This can allow the right and left eyes to identify different images so that the observer can recognize a 3D image. This lenticular lens type is widely adapted to stereoscopic TVs or the like at present.

Recently have active studies also been made to permit a 3D image display apparatus to display a 2D image. The easiest scheme is to make the aforementioned images for the right eye and for the right eye match with each other and display the same image. In this case, the same information should be displayed over two pixels, thus reducing the resolution to a half. This particularly raises a significantly problem that the visibility of texts characters which are used most frequently at the time of displaying a 2D image drops significantly.

Studies have so far been made on schemes of displaying a 3D image and a 2D image, switching them from one to the other, without reducing the resolution. For example, Japanese Patent Publication Laid-Open No. 068961/1996 and Japanese Patent Publication Laid-Open No. 112273/1992 describe a 3D image display apparatus using a lenticular lens, which is designed in such a way that between the lenticular lens and a transparent plate so arranged as to face the irregular side of the lenticular lens, a substance having the same refractive index as the material for the lenticular lens is injected to nullify the lens effect. FIG. 2 is a perspective view showing the conventional 3D image display apparatus. As shown in FIG. 2, a transparent plate 103 is laid on the upheaval side of a lenticular lens 102 of this conventional 3D image display apparatus 101 and a clearance 104 is made between the lenticular lens 102 and the transparent plate 103. At the time of displaying a 2D image, a liquid substance (not shown) having the same refractive index as the lens is injected into the clearance 104 by a pump 105 or the like. This disables the lens effect and can thus ensure 2D display. In case of displaying a 3D image, the injected substance is discharged from the clearance 104 to make the lens effect available, thereby ensuring 3D display.

Japanese Patent Publication Laid-Open No. 197343/1997 describes a 3D image display apparatus which switches between the display of a 3D image and the display of a 2D image by changing the distance between the image display surface of a pixel and the lenticular lens. FIG. 3 is a cross-sectional view showing this conventional 3D image display apparatus. In the conventional 3D image display apparatus 111, as shown in FIG. 3, the distance between a lenticular lens 112 and an image display unit 113 is variable. Right-eye pixels 114 and left-eye pixels 115 are alternately laid out on the image display unit 113. When the distance between the lenticular lens 112 and the image display unit 113 is set to the focal distance of the lenticular lens, the lens effect of the lenticular lens 112 becomes effective with respect to lights from the pixels 114 and 115, thereby ensuring the display of a 3D image. When the distance between the lenticular lens 112 and the image display unit 113 is set to approximately zero, on the other hand, the lens effect of the lenticular lens 112 is disabled so that a 2D image can be displayed. In case where an electronic display, such as a liquid crystal device, is used as the image display unit 113, the thickness of the glass substrate limits the distance to be variable, thus making it difficult to set the distance between the lenticular lens 112 and the image display unit 113 is set to approximately zero. To cope with this difficulty, image transfer means, such as a fiber face plate 116, is provided on the lenticular-lens side surface of the image display unit 113 to equivalently cause the lenticular lens 112 to come close to the vicinity of the image display unit 113.

The prior art however has the following problems. The conventional 3D image/2D image switching display apparatus is provided with a lenticular lens and displays a 3D image by enabling the lens effect of the lenticular lens and displays a 2D image by disabling the lens effect of the lenticular lens. As switching means to switch between enabling and disabling of the lens effect of the lenticular lens is large in scale, the 3D image/2D image switching display apparatus disadvantageously becomes thicker and larger. The existence of the switching means reduces the display quality. Further, the operation of the switching means takes times, resulting in a longer time needed to switch between the display of a 3D image and the display of a 2D image. Furthermore, the provision of the switching means increases the cost for the 3D image/2D image switching display apparatus.

Those problems will be discussed more specifically. According to the prior art described in Japanese Patent Publication Laid-Open No. 068961/1996 and Japanese Patent Publication Laid-Open No. 112273/1992 as shown in FIG. 2, a mechanism which injects and discharges a liquid substance having the same refractive index as the material for the lenticular lens 102 into and from the clearance 104 by means of the pump 105 is provided as the switching means to enable/disable the lens effect of the lenticular lens. This method however requires the pump 105 to inject and discharge the liquid substance and a tank to store the discharged liquid substance. The requirements inevitably enlarge the apparatus and increase the cost. If the injection and discharge of the liquid substance are not done completely, bubbles or the like are produced, thereby reducing the display quality. In addition, the injection and discharge of the liquid substance take time, resulting in a longer time to switch the display of 2D and 3D images from one to another.

According to the prior art described in Japanese Patent Publication Laid-Open No. 197343/1997 as shown in FIG. 3, a mechanism which changes the distance between the lenticular lens 112 and the image display unit 113 is provided as the switching means to enable/disable the lens effect of the lenticular lens. This structure needs space for changing the distance and thus increases the thickness of the 3D image/2D image switching display apparatus. The need to use the expensive fiber face plate 116 or the like leads to a cost increase. Further, as light from the image display unit 113 passes through the fiber face plate 116, the display quality becomes lower as compared with the case where the fiber face plate 116 is not provided. There is another problem that the movement of the lenticular lens 112 takes time.

SUMMARY OF THE INVENTION

Accordingly, it is an object of the invention to provide a thin, small and low-cost 3D image/2D image switching display apparatus which ensures fast switching between the display of a 3D image and the display of a 2D image, provides a high display quality and is particularly suitable for mobile usages such as in a portable telephone and PDA (Personal Digital Assistant), and a portable terminal device which uses this 3D image/2D image switching display apparatus.

A three-dimensional (3D) image/two-dimensional (2D) image switching display apparatus according to the invention comprises: display unit having a plural of pixel groups cyclically laid out each comprised of first to n-th pixels (n being an integer equal to or greater than 2); first optical unit which has first optical elements cyclically laid out in association with the individual pixel groups and refracts lights output from the pixels; and second optical unit which has second optical elements cyclically laid out in association with the individual pixel groups and refracts lights output from the first optical unit, wherein when images displayed by the first to n-th pixels differ from one another, the second optical unit is placed in relative to the first optical unit at a first position where the first and second optical unit output lights, output from the first to n-th pixels, in first to n-th directions different from one another, and when the first to n-th pixels display a same image independently, the second optical unit is placed in relative to the first optical unit at a second position which is set apart from the first position in a layout direction of the second optical elements by half a distance of a layout cycle of the second optical elements or by a distance equal to an integer multiple of the layout cycle of the second optical elements added to the half the distance and where the first and second optical unit output lights, output from the first to n-th pixels, in a same direction.

According to the invention, it is possible to select between whether to output lights output from the first to n-th pixels in the first to n-th directions different from one another or to output the lights in the same direction by changing the relative positions of the first optical unit and the second optical unit. If images displayed by the first to n-th pixels differ from one another and the first and second optical unit output lights output from the first to n-th pixels in the first to n-th directions different from one another, an observer can observe different images by changing the viewpoint. This can permit the observer to recognize a 3D image. If the first to n-th pixels independently display the same image and the first and second optical unit output lights output from the first to n-th pixels in the same direction, a 2D image can be displayed at a high resolution. The first to n-th pixels independently displaying the same image means that those pixels together display the same image. This can increase the resolution of the same image to n times higher as compared with the resolution of each image in case where images to be displayed by the first to n-th pixels differ from one another.

According to the invention, it is possible to realize selection between whether to output lights output from the first to n-th pixels in the first to n-th directions different from one another or to output the lights in the same direction by moving the second optical unit by half the distance of the layout cycle of the second optical elements or a distance equal to an integer multiple of the layout cycle of the second optical elements added to the former half the distance with respect to the first optical unit. This can realize a thin, small and low-cost 3D image/2D image switching display apparatus which ensures fast switching from one image display to another. Further, because there are no structural elements through which lights output from the pixels pass besides the first and second optical unit, the display quality is excellent. The use of the first and second optical unit can reduce aberration and can thus achieve high-quality image display.

The display unit may have two kinds of pixels, right-eye pixels for a right eye and left-eye pixels for a left eye, and at a time of displaying a 3D image, the right-eye pixels may display images for the right eye, the left-eye pixels may display images for the left eye and the first and second optical unit may output lights output from the right-eye pixels in a first direction and output lights output from the left-eye pixels in a second direction, and at a time of displaying a 2D image, the right-eye pixels and the left-eye pixels together may display a same 2D image and the first and second optical unit may output lights output from the right-eye pixels and the left-eye pixels in a same direction. This is the case where the aforementioned n is 2. As the observer shifts the right eye ahead in the first direction and shifts the left eye ahead in the second direction, the observer can observe an image for the right eye with the right eye and observe an image for the left eye with the left eye. As a result, the observer can recognize a 3D image. At the time of displaying a 2D image, the observer can observe the same image with the right and left eyes.

Further, the first optical unit may be a first lenticular lens portion which comprises one or plural convex type lenticular lenses and where the first optical elements are lens elements, the second optical unit may be a second lenticular lens portion which comprises one or plural convex type lenticular lenses and where the second optical elements are lens elements, at a time of displaying a 3D image, an optical axis of that lens element which is located at a center of the second lenticular lens portion may substantially coincide with an optical axis of one lens element of the first lenticular lens portion, and at a time of displaying a 2D image, the optical axis of the lens element located at the center of the second lenticular lens portion may be shifted from an optical axis of that lens element which is located at a center of the first lenticular lens portion, by half a length of a layout cycle of the lens elements of the second lenticular lens portion or a length equal to an integer multiple of the layout cycle of the lens elements of the second lenticular lens portion added to the half the length.

As the optical axis of the lens element of the first lenticular lens is matched with the optical axis of the lens element of the second lenticular lens, the first and second lenticular lenses become equivalent to a single virtual lenticular lens whose curvature is twice the curvature of the first and second lenticular lenses and whose layout cycle is equal to that of the first and second lenticular lenses. This can allow an image for the right eye to be output in the first direction and an image for the left eye to be output in the second direction. Further, as the optical axis of the lens element of the first lenticular lens is shifted from the optical axis of the lens element of the second lenticular lens by half the layout cycle, the first and second lenticular lenses become equivalent to a single virtual lenticular lens whose curvature is twice the curvature of the first and second lenticular lenses and whose layout cycle is about half the layout cycle of the first and second lenticular lenses. This can permit the lens elements to correspond to the individual images respectively, so that lights from the individual images are projected in magnification in the same direction.

Further, at least one of the first and second lenticular lens portions may comprise two or more lenticular lenses stacked one on another. In this case, the 3D image/2D image switching display apparatus has three or more lenticular lenses. This structure further reduces aberration.

Furthermore, it is preferable that a curvature of the lens elements of the first lenticular lens portion should be equal to a curvature of the lens elements of the second lenticular lens portion and in case where the first and second lenticular lens portions are considered as a single virtual lenticular lens, a clearance between the first and second lenticular lens portions should be equal to or less than 20% of a focal distance of lens elements of the virtual lenticular lens. This can achieve better 3D image display.

It is also preferable that at a time of displaying a 3D image, an amount of deviation between the optical axis of the lens element which is located at the center of the first lenticular lens portion and the optical axis of the lens element which is located at the center of the second lenticular lens portion should be equal to or less than 12% of a layout cycle of the lens elements of the first lenticular lens portion. This can achieve better 3D image display.

Further, the first and second lenticular lens portions may be provided respectively movable in relative to the display unit, at a time of displaying a 3D image, the optical axes of the lens elements which are located at the centers of the first and second lenticular lens portions may pass through a center of that pixel group, consisting of the right-eye pixels and the left-eye pixels which is located at a center of the display unit, and at a time of displaying a 2D image, the optical axis of the lens element which is located at the center of the first lenticular lens portion may pass through a position shifted from the center of the pixel group by a length of ¼ times a layout cycle of the lens elements of the first lenticular lens portion or a length equal to an integer multiple of the layout cycle of the lens elements of the first lenticular lens portion added to the length of ¼ times the layout cycle and the optical axis of the lens element which is located at the center of the second lenticular lens portion may pass through a position shifted, in an opposite direction to a direction of shifting done with respect to the display unit, from the center of the pixel group by a length of ¼ times the layout cycle or a length equal to an integer multiple of the layout cycle of the lens elements of the second lenticular lens portion added to the length of ¼ times the layout cycle. This can allow the 3D visible range and the 2D visible range to match with each other so that it is unnecessary to shift the viewpoint at the time of switching between the display of a 3D image and the display of a 2D image.

It is further preferable that at a time of displaying a 2D image, a width of a 2D visible range over which a light emitting section of a pixel is projected in magnification should be set greater than a distance between both eyes of an observer, and that at a time of displaying a 3D image, a width of a 3D visible range over which light output from a pixel is projected in magnification via that lens element which is closest to that pixel should be set twice a distance between both eyes of an observer. This can maximize the area in which the 3D visible range and the 2D visible range overlap each other. While the distance between both eyes differs from one observer from another, the average distance between both eyes of users who are expected to be the users of the 3D image/2D image switching display apparatus of the invention. In general, the value of 65 mm, for example, is frequently used as the distance between both eyes.

One of the first and second optical unit may be a convex lenticular lens portion which comprises one or plural convex type lenticular lenses, the other one of the first and second optical unit may be a concave lenticular lens portion which comprises one or plural concave type lenticular lenses, at a time the first to n-th pixels respectively display first to n-th images, an optical axis of that lens element which is located at a center of the convex lenticular lens portion may be shifted from an optical axis of that lens element which is located at a center of the concave lenticular lens portion, by half a length of a layout cycle of the lens elements of the convex lenticular lens portion or a length equal to an integer multiple of the layout cycle of the lens elements of the convex lenticular lens portion added to the half the length, and at a time the first to n-th pixels respectively together display a same image, the optical axis of the lens element located at the center of the convex lenticular lens portion may substantially coincide with an optical axis of one lens element of the concave lenticular lens portion.

In case where the optical axis of the convex lenticular lens is shifted from the optical axis of the concave lenticular lens by half the length of the layout cycle, the convex and concave lenticular lenses become equivalent to a single virtual prism plate on which prism elements corresponding to the individual pixels are laid out. The virtual prism plate allows lights output from the first to n-th pixels to be output in the first to n-th directions. When the optical axis of the convex lenticular lens matches with the optical axis of the concave lenticular lens, the functions of the lenses are canceled out and lights output from the first to n-th pixels are output in the same direction.

Furthermore, the first optical unit may be a first fly-eye lens portion which comprises one or plural fly-eye lenses, the second optical unit may be a second fly-eye lens portion which comprises one or plural fly-eye lenses, and the second fly-eye lens portion may be movable in all directions in which the pixels of the display unit are laid out in relative to the first fly-eye lens portion. This can permit light to be irradiated in every direction in which the pixels are laid out. As a result, different images can be output in, for example, the up and down direction besides the right and left direction of the screen. Even when the direction of the screen is switched to the right and left direction and the up and down direction, for example, therefore, 3D display can be ensured in each direction. It is also possible to realize three-dimensional feeling in the up and down direction.

The first optical unit may be a first prism plate on which prism elements are laid out, the second optical unit may be a second prism plate on which prism elements are laid out, at a time of displaying a 3D image, a vertex of that prism element which is located at a center of the second prism plate, as seen from a direction perpendicular to a display surface of the display unit, may substantially coincide with a trough portion between one prism element of the first prism plate and those prism elements which adjoin that one prism element, and at a time of displaying a 2D image, the vertex of the prism element which is located at the center of the second prism plate, as seen from the direction perpendicular to the display surface of the display unit, may substantially coincide with a vertex of one prism element of the first prism plate. The use of a prism plate as optical unit can make the cost lower as compared with the case where a lenticular lens is used.

It is preferable that the display unit should have a color filter which colors lights output from the pixels and should have a plurality of stripe portions colored to plural kinds of colors and cyclically laid out in parallel to one another and a lengthwise direction of the stripe portions should be parallel to layout directions of the first and second optical elements. This can prevent the generation of color moire and ensure high-quality image display.

Alternatively, the display unit should display an image by color field sequential display method. This eliminates the need for a color filter and can reduce the influence of division of the color space, thereby improving the image display quality. It is also possible to reduce the quantity of pixels to ⅓ of the ordinary quantity. Further, there is not light absorption by a color filter, thus improving the emission efficiency, which can contribute to power saving.

The 3D image/2D image switching display apparatus may further comprise a casing which houses the display unit and the first and second optical unit and to which the second optical unit is fixed. In this case, the second optical unit may have a capability of a protection plate, a touch panel or a front-light for the display unit. This eliminates the need to particularly provide a protection plate, a touch panel or a front-light, thus making it possible to enhance the capabilities of the apparatus and/or make the apparatus thinner.

At least one part of the first optical unit may be formed integral with a member which constitutes a display surface of the display unit. This can make the 3D image/2D image switching display apparatus thinner. Provided that the thickness of the 3D image/2D image switching display apparatus is set unchanged, the thickness of other optical unit can be increased, thereby suppressing the warping and deformation of the optical unit. This can allow the 3D image/2D image switching display apparatuses with a good display quality to be manufactured at a high yield.

At least one of the first and second optical unit may be divided into a plurality of portions as seen from a direction perpendicular to a display surface of the display unit and the plurality of portions may be movable independently of one another. This can ensure simultaneous display of a 2D image and a high-resolution 2D image.

It is preferable that at least one of the first and second optical unit should be provided with a frame. This can suppress transformation of the optical unit, such as warping and deformation.

It is also preferable that an antireflection coating should be formed on a surface of at least one of the first and second optical unit. This can suppress reflection of light by the optical unit, further improving the display quality.

The 3D image/2D image switching display apparatus can further comprise an actuator, attached to at least one of the first and second optical unit, for moving the one of the first and second optical unit in relative to the other optical unit.

The 3D image/2D image switching display apparatus may further comprise a casing for housing the display unit and the first and second optical unit, and one pair or plural pairs of non-linear springs which are located between the casing and at least one of the first and second optical unit in such a way as to be stretched and contracted in a layout direction of the first optical elements and whose reaction force is discontinuously reduced when an amount of displacement exceeds a threshold value, and which are provided in such a way that an amount of displacement of one of each pair of non-linear springs is greater than the threshold value while an amount of displacement of the other non-linear spring becomes smaller than the threshold value. Accordingly, the optical unit can be held stably at the first position or the second position due to the difference in the reaction forces of the non-linear springs.

The actuator may be a linear member made of a shape memory alloy and connected to a power supply. Accordingly, the actuator which operates on an electric signal can be realized with a simple structure.

A portable terminal device according to the invention has the above-described 3D image/2D image switching display apparatus. The portable terminal device may be a portable telephone, a portable terminal, PDA, a game machine, a digital camera or a digital video.

According to the invention, as elaborated above, as the first optical unit having the first optical elements laid out thereon and the second optical unit having the second optical elements laid out thereon are provided and the second optical unit is moved in relative to the second optical unit in the layout direction of the first and second optical elements to change the relative positions of the first optical unit and the second optical unit, the display of a 3D image and the display of a 2D image can be switched from one to the other. This can realize a thin, small and low-cost 3D image/2D image switching display apparatus which executes fast switching between the display of a 3D image and the display of a 2D image, and provides a high display quality.

BRIEF DESCRIPTION OF THE DRAWINGS

FIGS. 6A and 6B are cross-sectional views illustrating the operation of the switching display apparatus, FIG. 6A showing the case of displaying a 3D image while FIG. 6B shows the case of displaying a 2D image;

FIG. 19 is a cross-sectional view showing a 3D image/2D image switching display apparatus according to a fourth embodiment of the invention and shows a 3D-image display state;

FIGS. 20A and 20B are graphs showing the allowable ranges of a 3D visible range and a 2D visible range, with the observation position taken on the horizontal axis and the irradiance at the observation position taken on the vertical axis;

FIGS. 21A and 21B are cross-sectional views showing a 3D image/2D image switching display apparatus according to a fifth embodiment of the invention, FIG. 21A showing a 2D-image display state while FIG. 21B shows a 3D-image display state;

FIG. 24 is a diagram showing the path of light output from the other end portion of this pixel;

FIGS. 27A and 27B are cross-sectional views showing a 3D image/2D image switching display apparatus according to a modification of the fifth embodiment, FIG. 27A showing a 2D-image display state while FIG. 27B shows a 3D-image display state;

FIGS. 28A and 28B are cross-sectional views showing a 3D image/2D image switching display apparatus according to a sixth embodiment of the invention, FIG. 28A showing a 2D-image display state while FIG. 28B shows a 3D-image display state;

FIGS. 30A and 30B are cross-sectional views showing a 3D image/2D image switching display apparatus according to a seventh embodiment of the invention, FIG. 30A showing a 3D-image display state while FIG. 30B shows a 2D-image display state;

FIGS. 31A and 31B are top views showing the 3D image/2D image switching display apparatus, FIG. 31A showing a 3D-image display state while FIG. 31B shows a 2D-image display state;

DETAILED DESCRIPTION OF THE PREFERRED EMBODIMENTS

Figure 4:
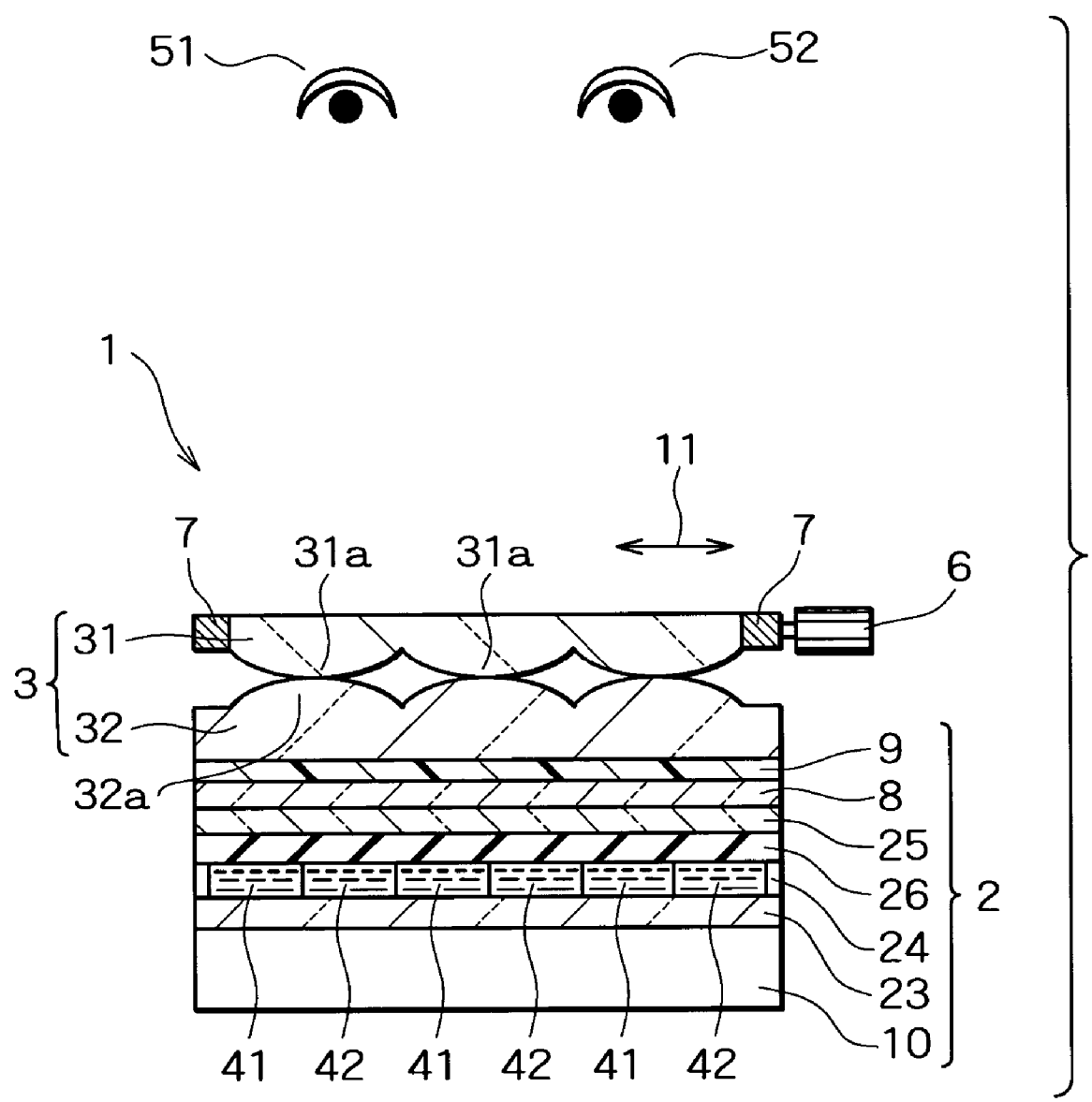
FIG. 4 is a cross-sectional view showing a 3D image/2D image switching display apparatus according to a first embodiment of the invention.
Figure 5:
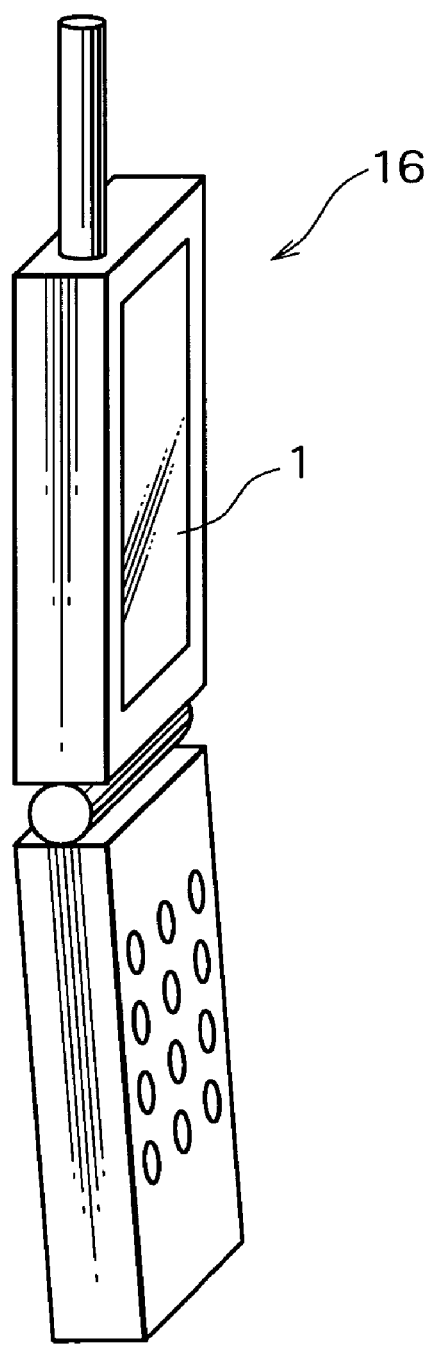
FIG. 5 is a perspective view showing a portable terminal device according to the embodiment.

Embodiments of the invention will be described specifically below with reference to the accompanying drawings. First, the first embodiment will be described. FIG. 4 is a cross-sectional view showing a 3D image/2D image switching display apparatus according to the embodiment and FIG. 5 is a perspective view showing a portable terminal device according to the embodiment. FIG. 4 also shows a right eye 51 and a left eye 52 of an observer.

As shown in FIG. 4, the 3D image/2D image switching display apparatus 1 according to the embodiment (hereinafter simply called "switching display apparatus 1" too) is provided with a liquid crystal display (LCD) unit 2 with an optical distributor 3 provided on that side of the LCD unit 2 from which light is output.

The LCD unit 2 is provided with a backlight 10 and a glass substrate 23, a liquid crystal (LC) layer 24, a color filter 26 and a glass substrate 25 are provided at that position of the LCD unit 2 where light from the backlight 10 is input and in parallel to one another in order from the backlight 10. Left-eye pixels 41 and right-eye pixels 42 are alternately laid out on the LC layer 24. An optical film 8, such as a polarizing plate or a compensator, is adhered to the glass substrate 25 as needed. The color filter 26 is of a stripe type and has, for example, red (R), green (G) and blue (B) stripes cyclically laid out in parallel to one another.

Figure 1:
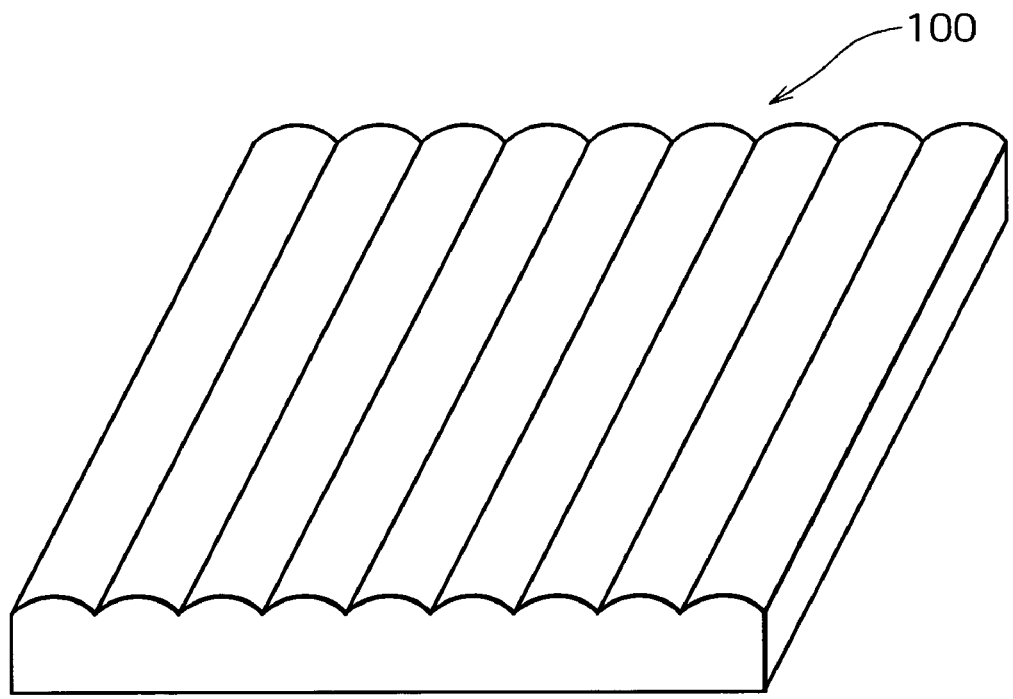
FIG. 1 is a perspective view showing the shape of a lenticular lens.
Figure 2:
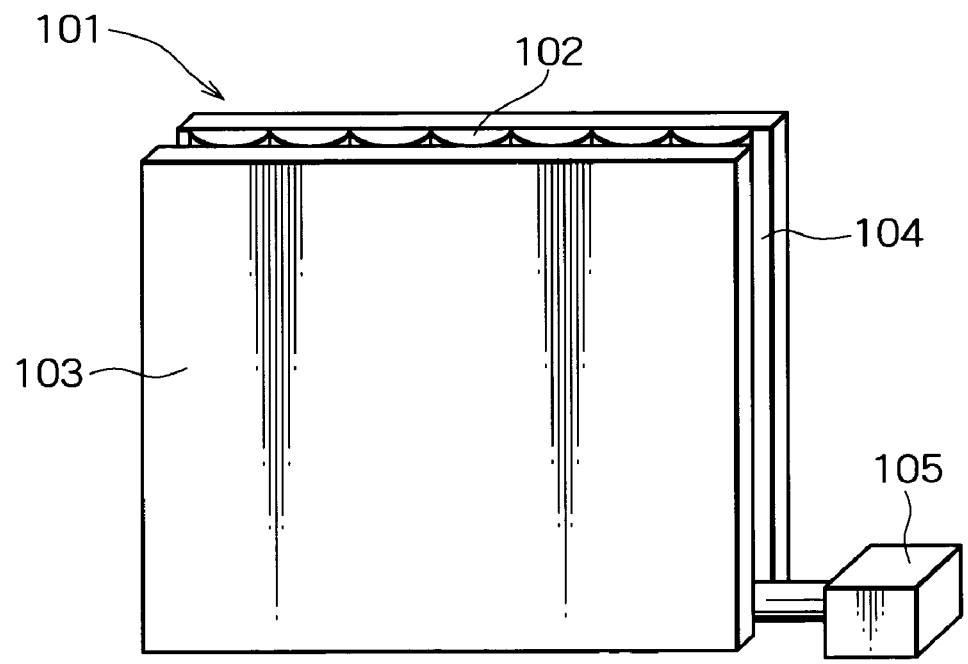
FIG. 2 is a perspective view showing one conventional 3D image display apparatus.
Figure 3:
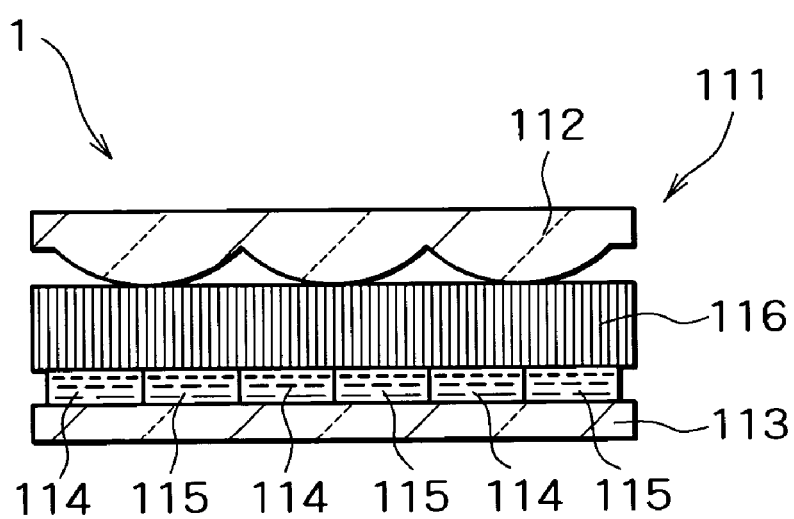
FIG. 3 is a cross-sectional view showing another conventional 3D image display apparatus.

The optical distributor 3 is provided with a convex lenticular lens 31 as first optical unit and also a convex lenticular lens 32 as second optical unit. Like the lenticular lens 100 shown in FIG. 1, the lenticular lens 31 has two sides, one being flat and the other having a plurality of semicylindrical projections 31a (cylindrical lenses), as optical elements or lens elements, formed thereon extending in one direction. The lenticular lens 32 having the same shape as the lenticular lens 31 has two sides, one being flat and the other having a plurality of semicylindrical projections 32a (cylindrical lenses) formed thereon. As the lenticular lenses 31 and 32 are convex type lenses, they have positive focal distances. The lenticular lenses 31 and 32 are arranged in parallel to each other in such a way that the projections 31a face the projections 32a. The lenticular lens 32 is located closer to the LCD unit 2 than the lenticular lens 31. The string direction of the projections 31a and the string direction of the projections 32a are the same direction of 11. Further, the lens pitch of the lenticular lens corresponds to the length of a pair of a single left-eye pixel 41 and a right-eye pixel 42, laid out along the direction 11 and adjacent to each other, in the direction 11. That is, one projection 31a and one projection 32a correspond to pixel groups each consisting of a pair of pixels 41 and 42.

The lenticular lens 32 is adhered to the optical film 8 of the LCD unit 2 via a photo-curing adhesive layer 9. At this time, the lenticular lens 32 is fixed to the LCD unit 2 in such a way that the center of the lenticular lens 32 coincides with the center of the LCD unit 2. Further, the lengthwise direction of the stripes of the color filter 26 matches with the string direction 11 of the projections 31a and 32a. When the lengthwise direction of the stripes of the color filter 26 becomes perpendicular to the direction 11, the lenticular lens causes color separation which is observed as color moire, reducing the display quality. It is therefore preferable that the lengthwise direction of the stripes should match with the direction. In the switching display apparatus 1, therefore, the backlight 10, the glass substrate 23, the LC layer 24, the color filter 26, the glass substrate 25, the optical film 8, the photo-curing adhesive layer 9, the lenticular lens 32 and the lenticular lens 31 are laid out in the named order in parallel to one another.

A frame 7 for suppressing transformation of the lenticular lens 31, such as warping and deformation, is attached to the periphery of the lenticular lens 31. Attached to the frame 7 is an actuator 6 which can move the lenticular lens 31 in the direction 11 with respect to the lenticular lens 32. The lenticular lenses 31 and 32 are formed of polymethyl methacrylate (PMMA). Further, an antireflection coating (not shown) which is an antireflection coating to suppress the surface reflection is formed on the surfaces of the lenticular lenses 31 and 32. There is also provided a casing (not shown) which houses the LCD unit 2 and the optical distributor 3 and constitutes the outside plate of the switching display apparatus 1. The casing is provided with guide unit for guiding the movement of the lenticular lens 31. The guide unit is a groove, for example.

Figure 7:
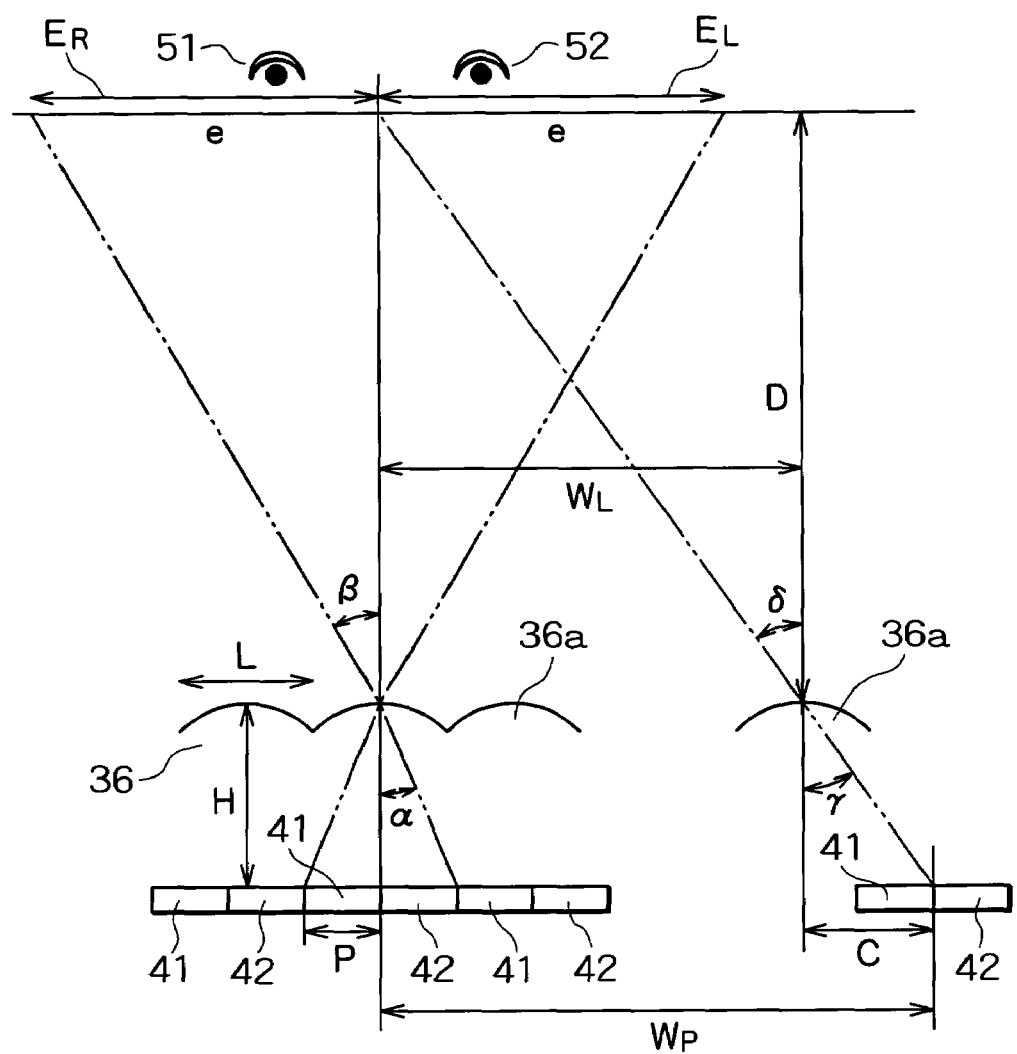
FIG. 7 is a diagram showing an optical model in case where two lenticular lenses are regarded as a single lenticular lens at the time of displaying a 3D image.
Figure 8:
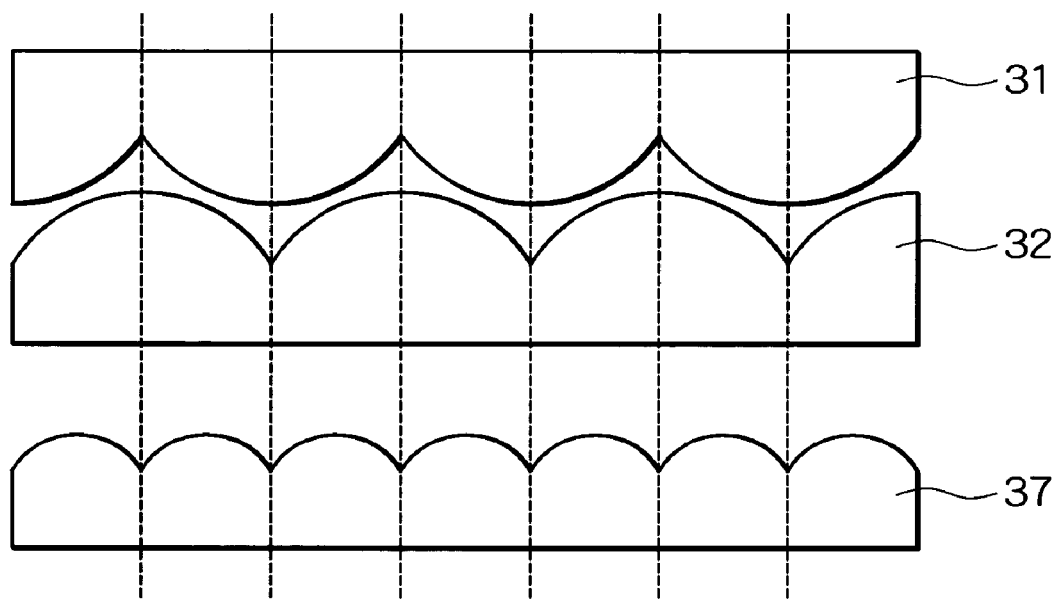
FIG. 8 is a cross-sectional view showing a single lenticular lens equivalent to two lenticular lenses.

A portable terminal device according to the embodiment will be discussed next. FIGS. 6A and 6B are cross-sectional views illustrating the operation of the switching display apparatus 1. FIG. 6A shows the case of displaying a 3D image and FIG. 6B shows the case of displaying a 2D image. FIG. 7 is a diagram showing an optical model in case where two lenticular lenses are regarded as a single lenticular lens at the time of displaying a 3D image, and FIG. 8 is a cross-sectional view showing a single lenticular lens equivalent to two lenticular lenses at the time of displaying a 2D image. It is to be noted that the backlight 10, the color filter 26, the optical film 8, the photo-curing adhesive layer 9, the frame 7 and the actuator 6 are not shown in FIGS. 6A and 6B. The same is true of FIGS. 16, 18, 19, 21A, 21B, 27A, 27B, 28A, 28B, 30A, 30B and 32.

To begin with, the case of displaying a 3D image will be discussed. To display a 3D image by the switching display apparatus 1, as shown in FIG. 6A, the position of the lenticular lens 31 is adjusted by the actuator 6 (see FIG. 4) in such a way that the optical axis of the projections 31a of the lenticular lens 31 (hereinafter also called "optical axis of the lenticular lens 31") coincides with the optical axis of the projections 32a of the lenticular lens 32 (hereinafter also called "optical axis of the lenticular lens 32"). That is, the projections 31a of the lenticular lens 31 are made to face the projections 32a of the lenticular lens 32. Then, the left-eye pixels 41 display an image for the left eye and the right-eye pixels 42 display an image for the right eye.

As shown in FIGS. 4 and 6A, light output from the backlight 10 passes the glass substrate 23, the LC layer 24 and the glass substrate 25 of the LCD unit 2 in the named order. At this time, images are formed by the pixels 41 and 42 of the LC layer 24. Then, the light that has passed the glass substrate 25 passes through the color filter 26, the optical film 8 and the photo-curing adhesive layer 9 and enters the optical distributor 3. The light incident to the optical distributor 3 is distributed to two directions, one directed toward the left eye 52 of the observer and the other directed toward the right eye 51. The distribution operation will be elaborated below.

In case where the lenticular lenses 31 and 32 are arranged in such a way that the projections 31a face the projections 32a, as shown in FIG. 6A, the heights of the projections 31a and the 32a of the lenticular lenses 31 and 32 are sufficiently low with respect to the focal distances of those lenses, so that the two lenticular lenses 31 and 32 can be regarded as equivalent to a single lenticular lens which has double the capability of those lenses. That is, the two lenticular lenses 31 and 32 shown in FIG. 6A are equivalent to a single lenticular lens 36 shown in FIG. 7 whose lens pitch is equal to the lens pitch of the lenticular lenses 31 and 32 and whose curvature is twice the curvature of the lenticular lenses 31 and 32.

As shown in FIG. 7, the lights that are output from the left-eye pixels 41 are refracted by the lenticular lens 36 and travel toward an area $E_L$. The lights that are output from the right-eye pixels 42 are refracted by the lenticular lens 36 and travel toward an area $E_R$. As the observer shifts the left eye 52 to the area $E_L$ and shifts the right eye 51 to the area $E_R$, therefore, an image for the left eye is input to the left eye 52 and an image for the right eye is input to the right eye 51 so that the observer can recognize a 3D image.

The case of displaying a 2D image will be discussed next. To display a 2D image by the switching display apparatus 1, as shown in FIG. 6B, the position of the lenticular lens 31 is adjusted by the actuator 6 in such a way that the optical axis of the lenticular lens 31 is shifted from the optical axis of the lenticular lens 32 by half the lens pitch in the direction 11. That is, each projection 31a of the lenticular lens 31 are made to face a portion between the projections 32a of the lenticular lens 32. At the time of switching between the display of a 3D image and the display of a 2D image, the lenticular lens 31 has only to be moved in the direction 11 with respect to the lenticular lens 32 by a distance 0.5 times the lens pitch, but may also be shifted by a distance equal to an integer multiple of the lens pitch added to the former distance, e.g, a distance 1.5 times the lens pitch. Then, the pixels 41 and 42 are made to display a 2D image. At this time, the pixels 41 and 42 display the same image independently. That is, the pixels 41 and 42 are driven as independent pixels to display the same image together. The resolution of a 2D image therefore becomes twice the resolution of the aforementioned 3D image.

As shown in FIGS. 4 and 6B, light output from the backlight 10 passes the glass substrate 23, the LC layer 24, the glass substrate 25, the color filter 26, the optical film 8 and the photo-curing adhesive layer 9 in the named order and enter the optical distributor 3. The light that has entered the optical distributor 3 is output in one direction by the lenticular lenses 32 and 31 of the optical distributor 3. As a result, the lights that have passed the pixels 41 and 42 are both input to the left eye 52 and the right eye 51 of the observer. This operation will be described in detail below.

In case where the optical axis of the lenticular lens 31 is shifted by half the lens pitch from the optical axis of the lenticular lens 32 in the direction 11, as shown in FIG. 6B, the lenticular lenses 31 and 32 become nearly equivalent to a single lenticular lens 37 whose lens pitch is half the lens pitch of the lenticular lenses 31 and 32 and whose curvature is twice the curvature of the lenticular lenses 31 and 32 as shown in FIG. 8.

The lights that are output from the pixels 41 and 42 are refracted by the lenticular lenses 31 and 32 and are output in the same direction. At this time, each pixel is magnified to an area in the observation plane which has a given width e and its cyclic pitch becomes e too. Therefore, the light output from the pixel 41 and the light output from the pixel 42 are both input to the left eye 52 and the right eye 51 of the observer. As a result, the same image is input to the left eye 52 and the right eye 51, so that the observer can recognize a 2D image.

The sizes of the individual sections of the switching display apparatus 1 will be discussed below. While the description will be given of the case where two lenticular lenses are used, the case of using a single lenticular lens will be discussed first using an optical model shown in FIG. 7. Let H be the thickness of the lenticular lens 36 and let n be its refractive index. Suppose that one side of the lenticular lens 36 is flat and the other side has multiple convex cylindrical lenses or semicylindrical projections 36a extending in one direction laid out along the direction 11. Let f be the focal distance of the lenticular lens and let L be the lens pitch. The pixels of the LCD unit 2 are laid out as sets each consisting of two pixels, a single left-eye pixel 41 and a single right-eye pixel 42. Let P be the width of each pixel. A set of two pixels, a single left-eye pixel 41 and a single right-eye pixel 42, corresponds to a single projection 36a. Let D be the distance between the lenticular lens 36 and the observer and let e be the lengths in the direction 11 of the area $E_L$ and the area $E_R$ which are 3D visible ranges, i.e., areas where the left eye 52 and the right eye 51 on a virtual plane apart from the lens by a distance D and parallel to the lens where the observer can recognize a 3D image. Further, let $W_L$ be a distance from the center of that projection 36a which is located at the center of the lenticular lens 36 to the center of that projection 36a which is located at an end of the lenticular lens 36, and let $W_P$ be a distance from the center of a pair of the left-eye pixel 41 and right-eye pixel 42 that are located at the center of the LCD unit 2 to the center of the pixel pair that is located at an end of the LCD unit 2. In addition, let α and β be respectively the incident angle and output angle of light on the projection 36a that is positioned at the center of the lenticular lens 36, and let γ and δ be respectively the incident angle and output angle of light on the projection 36a that is positioned at the end of the lenticular lens 36. Let C be the difference between the distance $W_L$ and the distance $W_P$ and let 2m be the number of pixels included in the area of the distance $W_P$.

Normally, as the lenticular lens is often designed in accordance with a display unit, P is treated as a constant. Further, n is determined by selecting the material for the lenticular lens. The distance D between the lens and the observer and the 3D visible range e are set to desired values. Using those values, the distance H between the lens surface and the pixels and the lens pitch L are determined. The following equations 1 to 6 are derived from the Snell's law and geometrical relationship. So are the following equations 7 to 9.

$$n \times \sin \alpha = \sin \beta \qquad \text{[Equation 1]}$$

$$D \times \tan \beta = e \qquad \text{[Equation 2]}$$

$$H \times \tan \alpha = P \qquad \text{[Equation 3]}$$

$$n \times \sin \gamma = \sin \delta \qquad \text{[Equation 4]}$$

$$H \times \tan \gamma = C \qquad \text{[Equation 5]}$$

$$D \times \tan \delta = W_L \qquad \text{[Equation 6]}$$

$$W_P - W_L = C \qquad \text{[Equation 7]}$$

$$W_P = 2 \times m \times P \qquad \text{[Equation 8]}$$

$$W_L = m \times L \qquad \text{[Equation 9]}$$

The following equations 10, 11 and 12 are derived from the equations 2, 1 and 3, respectively.

$$\beta = \arctan\left(\frac{e}{D}\right) \quad [\text{Equation 10}]$$

$$\alpha = \arcsin\left(\frac{\sin\beta}{n}\right) \quad [\text{Equation 11}]$$

$$H = \frac{P}{\tan\alpha} \quad [\text{Equation 12}]$$

The following equation 13 is derived from the equations 6 and 9. The following equation 14 is derived from the equations 7 to 9. Further, an equation 15 given below is derived from the equation 5.

$$\delta = \arctan\left(\frac{m \times L}{D}\right) \quad [\text{Equation 13}]$$

$$C = 2 \times m \times P - m \times L \quad [\text{Equation 14}]$$

$$\gamma = \arctan\left(\frac{C}{H}\right) \quad [\text{Equation 15}]$$

If the thickness H of the lenticular lens is set equal the focal distance f as given in the following equation 16, the radius of curvature, r, of the lens is acquired from the following equation 17.

$$f = H \quad [\text{Equation 16}]$$

$$r = H \times \frac{n-1}{n} \quad [\text{Equation 17}]$$

The following will illustrate one example of the specific sizes of the switching display apparatus 1. The sizes given below are exemplified to make the understanding of the embodiment easier and are not restrictive. Provided that a display unit with a pixel pitch P of 0.24 mm is used, polymethyl methacrylate (PMMA) having the refractive index n of 1.49 is used as the material for the lenticular lens, the distance D between the lens and an observer is 280 mm, the length e of the 3D visible range is 65 mm and the value of m is set to 60, for example, it is understood from the equations given above that the distance between the lens surface and the pixels should be set to 1.57 mm, the lens pitch L should be set to 0.4782 mm and the radius of curvature r of the lens should be set to 0.5161 mm.

Based on the results, the optical system that has two lenticular lenses is then designed. Because the two lenticular lenses 31 and 32 are equivalent to the single lenticular lens 36 as mentioned earlier, the radius of curvature R of the two lenticular lenses 31 and 32 is designed to be double the radius of curvature r of the single lenticular lens 36. That is, the following equation 18 is satisfied. The radius of curvature R of the two lenticular lenses 31 and 32 is, for example, 1.032 mm. The lenticular lenses are processed into the aforementioned shapes by a well-known scheme. The thicknesses of the lenticular lenses 31 and 32 are, for example, 0.5 mm. The gap between the lenticular lenses 31 and 32 is, for example, 30 μm. Further, the thicknesses of the glass substrates 23 and 25 are, for example, 0.7 mm, and the thickness of the optical film 8 is, for example, 0.15 mm.

$$R = 2 \times r \quad [\text{Equation 18}]$$

Figure 9:
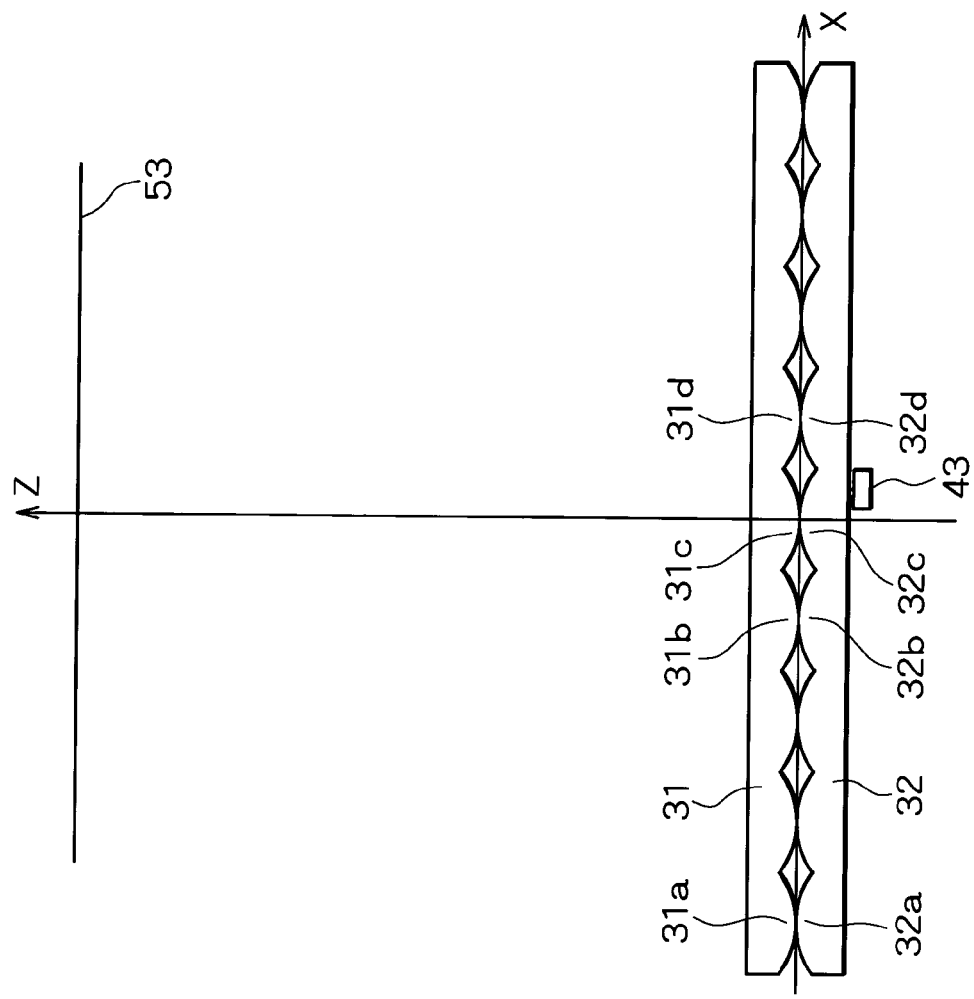
FIG. 9 is a diagram showing an optical model to be used in simulation in the embodiment and shows the layout at the time of displaying a 3D image.
Figure 10:
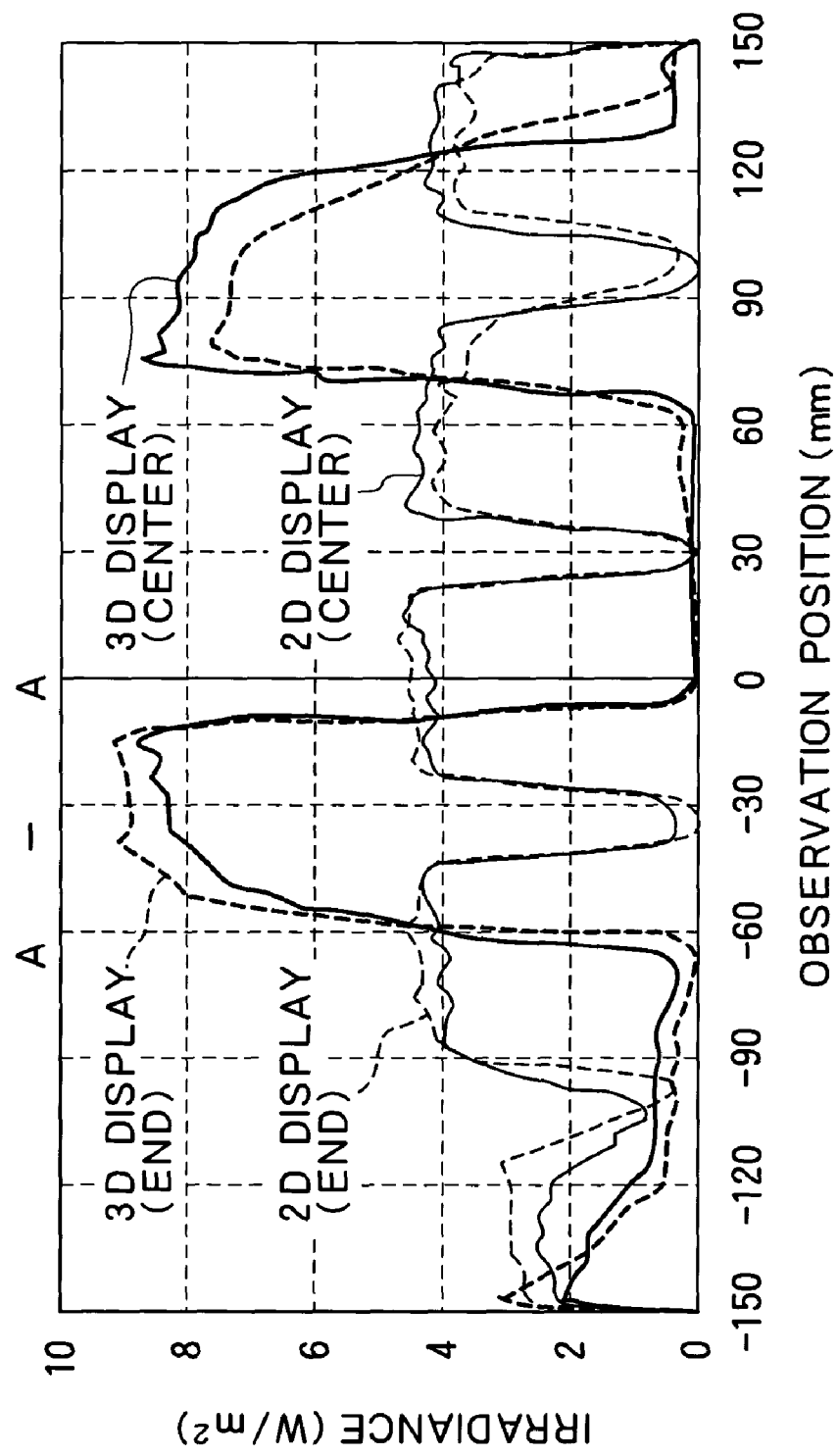
FIG. 10 is a graph showing the results of the simulation with the observation position taken on the horizontal axis and the irradiance at the observation position taken on the vertical axis.
Figure 11:
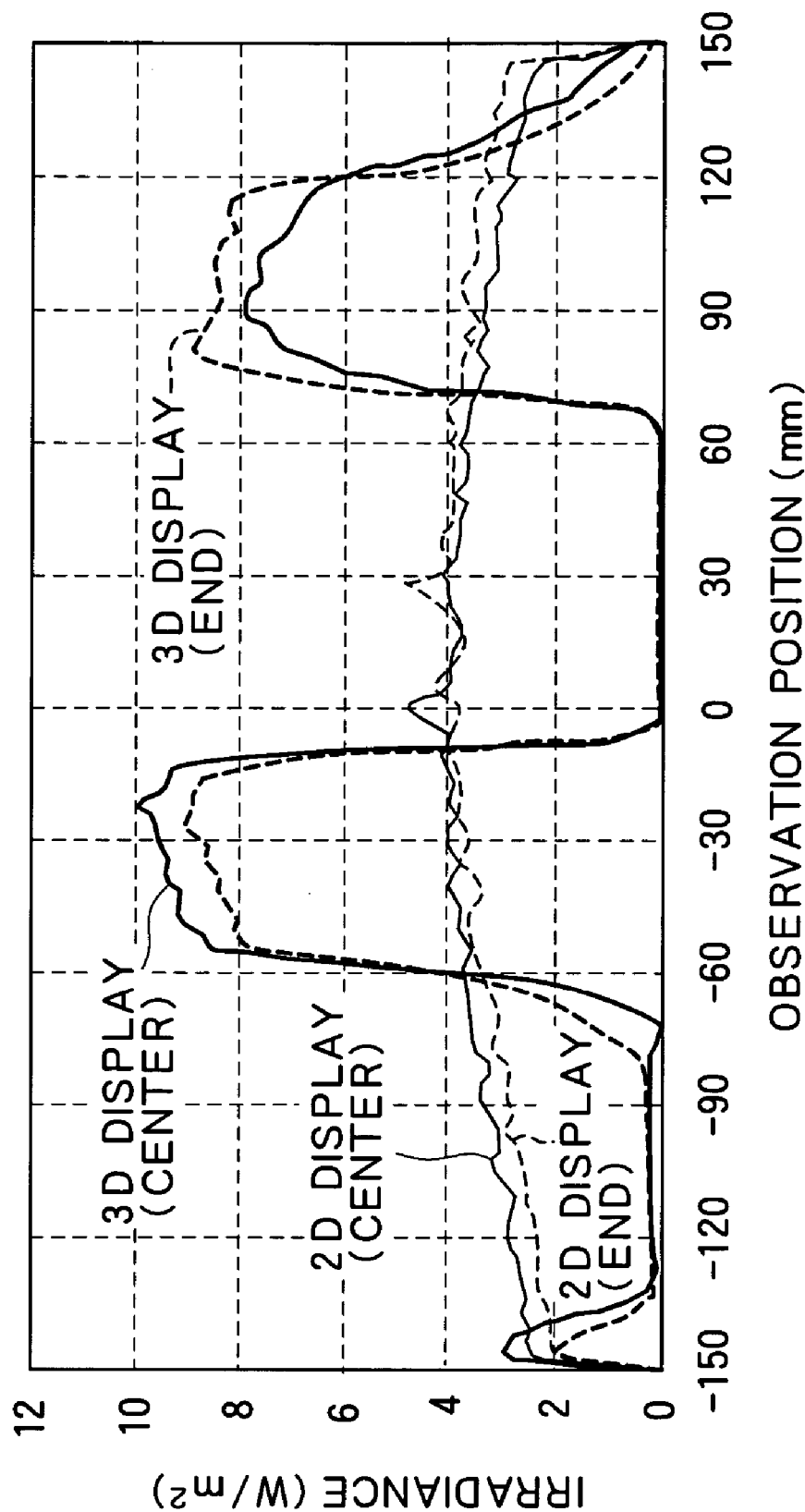
FIG. 11 is a graph showing the results of the simulation in case of displaying a 3D image using a single lenticular lens and in case of displaying a 2D image without using a lenticular lens with the observation position taken on the horizontal axis and the irradiance at the observation position taken on the vertical axis.

To study the properness of this design, computer-aided simulation is carried out using a ray tracing simulator available on the market. FIG. 9 is a diagram showing an optical model which is used in this simulation and shows the layout at the time of displaying a 3D image. FIG. 10 is a graph showing the results of the simulation with the observation position taken on the horizontal axis and the irradiance at the observation position taken on the vertical axis, and FIG. 11 is a graph showing the results of the simulation in case of displaying a 3D image using a single lenticular lens and in case of displaying a 2D image without using a lenticular lens with the observation position taken on the horizontal axis and the irradiance at the observation position taken on the vertical axis.

As shown in FIG. 9, nine semicylindrical projections 32a with the radius of curvature R of 1.032 mm are laid out on the display-unit side lenticular lens 32, the layout pitch (lens pitch) L is set to 0.4782 mm and the thickness H is set to 1.57 mm. The center of the projection 32c that is positioned at the center of the nine projections is set as the origin of simulation, the Z axis is set in the direction of the thickness and the X axis is set in the string direction of the lenses. As the observer side lenticular lens 31, a lens which has the same pitch and same radius of curvature as the lenticular lens 32 is used and its thickness is set to 0.5 mm. The lenticular lens 31 has its lens surface directed toward the display unit and abutting on the display-unit side lenticular lens 32.

As a pixel, a single illuminant 43 which is a light emitting area with a width of 0.186 mm is laid with the position of (x, z)=(0.12 mm, −1.57 mm) in the coordinate system as the center in such a way as to abut on the flat side of the display-unit side lenticular lens 32. That is, this setting is to permit light from the illuminant 43 to enter the right eye but not to enter the left eye. A non-display area of 0.027 mm is provided on either side of the light emitting area. Accordingly, an area of 0≦x≦0.027 mm and an area of 0.213≦x≦0.240 mm become non-display areas and an area of 0.027≦x≦0.213 mm becomes a light emitting area. The non-display areas are equivalent to light shielding portions that are arranged for the purpose of transferring a display signal to the pixels. A light receiving surface 53 equivalent to an observation position is set over an area of −150≦x≦+150 mm. In case where the display of a 2D image is simulated, the observer side lenticular lens 31 is shifted in the +X direction by half the lens pitch (0.2391 mm).

To evaluate the uniformity of the display screen, computation is likewise executed for those pixels which are positioned at the ends of the display screen. To achieve uniform display, it is a prerequisite and also a sufficient condition that the simulation result for the center of the display screen should coincide with the simulation result for the end of the display screen. This is because the display quality of a pixel located between the center and end of the display screen takes an intermediate value between the display quality of a pixel located at the center and the display quality of a pixel located at the end of the display screen, the display quality of the entire display screen can be evaluated by evaluating the display qualities of the center pixel and the end pixel. In the simulation on a pixel located at the end of the display screen, the center of the lens that is positioned at the end of the screen is set as the origin and two lenticular lenses are set as done for the center of the display screen. As a pixel, an illuminant having a width 0.186 mm is set with the position of x=0.227 mm as the center while an offset of C=0.107 mm is set in consideration of the difference between the lens pitch and the pixel pitch. The light receiving surface is set over an area of ±150 mm in the X direction with the position of (x, z)=(−28.692 mm, 280 mm) as the center. Those simulation results are illustrated in FIG. 11.

For the purpose of comparison, simulation is performed in the case where a 3D image is displayed using a single lenticular lens whose curvature is twice the curvature of the lenticular lenses 31 and 32 and in the case where a 2D image is displayed without using a lenticular lens. The simulation results are illustrated in FIG. 11.

In the simulation using the optical model shown in FIG. 9, the irradiance becomes higher in an area of −60≦x≦0 and becomes lower in the other area at the time of displaying a 3D image as shown in FIG. 10. Although a low peak is seen in an area of −150≦x≦−120 mm, it is the light that has passed the projections 32$b$ shown in FIG. 9. A peak seen in an area of −60≦x≦0 mm is the light that has passed the projection 32$c$ in the nine projections which is located at the center. Further, a peak seen in an area of 60≦x≦120 mm is the light that has passed the projection 32$d$ shown in FIG. 9.

In case where the distance between both eyes of an observer is 65 mm and the center position of both eyes is x=0 mm, for example, the position of the right eye becomes x=−32.5 mm and the position of the left eye becomes x=+32.5 mm. In case where display as shown in FIG. 10 is done, therefore, a sufficient amount of light enters the right eye but light hardly enters the left eye. This means that in case where the left-eye pixels are allowed to display an image for the left eye and the right-eye pixels are allowed to display an image for the right eye in the actual switching display apparatus 1 as shown in FIG. 4, the image for the left eye is input to the left eye and the image for the right eye is input to the right eye and the separation of both images is secured sufficiently, so that the observer can recognize a 3D image well.

In case where a 3D image is displayed using a single lenticular lens as shown in FIG. 11, approximately the same results as obtained in the case where two lenses shown in FIG. 10 are used are acquired, but the width of the image of a pixel projected in magnification becomes greater than that in the case where the two lenses shown in FIG. 10 are used. This is because the use of two lenses can reduce aberration as compared with the case of using a single lens equivalent to the two lenses, the blurriness of the projected image can be suppressed. That is, the use of two lenses can achieve the display of a high-quality 3D image which has lower aberration and is less likely to cause crosstalking as compared with the case of using a single lens.

At the time of displaying a 2D image, an area which reduces the irradiance in the period of about 60 mm appears. This is the area where the aforementioned non-display area is projected in magnification. Except for this area, the irradiance becomes approximately uniform over a wide area of −90≦x≦+150 mm.

In case where a 2D image is displayed without using the lenticular lens as shown in FIG. 11, a nearly uniform irradiance distribution is acquired over the entire observation area. Although an area in which a non-display area is projected in magnification or a non-2D visible range can be identified in case where a 2D image is displayed using the two lenticular lenses as shown in FIG. 11, as compared with the case where a 2D image is displayed without using the lenticular lens as shown in FIG. 11, the similar results are acquired, except for the dark portion, in case where the lens is not used.

That is, if the aforementioned non-2D visible range is avoided, even in case where two lenses are used, lights with irradiances equal to each other are input to the right eye and the left eye. This means that even in case where both the left-eye pixels and the right-eye pixels in the actual switching display apparatus 1 shown in FIG. 4 are used as independent pixels and a high-resolution 2D image is displayed, the same image can be input to the left eye and the right eye by adequately selecting the observation position and observing from, for example, the position of A—A shown in FIG. 10 and the observer can recognize a 2D image well.

Further, as shown in FIG. 10, the simulation results on the center pixel of the display unit approximately coincide with the simulation results on the end pixel for both a 3D image and a 2D image. Therefore, uniform display is achieved over the entire display screen. At the time the display-unit side lenticular lens is fixed to the LCD unit when assembling the switching display apparatus that is imagined in this simulation from the results shown in FIG. 10, it is apparent that the display-unit side lenticular lens can be laid out accurately by setting the two lenticular lenses in the state for the display of a 2D image and adjusting the lenticular lenses to the position where the brightness of the LCD unit is minimized as observed from the front side of the observer whose distance between both eyes is 65 mm.

The following will describe the reason for limited values of the individual structural elements of the invention.

The Clearance Between the First Lenticular Lens Portion and the Second Lenticular Lens Portion: 20% or Less of the Focal Distance of the Lens Element of the Virtual Lenticular Lens In case of using two lenses, the pixels are positioned at a position closer than the focal distance of the first lens, so that light output from one projection of the first lens enters the second lens in a wide range. Therefore, an increase in the clearance between the lenses increases the amount of light incident to the projections of the second lens other than the projection of the second lens, arranged at the position facing the projection of the first lens from which light has been output, thereby degrading the characteristic. For example, most of the light output from the projection 32$c$ shown in FIG. 9 is input to the projections 31$b$, 31$d$ and so forth. It is therefore necessary to set the clearance between the lenses within a given range.

To study the error allowance in the Z-axis direction in case where two lenticular lenses are laid out, i.e., the distance between the two lenticular lenses, simulation is performed while changing the positions of the lenses in the Z-axis direction. Simulation similar to the above-described simulation is carried out in case where the position of the observer side lenticular lens is set to distances of 5 μm, 50 μm, 100 μm and 500 μm in the positive Z-axis direction. The results are illustrated in FIG. 12.

Figure 12:
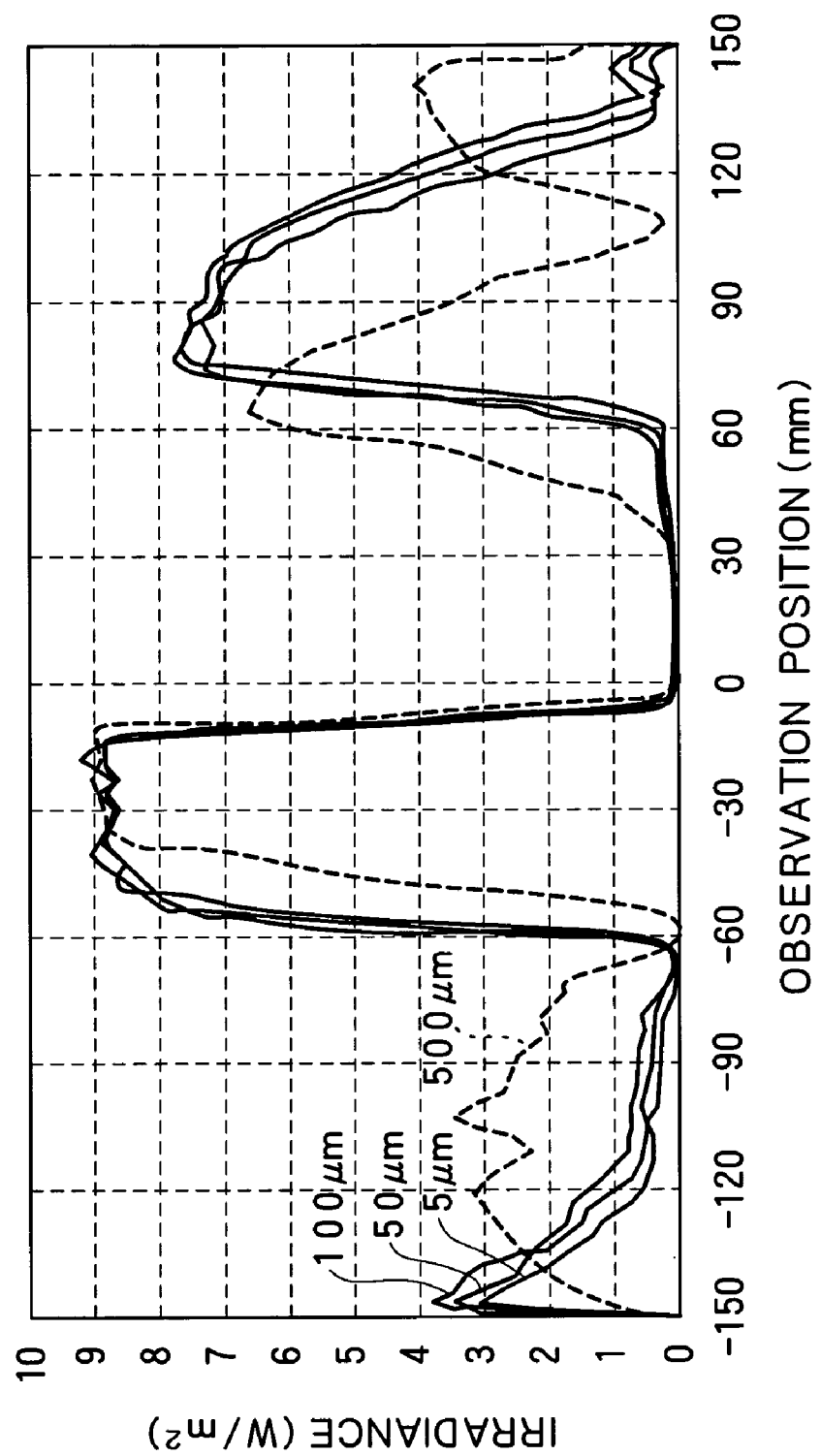
FIG. 12 is a graph showing the results of the simulation with the observation position taken on the horizontal axis and the irradiance at the observation position taken on the vertical axis.
Figure 13:
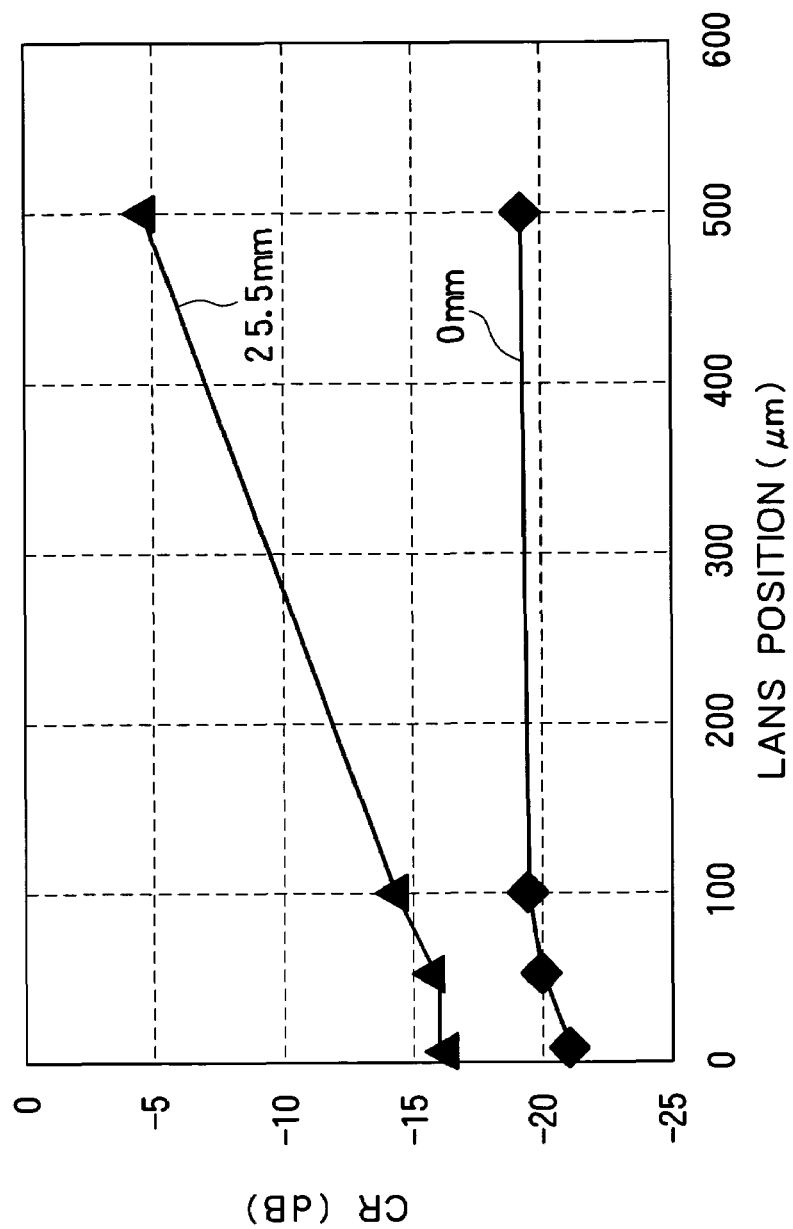
FIG. 13 is a graph showing the influence of the distance between lenticular lenses on the display quality of a 3D image with the horizontal axis showing the position of an observer on the Z axis of the lenticular lens and the vertical axis showing a contrast ratio CR.

FIG. 12 is a graph showing the results of the simulation with the observation position taken on the horizontal axis and the irradiance at the observation position taken on the vertical axis, and FIG. 13 is a graph showing the influence of the distance between lenticular lenses on the display quality of a 3D image with the horizontal axis showing the position of an observer on the Z axis of the lenticular lens and the vertical axis showing a contrast ratio CR. In the simulation results shown in FIG. 12, the result of computing the contrast ratio at the position of the center of both eyes x=0 mm (i.e., the position of the right eye is x=−32.5 mm and the position of the left eye is x=32.5 mm) and with the distance between both eyes set to 65 mm is what is seen at "0 mm" illustrated in FIG. 10. The result of computing the contrast ratio at the position of the center of both eyes x=25.5 mm (i.e., the position of the right eye is x=−7 mm and the position of the left eye is x=58 mm) and with the distance between both eyes set to 65 mm is what is seen at "25.5 mm" illustrated in FIG. 10.

Crosstalk is introduced as the index to quantitatively evaluate the display characteristic. The crosstalk is evaluated by the contrast ratio CR and the greater the absolute value of the value CR is, the less crosstalk occurs, thus realizing good 3D display. Given that $i_R$ is the irradiance of light incident to the right eye and $i_L$ is the irradiance of light incident to the left eye, the contrast ratio CR is defined by the following equation 19. According to the document titled "3D Display Without Multiple-eye glasses" by Haruo Isono, NHK STRL R&D, Vol. 2, p. 13–17, 1993), the contrast ratio CR should be less than about −7.8 dB or {(irradiance of an image for the right eye)/(irradiance of an image for the left eye)}<(1/6) in order to ensure good 3D display.

$$CR = 10 \times \log\left(\frac{i_R}{i_L}\right)$$ [Equation 19]

As shown in FIG. 12, with the position of the observer side lenticular lens being z≦100 μm, a large change in display characteristic is not seen even if the distance between lenses increases. With the position of the observer side lenticular lens becoming z≦500 μm, however, while nearly same results as obtained in the case of z≦100 μm are acquired when the observation position lies in an area of −35≦x≦35 mm, the display characteristic is degraded in the other area.

In case where the positions of the right and left eyes are set to the positions of x=±32.5 mm, i.e., the position of the center of both eyes is x=0 mm, as shown in FIG. 13, no significant deterioration of the characteristic occurs even if the lens position is 500 μm. In consideration of the case where the right and left eyes have been shifted within a range of ±60 mm, it is necessary to make evaluation in case where the position of the center of both eyes is x=25.5 mm. In case where the position of the center of both eyes is x=25.5 mm as shown in FIG. 13, as the lens clearance increases, the deterioration of the characteristic is seen and the characteristic becomes significantly degraded when the position of the observer side lenticular lens becomes z=500 μm. As apparent from FIG. 13, it is preferable that the clearance between the lenticular lenses should be set within 320 μm to realize CR<−7.8 dB even at an end of the observation area of ±60 mm.

As this value is the allowable value set for the display unit and the lenses in this simulation, the allowable value is expressed by an ordinary index. In general, the focal distance is the quantity that becomes a reference for the length of the lens in the direction of the optical axis. In the simulation, the allowable value for the distance between both eyes is 320 μm and the lens's focal distance f, which is equal to the thickness H of the lens as apparent from the equation 16, is 1.57 mm. Therefore, the allowable value for the distance between both eyes is equivalent to 20% of the focal distance. In other words, it is preferable that the allowable value for the distance between both eyes should lie within 20% of the focal distance.

The Amount of Deviation Between the Optical Axis of that Lens element which is Positioned at the Center of the First Lenticular Lens Portion and the Optical Axis of that Lens Element which is Positioned at the Center of the Second Lenticular Lens Portion: 12% or Less of the Layout Cycle of the Lens Elements of the First Lenticular Lens Portion To study the error allowance in the X-axis direction in case where two lenticular lenses are laid out, i.e., the allowable value for the distance between optical axes of the two lenticular lenses in carrying out 3D display, simulation is performed while changing the positions of the lenses in the X-axis direction. Specifically, simulation is carried out while changing the position of the observer side lenticular lens in the X-axis direction to x=0 μm, ±30 μm, ±50 μm and ±100 μm with respect to the display-unit side lenticular lens. It is to be noted that x=0 indicates the case where the center of the observer side lenticular lens matches with the center of the display-unit side lenticular lens and the optical axes of both lenticular lenses coincide with each other, as seen from a direction parallel to the optical axis of the lenticular lens.

Figure 14:
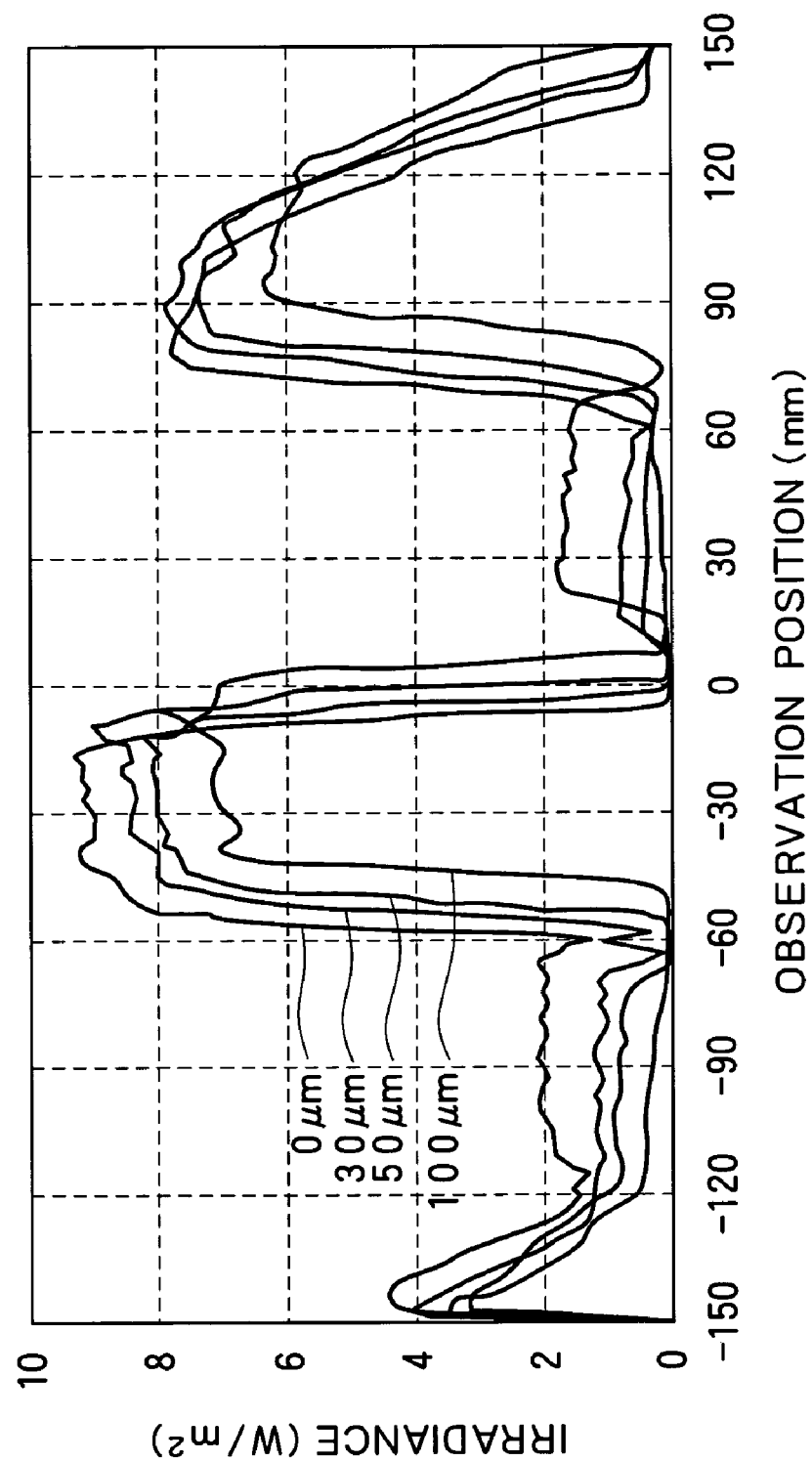
FIG. 14 is a graph showing the results of the simulation with the observation position taken on the horizontal axis and the irradiance at the observation position taken on the vertical axis.
Figure 15:
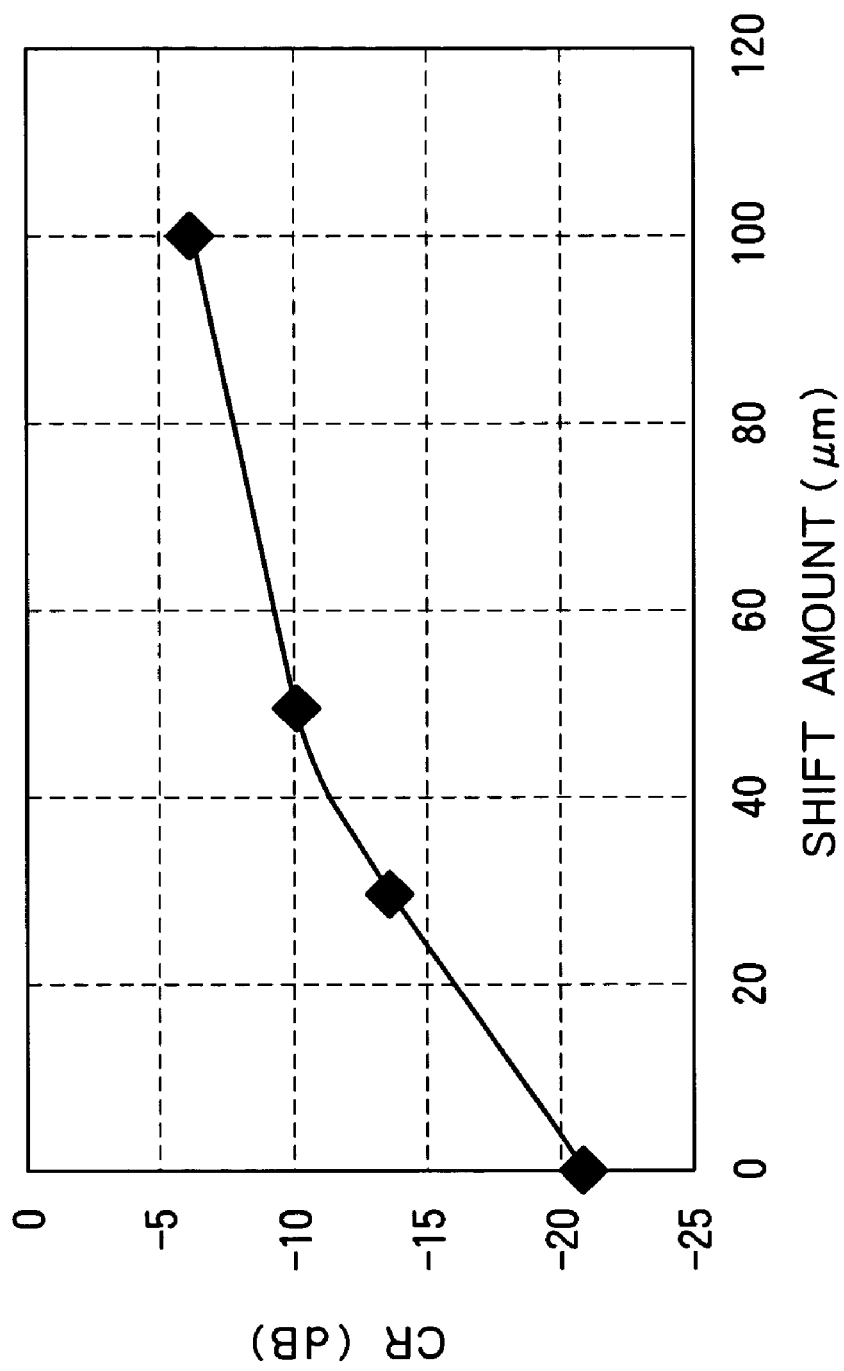
FIG. 15 is a graph showing the influence of the distance between lenticular lenses on the display quality of a 3D image with the horizontal axis showing the position of an observer on the X axis of the lenticular lens and the vertical axis showing a contrast ratio CR.

FIG. 14 is a graph showing the results of the simulation with the observation position taken on the horizontal axis and the irradiance at the observation position taken on the vertical axis, and FIG. 15 is a graph showing the influence of the distance between lenticular lenses on the display quality of a 3D image with the horizontal axis showing the position of an observer on the X axis of the lenticular lens and the vertical axis showing the contrast ratio CR. Although FIGS. 14 and 15 show the simulation results only in the range of x≧0, the simulation results in the range of x<0 are the same as those in the range of x≧0.

It is apparent from FIG. 14 that as the positional deviation between the lenses gets larger, the characteristic is degraded from near the center of the observation area. This phenomenon seems to have occurred due to an increase in stray light traveling from one projection of the display-unit side lens to projections adjoining the projection of the observer side lens which faces the former projection. As shown in FIG. 15, to achieve the contrast ratio CR<−7.8 dB, the amount of deviation of the lenticular lenses should be set to ±60 μm or less.

Because this value is the allowable value set for the display unit and the lenses in this simulation as per the case of the Z-axis direction, the allowable value is expressed by an ordinary index. In general, the lens pitch is the quantity that becomes a reference for the length of the lenticular lens in a direction perpendicular to the optical axis of the lens. In the simulation, the allowable value for the amount of deviation between lenses is ±60 μm and the lens pitch L is 0.4782 mm. Therefore, the allowable value for the amount of deviation of the lenses in the X-axis direction is equivalent to 12% of the lens pitch. In other words, it is preferable that the amount of deviation between the optical axes of two lenses should be set within ±12% of the lens pitch.

As described above, the 3D image/2D image switching display apparatus according to the embodiment switches between the display of a 3D image and the display of a 2D image by combining two lenticular lenses are combined and moving one of the lenticular lenses by half the lens pitch in the direction perpendicular to the optical axis with respect to the other lenticular lens. The switching display apparatus does not therefore require large-scale switching means to switch image display. The short moving distance of the lens can contribute to making the switching display apparatus thinner, smaller and lighter and reducing the cost. The short moving distance of the lens can also ensure fast switching between the display of a 3D image and the display of a 2D image. In addition, as there is no switching means that intervenes the light passing area, the display quality does not get lower.

The embodiment requires neither a pump nor a tank or the like as compared with, for example, the prior art described in Japanese Patent Publication Laid-Open No. 068961/1996 and Japanese Patent Publication Laid-Open No. 112273/1992, which injects and discharges a liquid substance having the same refractive index as the material for the lenticular lens. This can reduce the size and cost of the apparatus. The requirement of neither injection nor discharge of a liquid substance can ensure fast switching of image display and does not raise the problem of incomplete injection and incomplete discharge, thus ensuring high-quality display. Further, as compared with the prior art described in Japanese Patent Publication Laid-Open No. 197343/1997, which makes the distance between the lenticular lens and the image display unit variable, the embodiment requires no space to make the distance variable and can thus make the apparatus thinner. Furthermore, as it is unnecessary to provide an expensive fiber face plate, the cost can be made lower. In short, the embodiment can provide a 3D image/2D image switching display apparatus which has features, such as thin in size, small in size and light in weight, fast switching, high-quality display and low cost.

The 3D image/2D image switching display apparatus according to the embodiment can therefore be suitably adapted to portable devices, such as a portable telephone, and can display both good 3D and 2D images. When the 3D image/2D image switching display apparatus according to the embodiment is adapted to a portable device, unlike in the case when the apparatus is adapted to a large display apparatus, an observer can arbitrarily adjust the positional relationship between his both eyes and the display screen so that the optimal visible range can be found promptly.

Although the switching display apparatus according to the embodiment has a backlight provided as a light source, a front-light may be provided in place of the backlight. In this case, in consideration of light rays incident to the LCD unit, it is preferable to provide a light source at an end portion of the display-unit side lenticular lens and cause light from the light source to be input to the display-unit side lenticular lens. At this time, the irregular surface of the display-unit side lenticular lens serves as grooves to scatter the incident light toward the LCD unit, thus making it unnecessary to particularly form grooves for the front-light.

The portable terminal device according to the embodiment can be adapted to a portable terminal device, such as a portable terminal, PDA, a game machine, a digital camera or a digital video, as well as a portable telephone. Further, beside a LCD unit, an organic electroluminescence display unit, a plasma display unit, a CRT display unit, a LED display unit, a field emission display unit, PALC (Plasma Address Liquid Crystal) or the like may be used as the display unit. Even in case of using a LCD unit, not only an ordinary transmission type LCD unit but also a reflection type LCD unit, a transflective type LCD unit, a visible everywhere transflective type LCD unit or the like can be used. The portable terminal device according to the embodiment can also be adapted to a still image like a print.

Figure 16:
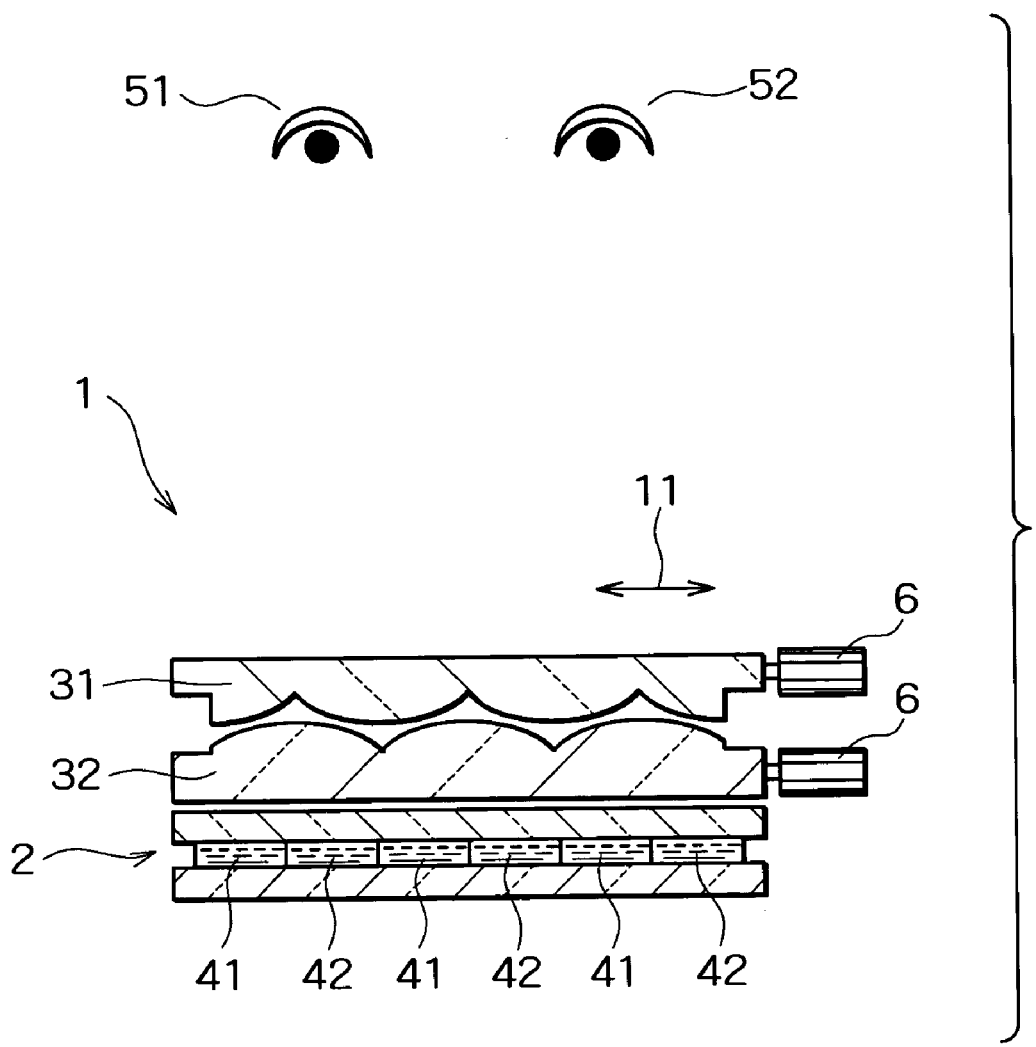
FIG. 16 is a cross-sectional view showing a 3D image/2D image switching display apparatus according to a second embodiment of the invention and shows a 2D-image display state.
Figure 17:
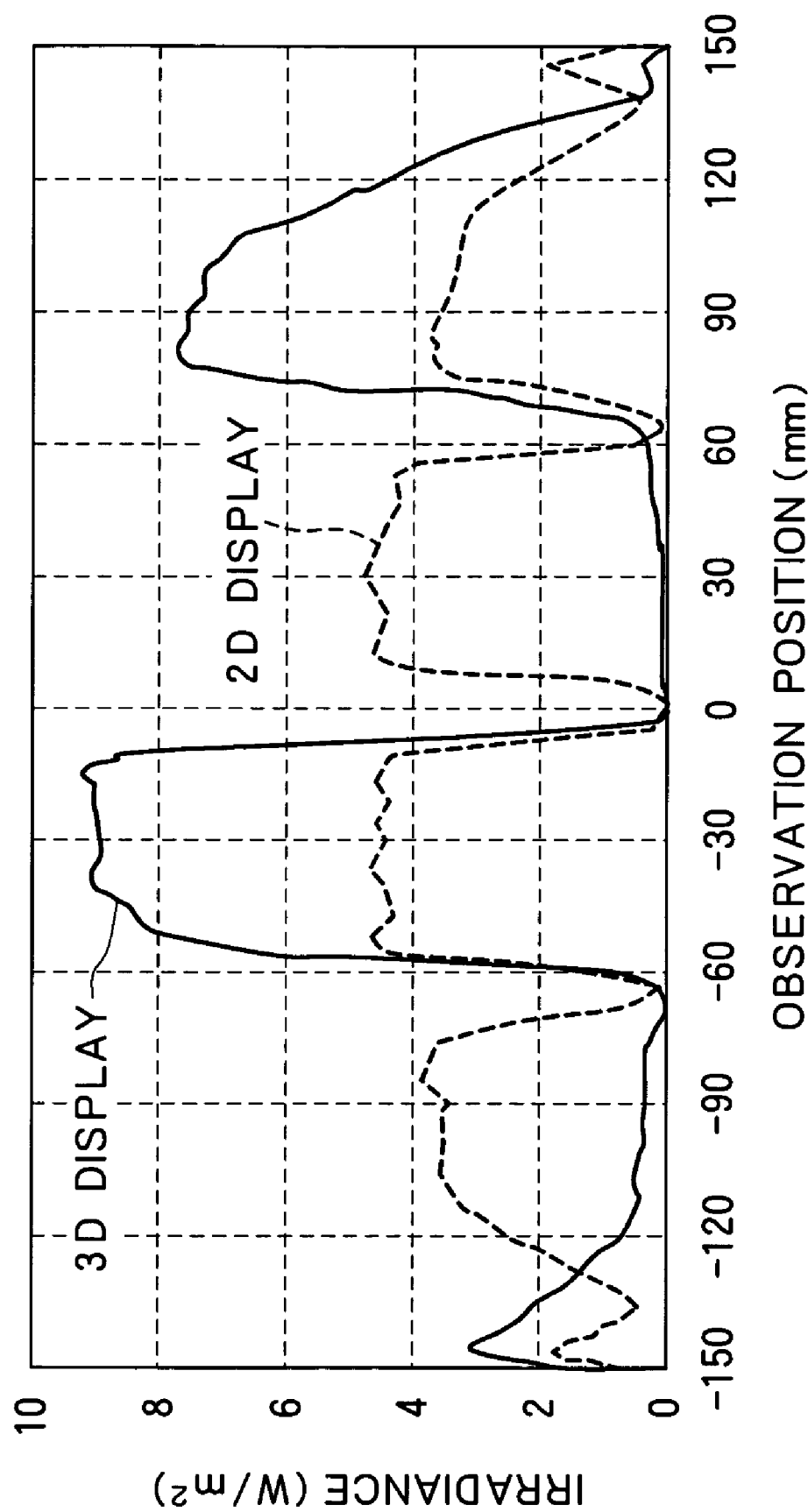
FIG. 17 is a graph showing the results of the simulation on the apparatus shown in FIG. 16, with the observation position taken on the horizontal axis and the irradiance at the observation position taken on the vertical axis.

The second embodiment of the invention will be described below. FIG. 16 is a cross-sectional view showing a 3D image/2D image switching display apparatus according to the embodiment, and shows a 2D-image display state. FIG. 17 is a graph showing the results of the simulation on the apparatus shown in FIG. 16, with the observation position taken on the horizontal axis and the irradiance at the observation position taken on the vertical axis. The embodiment is characterized in that the positions of the lenticular lenses at the time of displaying a 2D image are shifted by a quarter (¼) of the lens pitch, with respect to the pixels of the display unit, from the positions taken at the time of displaying a 3D image.

According to the first embodiment, because the non-display area of a pixel is magnified too at the time of displaying a 2D image as shown in FIG. 10, a non-2D visible range where a 2D image cannot be identified is produced in the 2D visible range. As this non-2D visible range overlaps a 3D visible range, the 2D visible range and the 3D visible range are deviated from each other. At the time of switching between the display of a 3D image and the display of a 2D image, therefore, the viewpoint should be shifted for observation which is troublesome.

To solve this problem, the non-2D visible range and the 3D visible range should not coincide with each other. There are two possible ways to achieve it. The first solution is to shift the lens position at the time of displaying a 2D image by ¼ of the lens pitch with respect to the display unit. The second solution is to set the 3D visible range large. The first solution will be discussed in the following description of the second embodiment.

According to the first embodiment, the curved surface of the virtual lens that is obtained by arranging two lenticular lenses shifted by half a lens pitch from each other has half the pitch of the original lenticular lenses and its optical axis coincides with the center of each pixel. As a result, the pixel is projected in magnification with the center of the observation position as the center. According to the second embodiment, therefore, the positions of the two lenticular lenses and the positions of the pixels are shifted by ¼ of the lens pitch along the direction 11 as shown in FIG. 16. As a result, the optical axis of the curved surface of the equivalent virtual lens is shifted by ¼ of the lens pitch with respect to the center of each pixel. Therefore, the center of the magnified image is also shifted by ¼ of the lens pitch of the magnified. This can allow the 2D visible range and the 3D visible range to coincide with each other.

As shown in FIG. 16, while the 3D image/2D image switching display apparatus according to the embodiment uses the same LCD unit 2 and lenticular lenses 31 and 32 as used in the first embodiment, the display-unit side lenticular lens 32 is not adhered to the LCD unit 2 but arranged with a clearance of, for example, about 20 μm from the LCD unit 2. In addition, an actuator 6 for moving the display-unit side lenticular lens 32 in the lens string direction 11 is also attached to the lenticular lens 32. The other structure of the switching display apparatus of the embodiment than is mentioned above is the same as that of the first embodiment.

The operation of the switching display apparatus according to the embodiment will be described next. At the time of displaying a 3D image, the actuators are operated in such a way that the optical axes of the two lenticular lenses match with the center of a pair of pixels at the center of the display screen. At the time of displaying a 2D image, the optical axis of the display-unit side lenticular lens 32 is shifted by ¼ of the lens pitch in the direction 11 by actuating the associated actuator and the optical axis of the observer side lenticular lens 31 is shifted by ¼ of the lens pitch in the direction opposite to the moving direction of the lenticular lens 32 by actuating the associated actuator. As a result, the optical axis of the lenticular lens 31 and the optical axis of the lenticular lens 32 are shifted by half the lens pitch and the optical axis of the single lens equivalent to the two lenses is shifted by ¼ of the lens pitch with respect to each pixel.

The same results can be acquired, regardless of the moving direction of each lens, as long as the two lenses move in the opposite directions. The other operation of the switching display apparatus of the embodiment than is discussed above is the same as that of the first embodiment. The above-described operation can allow the 3D visible range at the time of displaying a 3D image to coincide with the 2D visible range at the time of displaying a 2D image, thus achieving excellent display of a 3D image and display of a 2D image.

FIG. 17 shows the results of the computed-aided simulation on the optical system shown in FIG. 16. The other conditions in the simulation than are mentioned above are the same as the simulation conditions in the first embodiment. As shown in FIG. 17, the simulation results of the second embodiment show that the 2D visible range match with the 3D visible range.

As the embodiment can apparently permit the 2D visible range to match with the 3D visible range, the viewpoint need not be shifted at the time of switching between the display of a 3D image and the display of a 2D image. The other effects of the switching display apparatus of the embodiment than are mentioned above are the same as those of the first embodiment.

Figure 18:
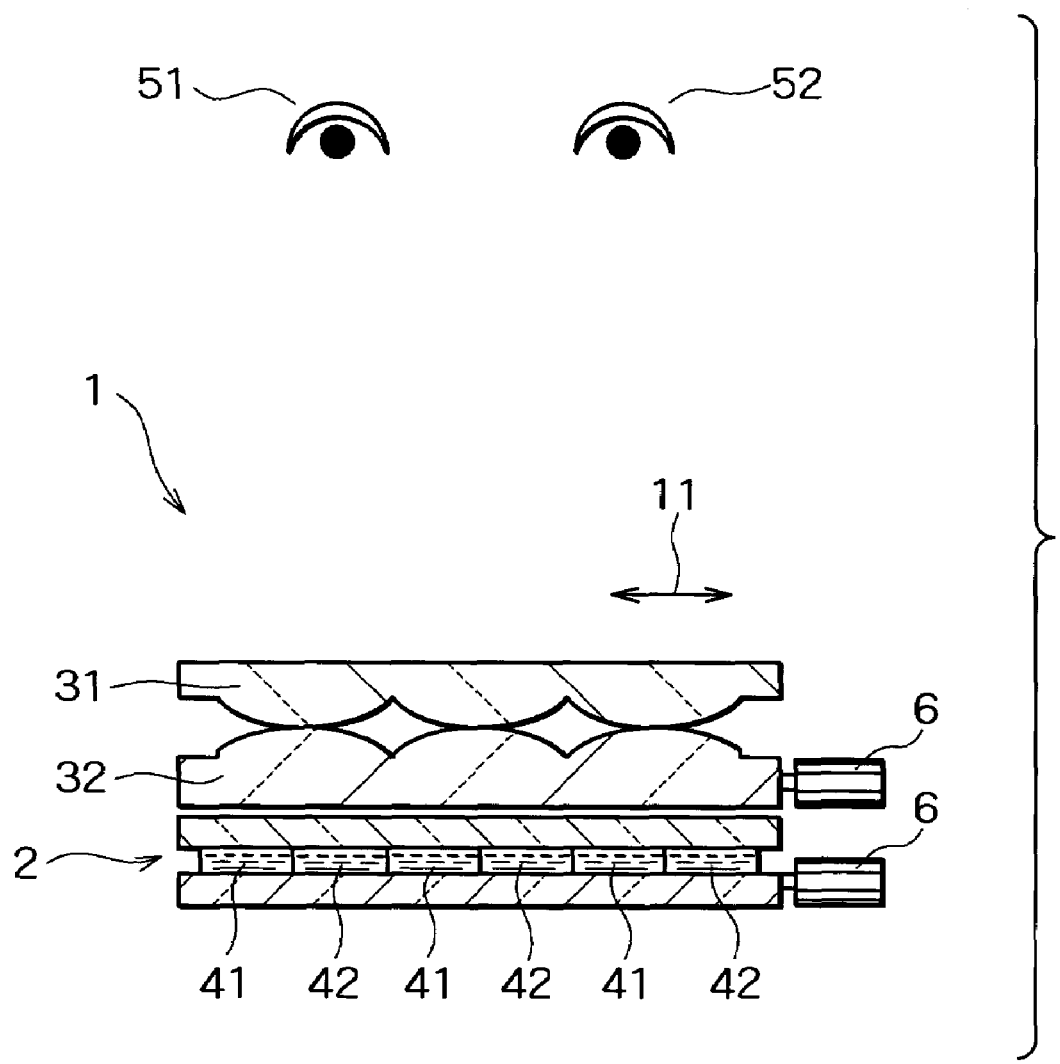
FIG. 18 is a cross-sectional view showing a 3D image/2D image switching display apparatus according to a third embodiment of the invention and shows a 3D-image display state.

The third embodiment of the invention will be described below. FIG. 18 is a cross-sectional view showing a 3D image/2D image switching display apparatus according to the embodiment and shows a 3D-image display state. As shown in FIG. 18, the switching display apparatus according to the embodiment differs from the switching display apparatus according to the second embodiment in that the actuators 6 are attached to the LCD unit 2 and the display-unit side lenticular lens 32. The other structure of the embodiment than that difference is the same as that of the second embodiment.

Accordingly, the switching display apparatus of the invention switches between the display of a 3D image and the display of a 2D image by moving the LCD unit 2 and the display-unit side lenticular lens 32, not moving the two lenticular lenses 31 and 32 as done in the switching display apparatus of the second embodiment. Specifically, at the time of displaying a 3D image, the actuator 6 attached to the lenticular lens 32 and the actuator 6 attached to the LCD unit 2 are operated in such a way that the optical axes of the two lenticular lenses coincide with the portion between the pixels at the center of the display screen. At the time of displaying a 2D image, the actuator 6 attached to the lenticular lens 32 is operated to shift the optical axis of the lenticular lens 32 by half the lens pitch in the string direction 11 of the lens elements and the actuator 6 attached to the LCD unit 2 is operated to shift the position of the LCD unit 2 by ¼ of the lens pitch in the direction opposite to the moving direction of the lenticular lens 32. As a result, the relative positional relationship between the lenticular lenses 31 and 32 and the LCD unit 2 becomes the same as the one obtained at the time of displaying a 2D image in the second embodiment. The other operation of the embodiment than is discussed above is the same as that of the second embodiment.

In case where the topmost surface of the apparatus is made movable, it is very likely that an operational failure occurs due to the influence of dust or the like. This therefore requires that a protection plate be provided further on the observer side to the observer side lenticular lens in which case the thickness of the protection plate increases the overall thickness of the apparatus. According to the embodiment, therefore, the observer side lenticular lens is fixed and the actuators are attached to the display-unit side lenticular lens and the LCD unit to make both movable. This can provide the observer side lenticular lens with the capability of the protection plate and thus make the overall apparatus thinner. The observer side lenticular lens can also be provided with the capability of a touch panel or a front-light. In case where the capability of a front-light is provided, particularly, grooves to scatter light toward the LCD unit may be provided in the observer side flat side of the observer side lenticular lens or light may be scattered toward the LCD unit by the irregular surface of the lenticular lens, thereby eliminating the need to form such grooves.

As apparent from the above, the embodiment can allow the 3D visible range at the time of displaying a 3D image to coincide with the 2D visible range at the time of displaying a 2D image and can thus realize a thin and highly-reliable 3D image/2D image switching display apparatus. The other effects of the embodiment than are mentioned above are the same as those of the second embodiment.

The fourth embodiment of the invention will be described below. FIG. 19 is a cross-sectional view showing a 3D image/2D image switching display apparatus according to the embodiment of the invention and shows a 3D-image display state. In the description of this embodiment, the second solution to make the 3D visible range coincide with the 2D visible range, which is mentioned in the foregoing description of the second embodiment, i.e., the scheme of setting the 3D visible range large will be discussed. As shown in FIG. 19, the focal distances of the lenticular lenses 31 and 32 in the switching display apparatus of the embodiment are made shorter than those of the switching display apparatus according to the first embodiment. The other structure of the embodiment than that difference is the same as that of the first embodiment.

The embodiment makes the 3D visible range larger than the one in the first embodiment. As the 3D visible range becomes larger, the 2D visible range inevitably becomes larger. The 3D visible range and 2D visible range are designed in such a way as to overlap each other at the positions of both eyes of the observer. The designing scheme will be discussed below. It is assumed that the left eye is positioned at, for example, x=32.5 mm, and the right eye at, for example, x=−32.5 mm in FIG. 10. In this case, both eyes are positioned in the non-2D visible range where the non-display area in the 2D display is projected in magnification so that the observer cannot recognize a 2D image. As the 3D image and 2D image are magnified in the ±X direction with the position of X=0 as the center, the 2D visible range at the position of −20≦x≦20 mm is magnified in the ±x direction in FIG. 10 and the ends of the 2D visible range reach the positions of the both eyes (x=±32.5 mm) so that the observer can recognize a 2D image. When the images are further magnified, however, the 3D visible range at the position of −50≦x≦−10 is shifted in the −x direction to come off the position of the right eye (x=−32.5 mm), so that the observer cannot recognize a 3D image.

FIGS. 20A and 20B are exemplary graphs showing the allowable ranges of a 3D visible range and a 2D visible range, with the observation position taken on the horizontal axis and the irradiance at the observation position taken on the vertical axis. Given that $W_{BM}$ is the total width of the non-display portions of two adjoining pixels and $W_{eye}$ is the distance between both eyes, the allowable width, $W_{3D}$, of the 3D visible range shown in FIG. 20A is the distance from the positions of the eyes to the non-2D visible range and is given by the following equation 20. The allowable width, $W_{2D}$, of the 2D visible range is the distance from the eyes to the non-2D visible range and is given by the following equation 21.

$$W_{3D} = \frac{W_{eye}}{2} - \frac{e \times W_{BM}}{2 \times P} \quad \text{[Equation 20]}$$

$$W_{2D} = \frac{e}{2} - \frac{W_{eye}}{2} - \frac{e \times W_{BM}}{2 \times P} \quad \text{[Equation 21]}$$

The case where $W_{3D}$ and $W_{2D}$ match with each other is the case where a 3D image and a 2D image can be recognized within the largest range. At this time, the following equation 22 is satisfied. This is tantamount to setting the 3D visible range to twice the distance between both eyes.

$$e = 2 \times W_{eye} \quad \text{[Equation 22]}$$

One example of the sizes of the 3D image/2D image switching display apparatus according to the embodiment based on the above-described design will be described below. For example, the radius of curvature of the lenticular lens is 0.747 mm and the lens pitch is 0.4791 mm. Further, the thickness of the display-unit side lens plate is 0.3 mm. The sizes of the other portions of this switching display apparatus are the same as those of the first embodiment illustrated earlier. As the 3D image/2D image switching display apparatus is operated in the same way as done in the first embodiment and observation is made at a position 400 mm apart from the lenticular lens, an observation can be made both at the time of displaying a 3D image and at the time of displaying a 2D image without changing the viewpoint. The visible range in either case can be secured to ±18 mm from the center of the visible range, which would provide the 3D image/2D image switching display apparatus with a wider range for observation.

Figure 22:
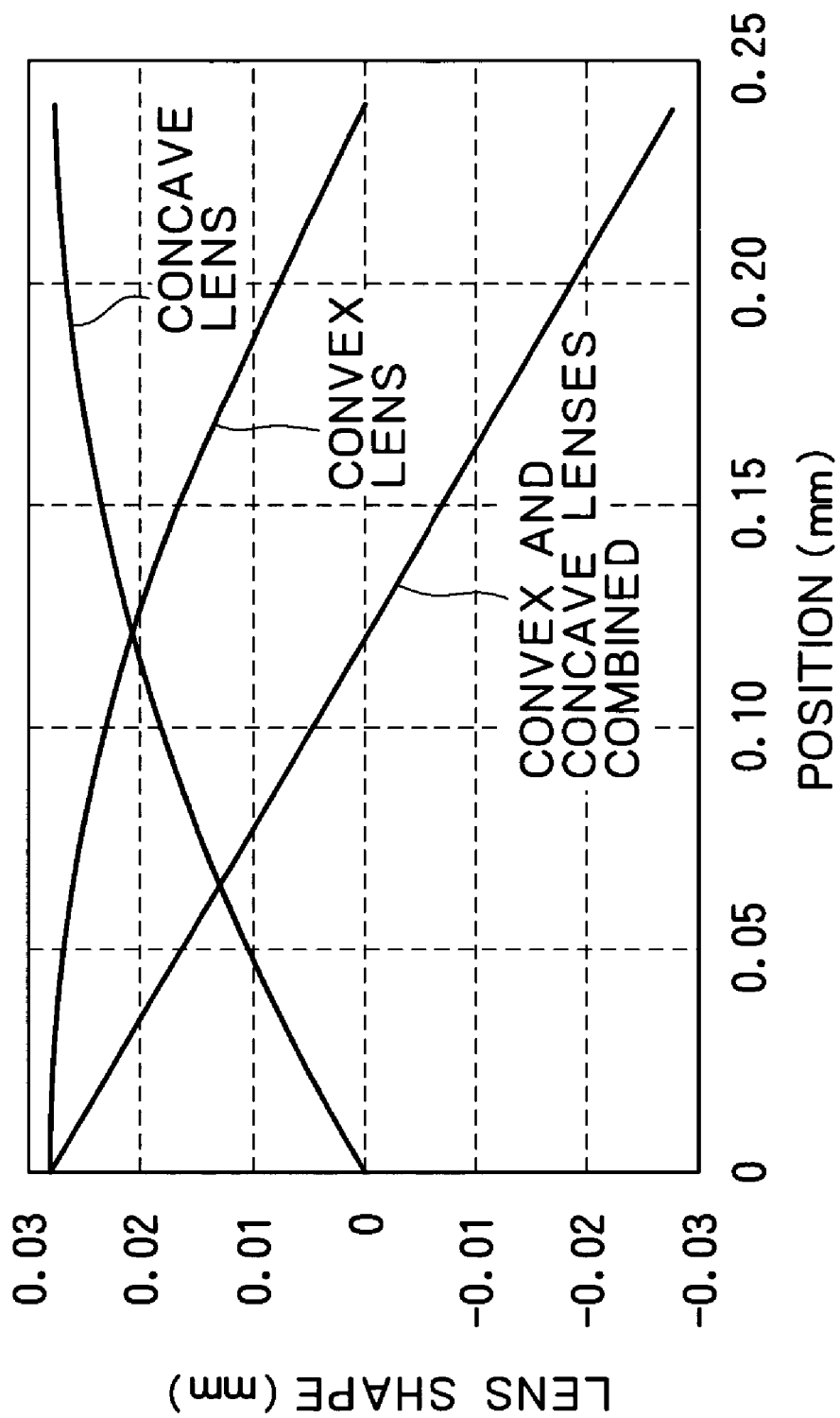
FIG. 22 is a graph showing the shape of a lens with the position on the lens perpendicular to the optical axis taken on the horizontal axis and the height of the lens at the position taken on the vertical axis.
Figure 23:
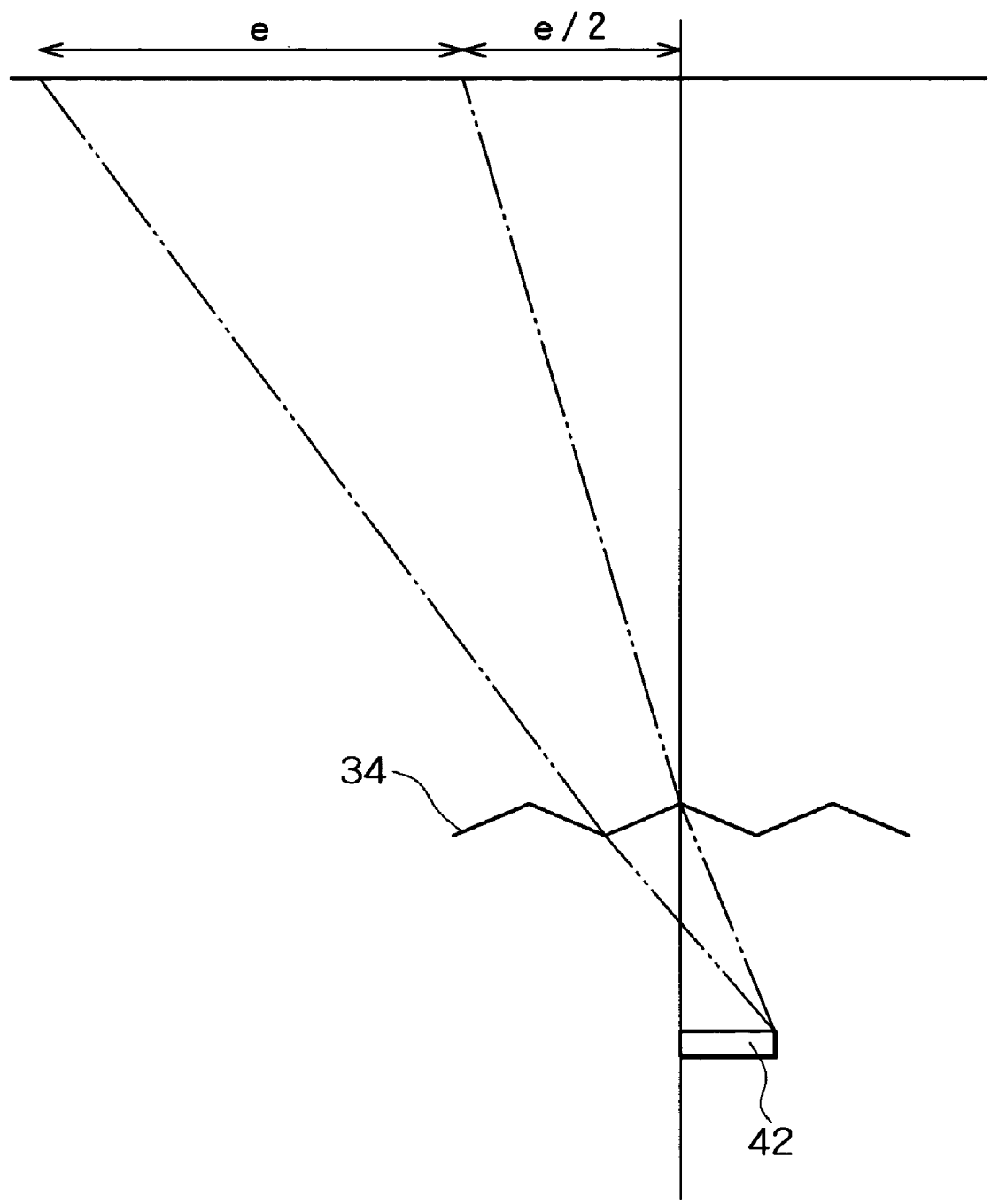
FIG. 23 is a diagram showing the path of light output from one end portion of one pixel.
Figure 25:
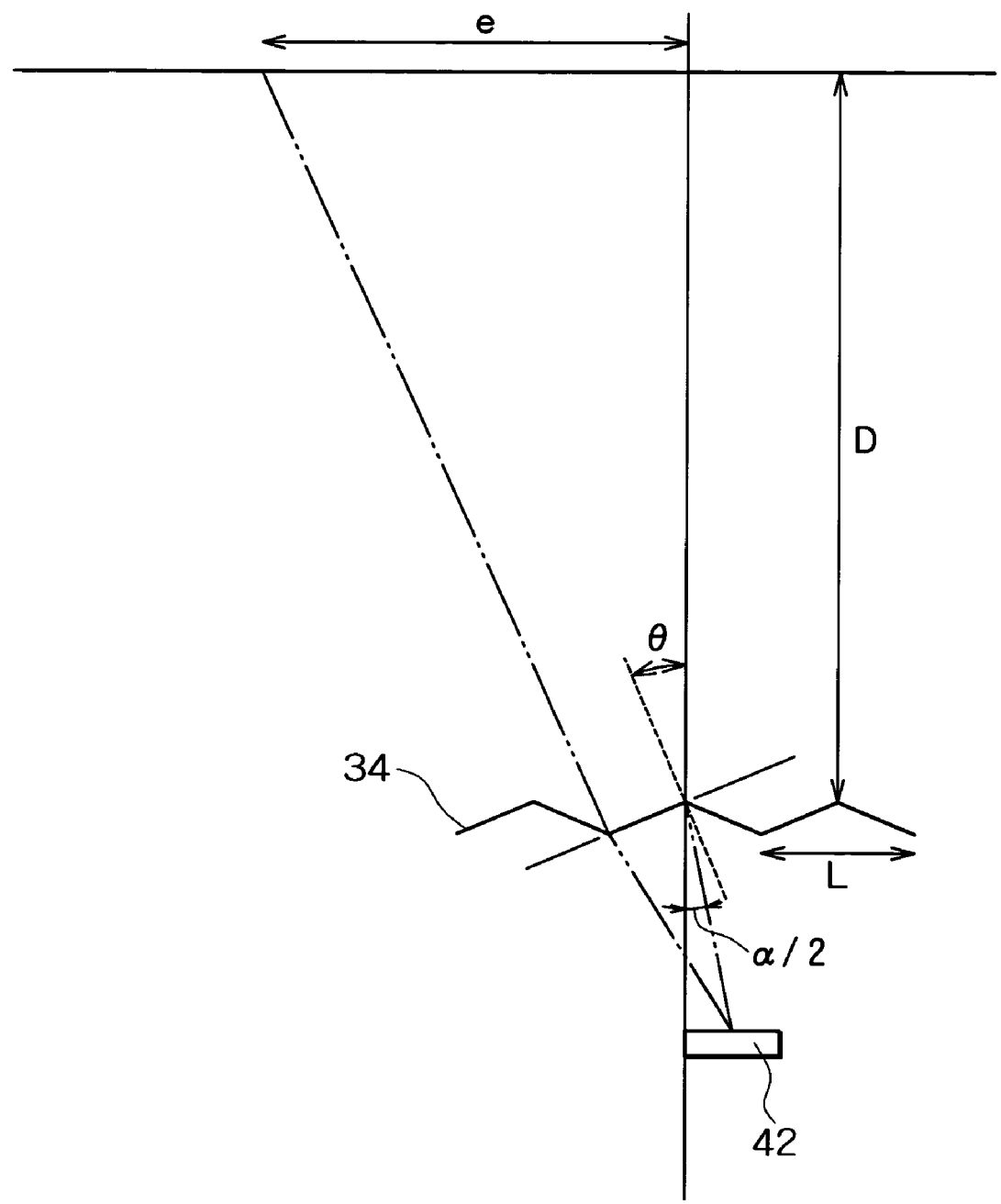
FIG. 25 is a diagram showing the path of light output from the center portion of the pixel.
Figure 26:
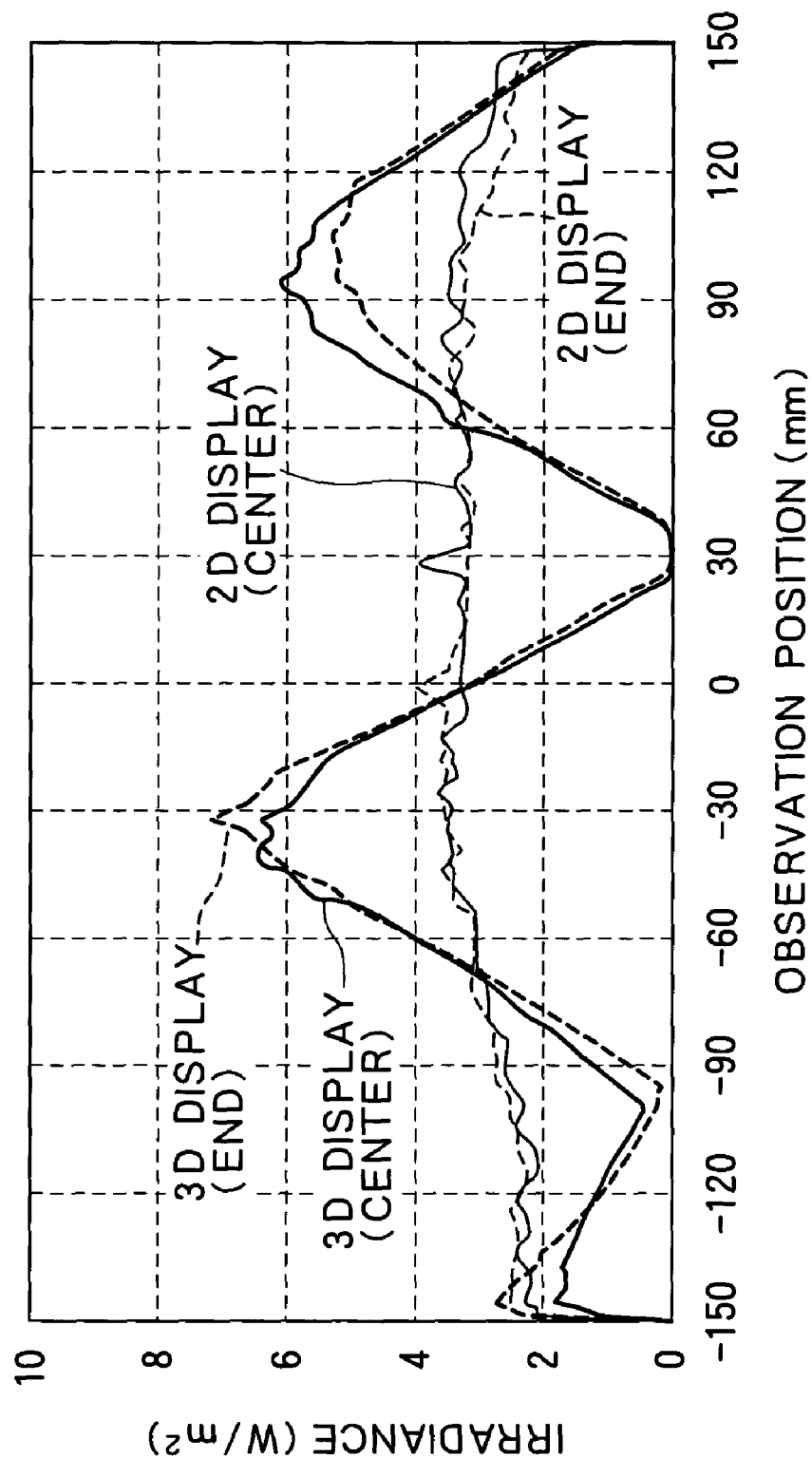
FIG. 26 is a graph showing the results of the simulation on the apparatus shown in FIGS. 21A and 21B, with the observation position taken on the horizontal axis and the irradiance at the observation position taken on the vertical axis.

The fifth embodiment of the invention will be described next. FIGS. 21A and 21B are cross-sectional views showing a 3D image/2D image switching display apparatus according to the embodiment of the invention. FIG. 21A shows a 2D-image display state and FIG. 21B shows a 3D-image display state. FIG. 22 is a graph showing the shape of a lens with the position on the lens perpendicular to the optical axis taken on the horizontal axis and the height of the lens at the position taken on the vertical axis. FIG. 23 is a diagram showing the path of light output from one end portion of one pixel, FIG. 24 is a diagram showing the path of light output from the other end portion of this pixel, and FIG. 25 is a diagram showing the path of light output from the center portion of the pixel. Further, FIG. 26 is a graph showing the results of the simulation on the apparatus shown in FIGS. 21A and 21B, with the observation position taken on the horizontal axis and the irradiance at the observation position taken on the vertical axis.

As shown in FIGS. 21A and 21B, the switching display apparatus according to the embodiment is characterized in that one of the two lenticular lenses is a concave lenticular lens. In the switching display apparatus according to the embodiment, the convex lenticular lens 32 is provided on the LCD unit side and a concave lenticular lens 33 is provided further on the observer side to the lenticular lens 32. An actuator is attached to the concave lenticular lens 33 so that the lenticular lens 33 is movable in the string direction of recessed portions as the lens elements. The absolute value of the focal distance of the convex lenticular lens 32 is approximately equal to the absolute value of the focal distance of the concave lenticular lens 33. The other structure of the embodiment than that difference is the same as that of the first embodiment.

The operation of the switching display apparatus according to the embodiment will be described next. To display a 2D image, as shown in FIG. 21A, the lenticular lenses 32 and 33 are arranged in such a way that the optical axis of the convex lenticular lens 32 matches with the optical axis of the concave lenticular lens 33. This arrangement causes the lens functions of the two lenticular lenses to cancel out each other to thereby realize 2D display. To display a 3D image, as shown in FIG. 21B, the lenticular lenses 32 and 33 are arranged in such a way that the optical axis of the convex lenticular lens 32 is shifted by half the lens pitch from the optical axis of the concave lenticular lens 33. This prevents the lens effects of both lenticular lenses from canceling out each other as done in the case of displaying a 2D image, and can thus ensure good 3D display.

A detailed description will now be given of how to design the lenticular lenses in the embodiment. The restriction on the lenses to realize good 2D display is as simple as making the absolute value of the focal distance of the concave lens coincides with the absolute value of the focal distance of the convex lens. Let us therefore consider the conditions to achieve good 3D display.

In case where the concave lenticular lens and the convex lenticular lens are so arranged as to be shifted by half the lens pitch from each other, a single virtual lens (hereinafter called "combined lens") equivalent to those two lenses has nearly a linear shape as shown in FIG. 22. At the time of displaying a 3D image, therefore, the combined lens has a capability similar to the capability of a prism plate which has multiple prisms laid out at the lens pitch. It is therefore suffice to design the angle of inclination (or the inclination angle) of the prism. In case of a prism, unlike a lens, light from one point of a pixel is projected on the observation plane without being subjected to the focus action and thus becomes a bundle of lights, so that the irradiance distribution of the projected image is expected to have a mountain-like shape. To maximize the effect of 3D display, the position of the mountaintop should be set to the positions of the eyes. This is tantamount to the case where light coming from the center of a pixel is dispersed and the dispersed light is distributed over a range of a width e around the position of $x = \pm(e/2)$.

At this time, as shown in FIG. 23, light emitted from the end of that side (right-hand end in the diagram) of the right-eye pixel 42 which is located farther from the left-eye pixel (not shown) associated with this pixel 42 is projected on an area of $-3 \times e/2 \leq x \leq -e/2$ on the observation plane by a prism plate 34 or the combined lens when the boundary between the right-eye pixel and the left-eye pixel is $x=0$. As shown in FIG. 24, light emitted from the end of that side (left-hand end in the diagram) of the right-eye pixel 42 which is located closer to the left-eye pixel associated with this pixel 42 is projected on an area of $-e/2 \leq x \leq e/2$ on the observation plane by the prism plate 34. As shown in FIG. 25, light emitted from the center of the right-eye pixel 42 is projected on an area of $-e \leq x \leq 0$ on the observation plane by the prism plate 34. Given that the angle of inclination of the prism is θ, the following equation 23 is satisfied according to Snell's law.

$$n \times \sin\left(\theta - \frac{\alpha}{2}\right) = \sin\theta \quad \text{[Equation 23]}$$

The inclination angle θ of the prism becomes θ=13.1° using the values in the first embodiment. A description will now be given of means which realizes the inclination angle θ with the optical axes of the concave lens and convex lens shifted by half the lens pitch from each other. In case where the lenses with the radius of curvature R are shifted from each other by half the lens pitch as shown in FIG. 22, the convex lens surface, f(x), in the cross section containing the optical axis is given by the following equation 24 and the concave lens surface, g(x), is given by the following equation 25. Therefore, the lens surface, h(x), of the combined lens is given by the following equation 26.

$$f(x) = -\sqrt{R^2 - \left(\frac{L}{2}\right)^2} + \sqrt{R^2 - x^2} \quad \text{[Equation 24]}$$

$$g(x) = \sqrt{R^2 - \left(\frac{L}{2}\right)^2} - \sqrt{R^2 - \left(x - \frac{L}{2}\right)^2} \quad \text{[Equation 25]}$$

$$h(x) = f(x) + g(x) = \sqrt{R^2 - x^2} - \sqrt{R^2 - \left(x - \frac{L}{2}\right)^2} \quad \text{[Equation 26]}$$

Equations 27 and 28 given below are derived from the equation 26. As a result, the inclination angle θ is expressed by the following equation 29. Solving the following equation 29 for the radius of curvature R yields the following equation 30.

$$h(0) = R - \sqrt{R^2 - \left(\frac{L}{2}\right)^2} \quad \text{[Equation 27]}$$

$$h\left(\frac{L}{2}\right) = -R + \sqrt{R^2 - \left(\frac{L}{2}\right)^2} \quad \text{[Equation 28]}$$

$$\tan\theta = \frac{4 \times \left(R - \sqrt{R^2 - \left(\frac{L}{2}\right)^2}\right)}{L} \quad \text{[Equation 29]}$$

$$R = \frac{L \times \left\{1 + \left(\frac{\tan\theta}{2}\right)^2\right\}}{2\tan\theta} \quad \text{[Equation 30]}$$

Substituting, for example, the aforementioned values, the inclination angle θ=13.1° and the lens pitch L=0.4782 mm in the equation 30, the radius of curvature R becomes equal to 1.03 mm, which is equivalent to about twice the radius of curvature r=0.5161 mm when a single lenticular lens is used.

To study the appropriateness of this design, computer-aided simulation is carried out. The optical model that is used in this simulation differs from the optical model used in the simulation in the first embodiment in that a concave lenticular lens is used as the observer side lenticular lens and 2D display is achieved by arranging the two lenticular lenses in such a way that their optical axes coincide with each other whereas 3D display is achieved by arranging the two lenticular lenses with their optical axes shifted from each other by half the lens pitch. The other conditions in the simulation than the mentioned ones are the same as those in the simulation in the first embodiment. The simulation results are illustrated in FIG. 26.

As shown in FIG. 26, the results of the simulation show that for both 2D display and 3D display, the display characteristic of the center of the display screen approximately matches with the display characteristic of the end of the display screen. The switching display apparatus can therefore achieve uniform display on the entire display screen. In case of 2D display, the magnified area of non-display area (see FIG. 10) which is observed in the first embodiment cannot be observed and the uniform irradiance distribution similar to the one obtained in the case where the lens is not used is acquired.

As apparent from the above, the embodiment can realize excellent 2D image display in which the non-display area of a pixel is not projected in magnification, as compared with the case where two convex lenticular lenses are used. The embodiment can also ensure 3D image display. It is therefore possible to realize a 3D image/2D image switching display apparatus.

Although the observer side lenticular lens or the concave lenticular lens 33 is movable in this embodiment as in the first embodiment, the LCD unit and the display-unit side lenticular lens or the convex lenticular lens 32 may be made movable as done in the second and third embodiments. What is important at this time is the relative layout of the right-eye pixels, the left-eye pixels and the projections of the convex lenticular lens at the time of displaying a 3D image and the boundary portion between the right-eye pixel and the left-eye pixel should match with the center of the associated projection. As long as this rule is kept, either one of the convex lenticular lens or the concave lenticular lens may be arranged on the display-unit side or either lens may be made movable. In case where the convex lenticular lens is to be arranged on the display-unit side, accurate layout can be made by arranging the convex lenticular lens in such a way that a 3D image on, when displayed on the display unit, can be observed with a good quality.

A modification of the fifth embodiment of the invention will be described next. FIGS. 27A and 27B are cross-sectional views showing a 3D image/2D image switching display apparatus according to the modification. FIG. 27A shows a 2D-image display state and FIG. 27B shows a 3D-image display state. In this modification, the above-described technique of the fifth embodiment is adapted to a multi-view type switching display apparatus. The "multi-view" type is the system in which one or more kinds of pixels are prepared in addition to the right-eye pixel and the left-eye pixel so that three pixels or more are associated with a single lens element of the lenticular lens.

As shown in FIGS. 27A and 27B, four kinds of pixels 401 to 404, for example, are cyclically laid out, in the name order, on the LC layer 24 of the LCD unit 2 along the direction 11. One projection 32a of the lenticular lens 32 and one projection 33a of the lenticular lens 33 correspond to a pixel group consisting of the pixels 401 to 404 one each. The other structure of the modification than that particular layout is the same as that of the fifth embodiment.

The operation of the switching display apparatus according to this modification will be discussed next. To display a 2D image, as shown in FIG. 27A, the optical axis of the convex lenticular lens 32 is made coincident with the optical axis of the concave lenticular lens 33. Then, the same 2D image is displayed with the pixels 401 to 404 treated as independent pixels. Because the lens effects of the convex lenticular lens 32 and the concave lenticular lens 33 cancel out each other at this time, lights output from the pixels 401 to 404 travel in the same direction.

At the time of displaying a 3D image, by way of comparison, on the other hand, the optical axis of the convex lenticular lens 32 is shifted from the optical axis of the concave lenticular lens 33 by the half the lens pitch, as shown in FIG. 27B. Accordingly, the lenticular lenses 32 and 33 function as a prism as per the fifth embodiment. Then, the pixels 401 to 404 display four different kinds of images, respectively. At this time, the convex lenticular lens 32 and the concave lenticular lens 33 bring about the prism effect and output light from the pixel 401 in the first direction, light from the pixel 402 in the second direction, light from the pixel 403 in the third direction and light from the pixel 404 in the fourth direction. Accordingly, as the observer changes the viewpoint, the observer can recognize four kinds of images. As a result, at the time of displaying the image of a subject, for example, the display can be made in such a way that the image of the subject seen from the front can be recognized in the observation of the switching display apparatus from the front side and the image of the subject seen from the oblique direction can be recognized in the observation of the switching display apparatus from the oblique direction. The other operation and effect of the modification than what have been discussed above are the same as those of the fifth embodiment. The number of the kinds of pixels is not limited to four, but three kinds or five kinds or more may be used.

Figure 29:
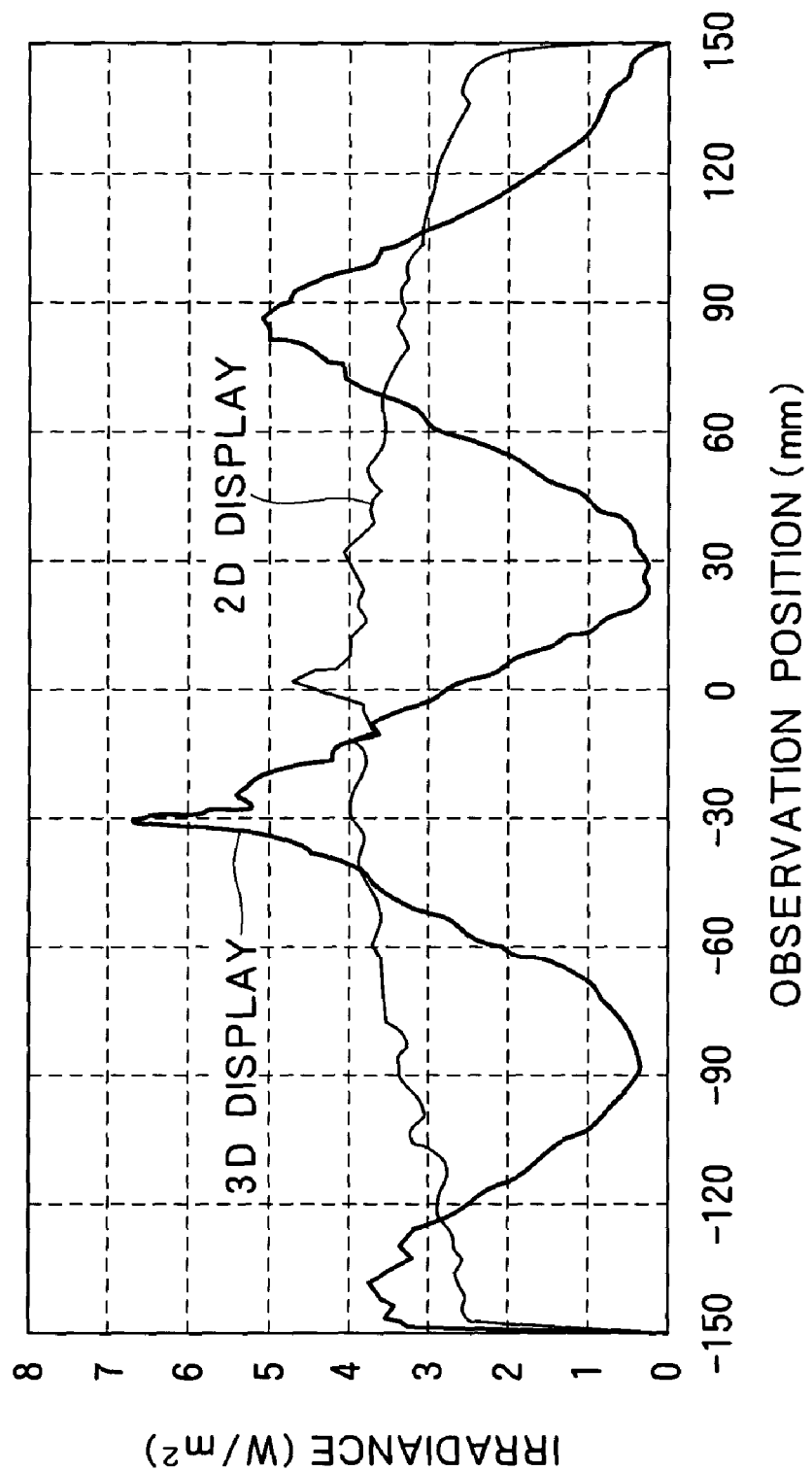
FIG. 29 is a graph showing the results of the simulation on the apparatus shown in FIGS. 28A and 28B, with the observation position taken on the horizontal axis and the irradiance at the observation position taken on the vertical axis.

The sixth embodiment of the invention will be described below. FIGS. 28A and 28B are cross-sectional views showing a 3D image/2D image switching display apparatus according to the embodiment. FIG. 28A shows a 2D-image display state and FIG. 28B shows a 3D-image display state. FIG. 29 is a graph showing the results of the simulation on the apparatus shown in FIGS. 28A and 28B, with the observation position taken on the horizontal axis and the irradiance at the observation position taken on the vertical axis.

As shown in FIGS. 28A and 28B, the embodiment is characterized in that two plate-like members in each of which prism-like optical elements extending in one direction are laid out in parallel to one another (hereinafter called "prism plate 35") are used instead of two lenticular lenses, as compared with the first embodiment. The two prism plates 35 have the identical shape. The one of the two prism plates 35 which is arranged on the display-unit side is fixed to the LCD unit 2 and an actuator (not shown) is attached to the other one arranged on the observer side so that the latter prism plate 35 is movable in the layout direction 11 of the prism-like optical elements. The inclination angle of each prism plate 35 is half the inclination angle ($\theta$=13.1°) of the virtual prism in the fifth embodiment. The other structure of the embodiment than that structure mentioned above is the same as that of the first embodiment.

The operation of the switching display apparatus according to the embodiment will be described next. In case where the switching display apparatus displays a 2D image, as shown in FIG. 28A, the two prism plates 35 are laid out in such a way that the vertex of the display-unit side prism plate 35 matches with the trough of the observer side prism plate 35. This allows the two prism plates 35 to cancel out their prism functions each other, thus ensuring 2D display.

In case of displaying a 3D image, as shown in FIG. 28B, the two prism plates 35 are laid out in such a way that the vertexes of the prism plates 35 match with each other. This allows the two prism plates 35 to function as a single virtual prism plate 35 with an inclination angle $\theta$ of 13.1°, unlike in the case of 2D display where the prism effects cancel out each other, so that good 3D display can be realized as per the fifth embodiment.

FIG. 29 shows the results of computer-aided simulation using the above-described optical model. The other conditions in the simulation than what are mentioned above are the same as those in the simulation in the first embodiment. As apparent from FIG. 29, the results of the simulation, like the simulation results of the fifth embodiment (see FIG. 26), show good effects both in 2D display and 3D display.

As a prism plate has a simple shape as compared with a lenticular lens, it can be fabricated at a lower cost. This embodiment can therefore achieve the low-cost production of a 3D image/2D image switching display apparatus. The other effects of the switching display apparatus of the embodiment than are mentioned above are the same as those of the fifth embodiment.

The seventh embodiment of the invention will be described below. FIGS. 30A and 30B are cross-sectional views showing a 3D image/2D image switching display apparatus according to the embodiment. FIG. 30A shows a 3D-image display state and FIG. 30B shows a 2D-image display state. FIGS. 31A and 31B are top views showing the 3D image/2D image switching display apparatus, FIG. 31A showing a 3D-image display state while FIG. 31B shows a 2D-image display state.

As shown in FIGS. 30A, 30B, 31A and 31B, the switching display apparatus according to the embodiment is provided with two convex fly-eye lenses 38 and 39 in place of two lenticular lenses as compared with the first embodiment. The "fly-eye lens" is a lens having ordinary lenses laid out in a matrix form. The LCD unit 2 is provided on the plane that includes the focal points of the two fly-eye lenses 38 and 39. The LCD unit 2 is provided with four kinds of pixels 44 to 47 which respectively show different images. The pixels 44 to 47 one each are laid out in two by two to constitute one set of pixels and each set of pixels or each pixel group corresponds to the each lens element of the fly-eye lens. This realizes the scheme of integral photography. Two sets of actuators (not shown) are attached to the observer side fly-eye lens 38, so that the fly-eye lens 38 is movable in an arbitrary direction orthogonal to the optical axis of the display-unit side fly-eye lens 39 with respect to the fly-eye lens 39.

The operation of the switching display apparatus according to the embodiment will be described next. In case of displaying a 3D image, as shown in FIGS. 30A and 31A, the fly-eye lens 38 is arranged in such a way that the optical axis of each lens element of the fly-eye lens 38 coincides with the optical axis of the associated lens element of the fly-eye lens 39. Accordingly, the two convex fly-eye lenses 38 and 39 function as a single virtual fly-eye lens. As a result, the convex fly-eye lenses 38 and 39 respectively output lights coming from the pixels 44 to 47 in the first and fourth directions.

In case of displaying a 2D image, as shown in FIGS. 30B and 31B, the fly-eye lens 38 is arranged in such a way as to be shifted from the fly-eye lens 39 by half the lens pitch in the right and left direction of the screen or the up and down direction of the screen, or in both the right and left direction and the up and down direction, so that the optical axis of the fly-eye lens 38 is shifted by half the lens pitch from the optical axis of the fly-eye lens 39. Accordingly, the two convex fly-eye lenses 38 and 39 function as a single virtual fly-eye lens. As a result, the convex fly-eye lenses 38 and 39 respectively output lights coming from the pixels 44 to 47 in the first and fourth directions. This can allow a 2D image to be displayed based on the principle similar to that of the first embodiment.

In case where one of two lenticular lenses provided is moved in the string direction of its projections as done in the first embodiment, plural images to be displayed by plural kinds of pixels can be distributed only in one direction. If two kinds of images are distributed in the right and left direction so that different images are input to the right and left eyes, 3D display can be achieved. If plural kinds of images are distributed in the right and left direction so that different images can be recognized as the viewpoint is shifted in the right and left direction, more sophisticated 3D feeling can be achieved. The illustrated structure of the first embodiment cannot however distribute images in other directions than the layout direction of the projections of the lenticular lens.

According to the seventh embodiment, by way of comparison, two fly-eye lenses are provided and plural kinds of pixels are laid out in the layout direction of the lens elements of those convex fly-eye lenses, so that plural images can be distributed in two directions or more. If not only an actuator which moves the lenses in the horizontal direction but also an actuator which moves the lenses in the vertical direction are provided, it is possible to select between horizontal 3D feeling and vertical 3D feeling. That is, if images are distributed in the up and down direction in addition to the right and left direction, 3D display is available even in case where an image is displayed in a direction orthogonal to the normal direction with respect to the screen of the switching display apparatus. That is, even in case where observation is made by changing the vertical and horizontal sides of the screen layout, it is possible to select between 3D display and 2D display which are respectively optimal to those screen layouts. In case where the switching display apparatus of the embodiment is installed in a camera-mounted portable telephone, for example, the screen is arranged vertically to display a 3D image and a 2D image when the telephone is used as an ordinary portable telephone while the screen is arranged horizontally in consideration of the layout of 3D CCDs to display a 3D image and a 2D image when the portable telephone is used as a camera. If the image of a subject as seen from obliquely above is recognized when observing the screen from obliquely above, for example, the observer can acquire 3D feeling in the up and down direction. If the pixels are laid out in an arbitrary oblique direction and the fly-eye lens 38 is made movable in this arbitrary oblique direction, it is possible to switch between the display of a 3D image and the display of a 2D image in every direction. As a result, the observer can get 3D feeling when observing the image not only in the right and left direction but also in the up and down direction and the oblique direction.

In the case that uses integral photography scheme as in the embodiment, it is preferable to employ a time-divisional display system (field sequential display system). The time-divisional display system is the method that expresses colors on the time-sequential addition by flickering the backlight in three colors of RGB without using a color filter. The reason why the time-divisional display system is preferable is that the fly-eye lens projects the pixels in magnification in the up and down direction as well as the right and left direction in the integral photography. In the plane division type color display apparatus using an ordinal color filter, the lens components parallel to the extending direction of the stripes of the color filter disturbs the color elements of a magnified image and thus produces color moire, deteriorating the visibility. By way of contrast, the time-divisional display system can display a full color with a single pixel and does not therefore bring about such a problem. While the time-divisional display system requires at least three times the normal drive frequency, it can reduce the number of pixels to ⅓ and eliminates the need for a color filter and thus has an advantage such that there is no light absorption by the color filter, resulting in consumption power saving. With those features, the time-divisional display system may be adapted to the above-described first to sixth embodiments and eighth to twelfth embodiments to be discussed later.

Figure 32:
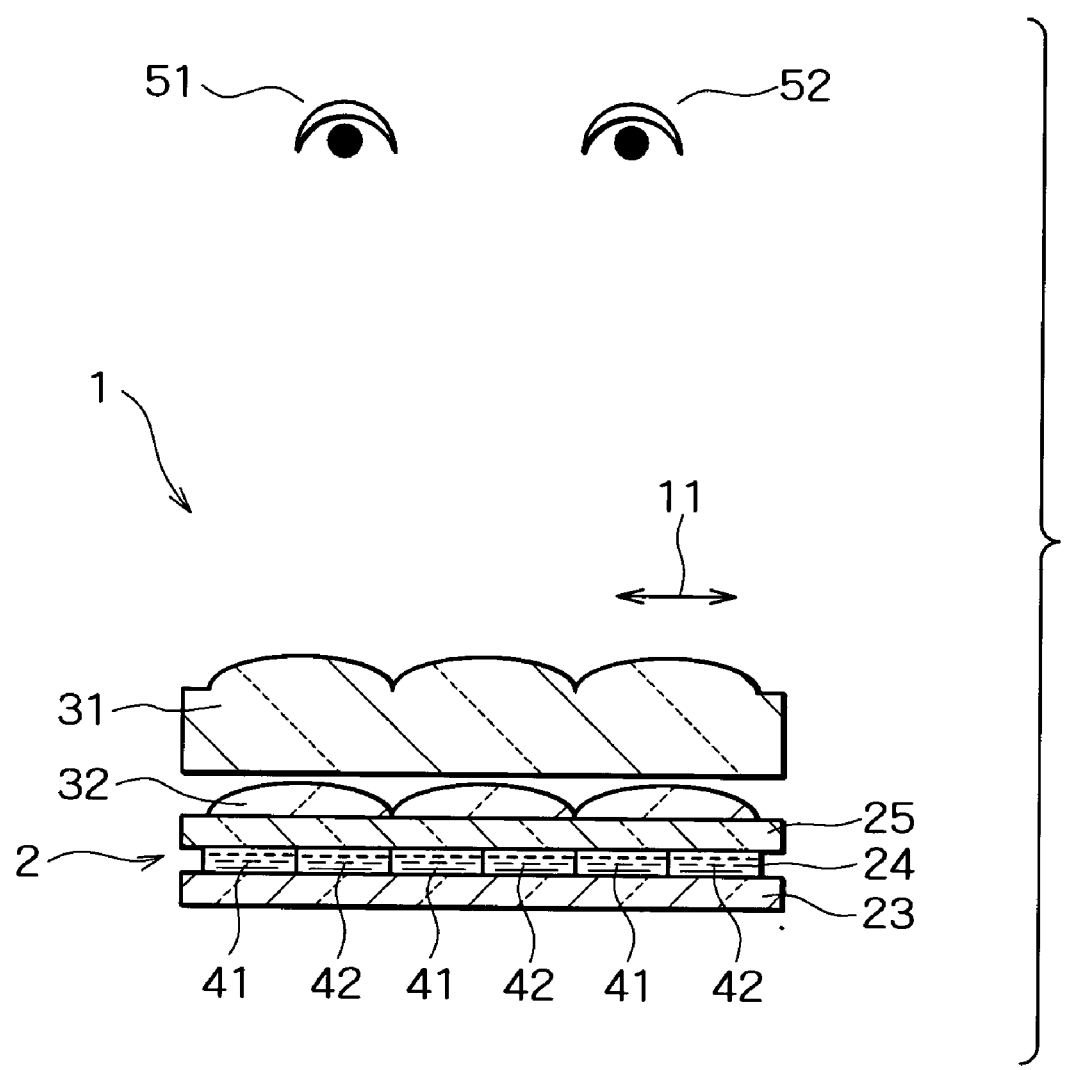
FIG. 32 is a cross-sectional view showing a 3D image/2D image switching display apparatus according to an eighth embodiment of the invention and shows a 3D-image display state.
Figure 33:
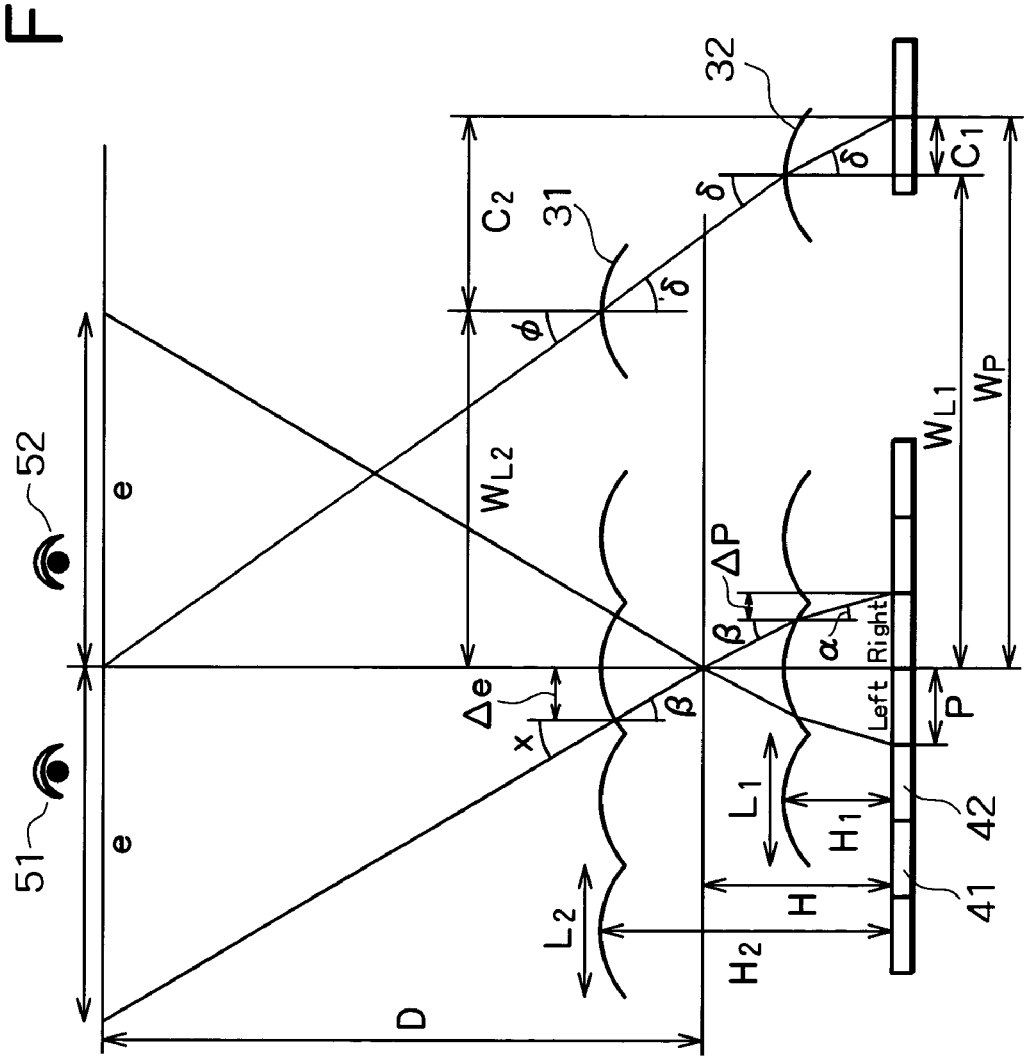
FIG. 33 is a diagram showing an optical model of this switching display apparatus.

The eighth embodiment of the invention will be described below. FIG. 32 is a cross-sectional view showing a 3D image/2D image switching display apparatus according to the embodiment and shows a 3D-image display state. FIG. 33 is a diagram showing an optical model of this switching display apparatus. As shown in FIG. 32, the switching display apparatus of the embodiment has one of the two lenticular lenses, a lenticular lens 12, formed integral with the glass substrate 25 of the LCD unit 2. 2P molding or the like can be used as means for providing a lenticular lens on the glass substrate 25 of the LCD unit 2. Specifically, a mold is prepared which has the inversion pattern of the shape of the lens to be molded and a release agent and a photo-curing resin are coated on the mold and are closely attached to the display unit. Then, the resin is cured and separated and the pattern of the lenticular lens is transferred on the display unit.

In case of preparing the lenticular lens in this manner, the position of the lens is limited by the thickness of the substrate of the display unit. In this respect, the observer side lenticular lens may be arranged in such a way that the lens surface is directed toward the observer side as shown in FIG. 32. At the center portion of the display screen of the optical model shown in FIG. 33, the following equations 31 to 36 are derived from the Snell's law and the geometric relationship.

Given that $H_1$ is the distance from the pixels 41 and 42 to the lens surface of the display-unit side lenticular lens 32, $H_2$ is the distance from the pixels 41 and 42 to the lens surface of the observer side lenticular lens 31 and the two lenticular lenses are considered as a single virtual lenticular lens, let H be the distance from the pixels 41 and 42 to the lens surface of the virtual lenticular lens, let D be the distance from the pixels 41 and 42 to the virtual lenticular lens, let n be its refractive index, let $L_1$ be the lens pitch of the display-unit side lenticular lens 32, let $L_2$ be the lens pitch of the observer side lenticular lens 31, let P be the width of each of the pixels 41 and 42, let $\Delta P$ be the distance between the center of the lenticular lens 32 and the position at which light output from that end of the pixel 42 which is located on the side far from the pixel 41 passes the lens 32, and let $\Delta e$ be the distance between the center of the lenticular lens 31 and the position at which light output from that end of the pixel 42 which is located on the side far from the pixel 41 passes the lens 31.

In addition, let $W_{L1}$ be the distance from the center of the projection located at the center of the lenticular lens 31 to the center of the projection located at the end of the lens 31, let $W_{L2}$ be the distance from the center of the projection located at the center of the lenticular lens 32 to the center of the projection located at the end of the lens 32, let $W_P$ be the distance between the center position of a pair of the left-eye pixel and right-eye pixel 42 located at the center of the LCD unit and the center position of the pixel pair located at the end of the LCD unit 2, let α and β be respectively the inclination angle and output angle of light at the projection located at the center of the lenticular lens 32, let β and γ be respectively the inclination angle and output angle of light at the projection located at the center of the lenticular lens 31, let δ and ε be respectively the inclination angle and output angle of light at the projection located at the end of the lenticular lens 32, let ε and Φ be respectively the inclination angle and output angle of light at the projection located at the end of the lenticular lens 31, let $C_1$ be the difference between the distance $W_P$ and the distance $W_{L1}$, let $C_2$ be the difference between the distance $W_P$ and the distance $W_{L2}$, and let 2m be the number of pixels included in the area of the distance $W_P$.

$$n \times \sin \alpha = \sin \beta \quad \text{[Equation 31]}$$

$$n \times \sin \beta = \sin \gamma \quad \text{[Equation 32]}$$

$$(H_2-H) \times \tan \beta = \Delta e \quad \text{[Equation 33]}$$

$$(D-H_2+H) \times \tan \gamma = e - \Delta e \quad \text{[Equation 34]}$$

$$H_1 \times \tan \alpha = \Delta P \quad \text{[Equation 35]}$$

$$(H-H_1) \times \tan \beta = P - \Delta P \quad \text{[Equation 36]}$$

Further, the following equations 37 to 41 are likewise derived for the end portion of the display screen.

$$n \times \sin \delta = \sin \epsilon \quad \text{[Equation 37]}$$

$$n \times \sin \epsilon = \sin \phi \quad \text{[Equation 38]}$$

$$H_1 \times \tan \delta = 2 \times m \times P - m \times L_1 \quad \text{[Equation 39]}$$

$$(D-H_2+H_1) \times \tan \phi = m \times L_2 \quad \text{[Equation 40]}$$

$$(H_2-H_1) \times \tan \epsilon = m \times L_1 = m \times L_2 \quad \text{[Equation 41]}$$

Further, suppose that the following equation 42 is satisfied.

$$H_2 - H_1 = H \quad \text{[Equation 42]}$$

Then, the equations 31 to 42 are solved using H=1.57 mm, the value used in the first embodiment, as the value of the distance H from the pixels 41 and 42 to the lens surface of the virtual lens, the pixel pitch P=0.24 mm, the refractive index n=1.49, the distance D=280 mm, the width of the 3D visible range e=65 mm and m=60. Obtained as a result are $H_1$=0.707 mm or the distance between the display-unit side lenticular lens 32 and the pixels, $L_1$=0.4795 mm or the lens pitch of the display-unit side lenticular lens 32, $H_2$=2.51 mm or the distance between the observer side lenticular lens 31 and the pixels and $L_2$=0.4795 mm or the lens pitch of the observer side lenticular lens 31. With the switching display apparatus designed in this way, even in case where there is a distance between the two lenticular lenses, the lenses can be laid out without degrading the display performance.

According to the embodiment, as described above, the provision of the display-unit side lenticular lens integrated with the glass substrate 25 of the LCD unit 2 can increase the thickness of the observer side lenticular lens 31 and can thus reduce the influence of the warping and deformation of the lenses, thus ensuring high-yield production of switching display apparatuses with a good display quality.

Figure 34:
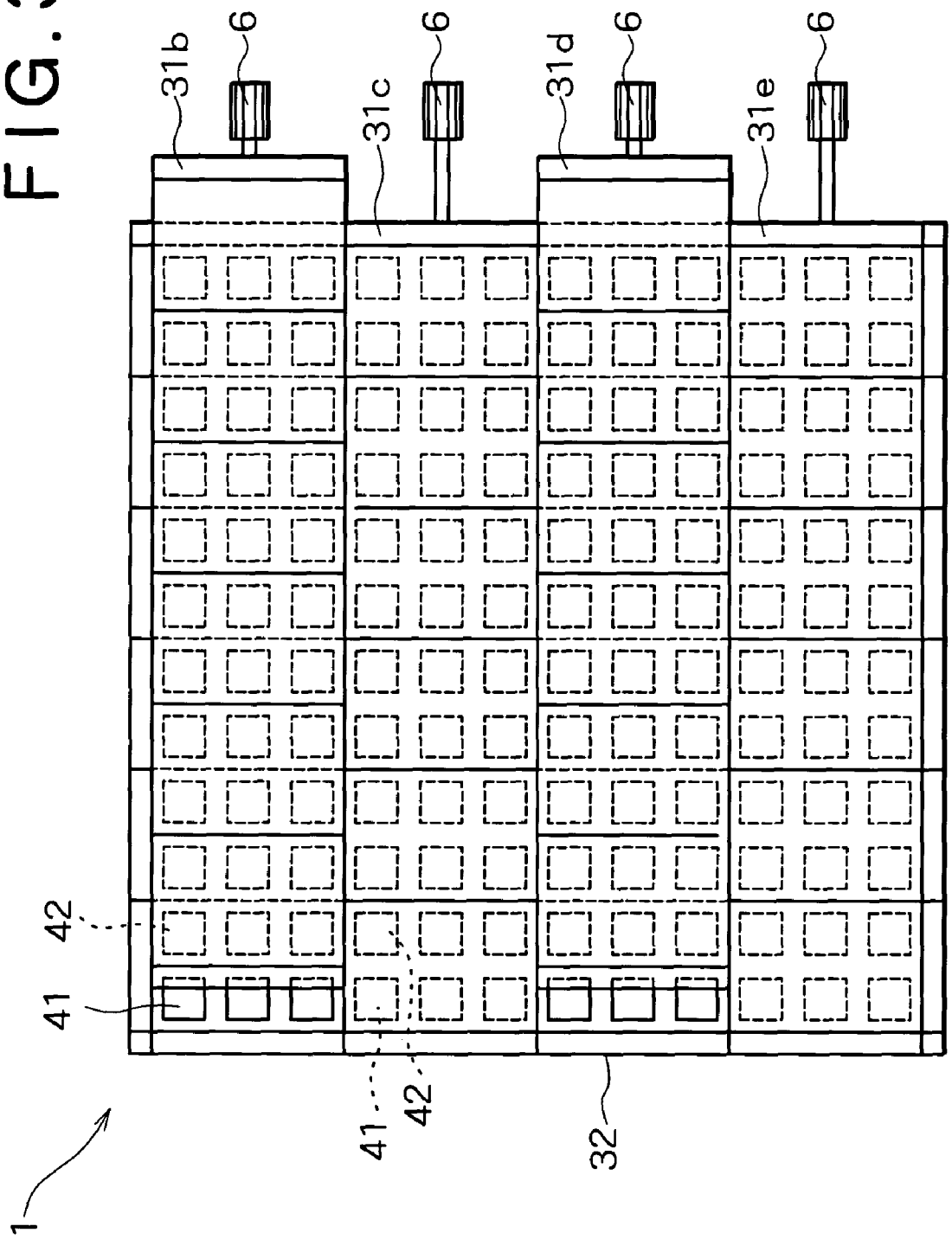
FIG. 34 is a top view showing a 3D image/2D image switching display apparatus according to a ninth embodiment of the invention.

The ninth embodiment of the invention will be described next. FIG. 34 is a top view showing a 3D image/2D image switching display apparatus according to the embodiment. As shown in FIG. 34, the observer side lenticular lens 31 is cut along the string direction of the projections (direction 11) into plural band-like segments 31b to 31e whose lengthwise direction is parallel to the direction 11 as seen from the direction perpendicular to the surface of the LCD unit 2. The actuator 6 is attached to each segment to permit each segment to be movable independently. The other structure of the embodiment than what has been discussed above is the same as that of the first embodiment.

The operation of the switching display apparatus according to the embodiment will be described next. As shown in FIG. 34, the LCD unit 2 (see FIG. 7) displays an image which is partly a 2D image with the other part being a 3D image. By driving the individual actuators, the segments of the area where a 3D image is displayed, e.g., the segments 31c and 31e, are arranged in such a way that the optical axes of the lenses coincide with each other and the segments of the area where a 2D image is displayed, e.g., the segments 31b and 31d, are arranged in such a way that the optical axes of the lenses are shifted from each other by half the lens pitch. This can ensure different lens layouts within the display screen so that a mixture of a 3D image and a 2D image can be displayed within the display screen. The other operation and effects of the embodiment than what have been discussed above are the same as those of the first embodiment.

Figure 35:
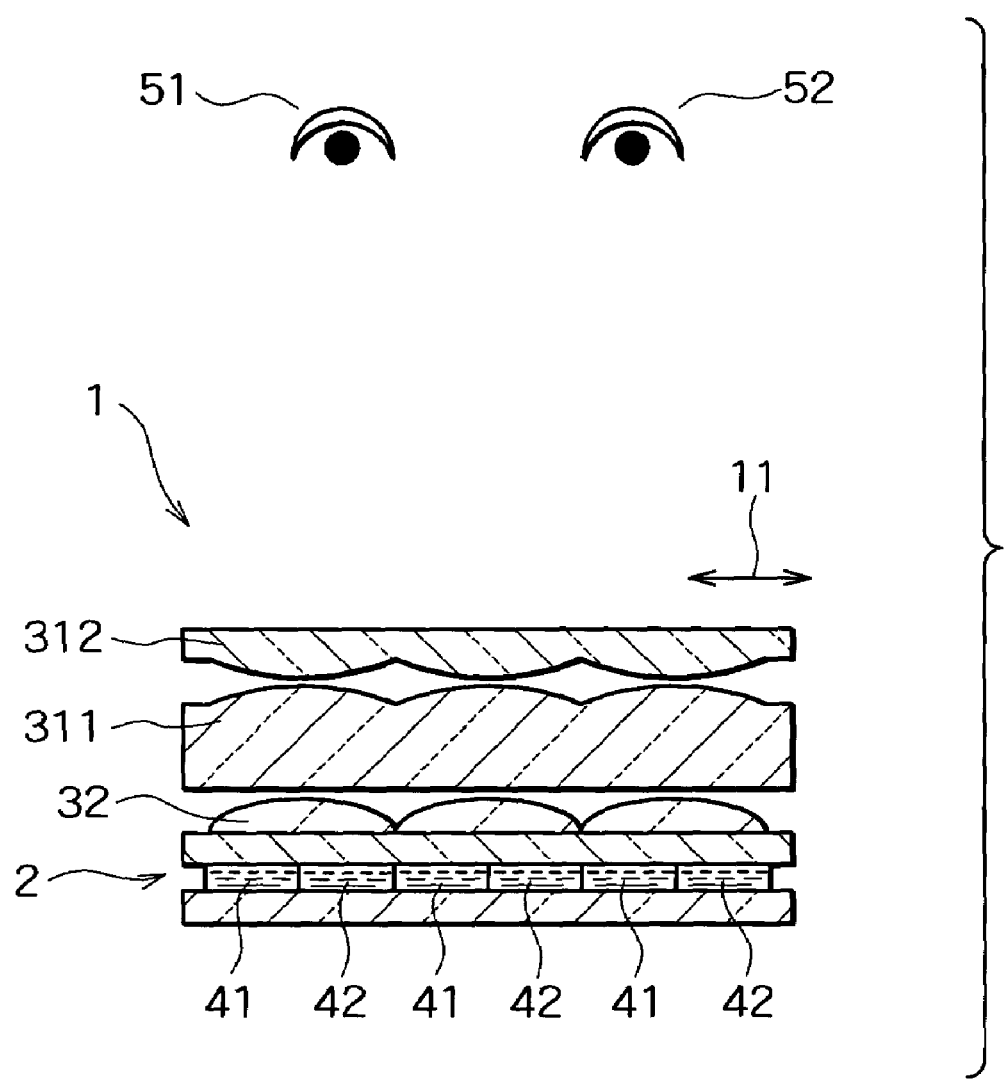
FIG. 35 is a cross-sectional view showing a 3D image/2D image switching display apparatus according to an tenth embodiment of the invention and shows a 3D-image display state.

The tenth embodiment of the invention will be described below. FIG. 35 is a cross-sectional view showing a 3D image/2D image switching display apparatus according to the embodiment and shows a 3D-image display state. As shown in FIG. 35, the observer side lenticular lens 31 (see FIG. 7) in the first embodiment is constituted by a combination of two lenticular lenses 311 and 312 in the tenth embodiment. That is, the laccording to the embodiment has three lenticular lenses 32, 311 and 312 provided in the named order from the display-unit side. The lenticular lens 32 is laid on the substrate of the LCD unit 2 in such a way that its lens surface is directed toward the observer side, the lenticular lens 311 is laid out in such a way that its lens surface is directed toward the observer side, and the lenticular lens 312 is laid out in such a way that its lens surface is directed toward the display-unit side. The two lenticular lenses 311 and 312 are equivalent to the single lenticular lens 32. The lenticular lenses 311 and 312 are fixed to each other and an actuator (not shown) is attached thereto so that the lenticular lenses 311 and 312 are movable in the direction 11. The other structure of the embodiment than what has been discussed above is the same as that of the first embodiment.

The design scheme for the switching display apparatus according to the embodiment can be contrived based on the design scheme employed in the eighth embodiment. That is, as the observer side lenticular lens is separated into two, and the focal distance and lens pitch of each separated lens part are respectively set to 2.064 mm and 0.4774 mm, the structure that uses three lens substrates can be realized.

The operation of the switching display apparatus according to the embodiment will be described next. At the time of displaying a 3D image, as shown in FIG. 35, the optical axes of the lenticular lenses 32, 311 and 312 are made to match with one another. This can allow light from the left-eye pixel 41 to be output toward the left eye 52 of the observer and can allow light from the right-eye pixel 42 to be output toward the right eye 51 so that the observer can recognize a 3D image. At the time of displaying a 2D image, the actuators are driven to shift the optical axes of the lenticular lenses 311 and 312 from the optical axis of the lenticular lens 32 by half the lens pitch. At this time, the optical axis of the lenticular lens 311 remains coincident with the optical axis of the lenticular lens 312. Accordingly, the effects of the three lenticular lenses cancel out one another and the observer can recognize a 2D image. The other operation of the embodiment than what has been discussed above is the same as that of the first embodiment.

In the embodiment, the use of three lenses can reduce aberration further as compared with the case of using two lenses. This can ensure better display.

Although the foregoing description of the embodiment has been given of an example where the observer side lenticular lens is constituted by two lenses, the invention is not limited to this particular case and the observer side lenticular lens may be constituted by three lenses or more, or the display-unit side lenticular lens may be constituted by two lenses or more, or both the observer side lenticular lens and display-unit side lenticular lens may be constituted by two lenses or more.

Figure 36:
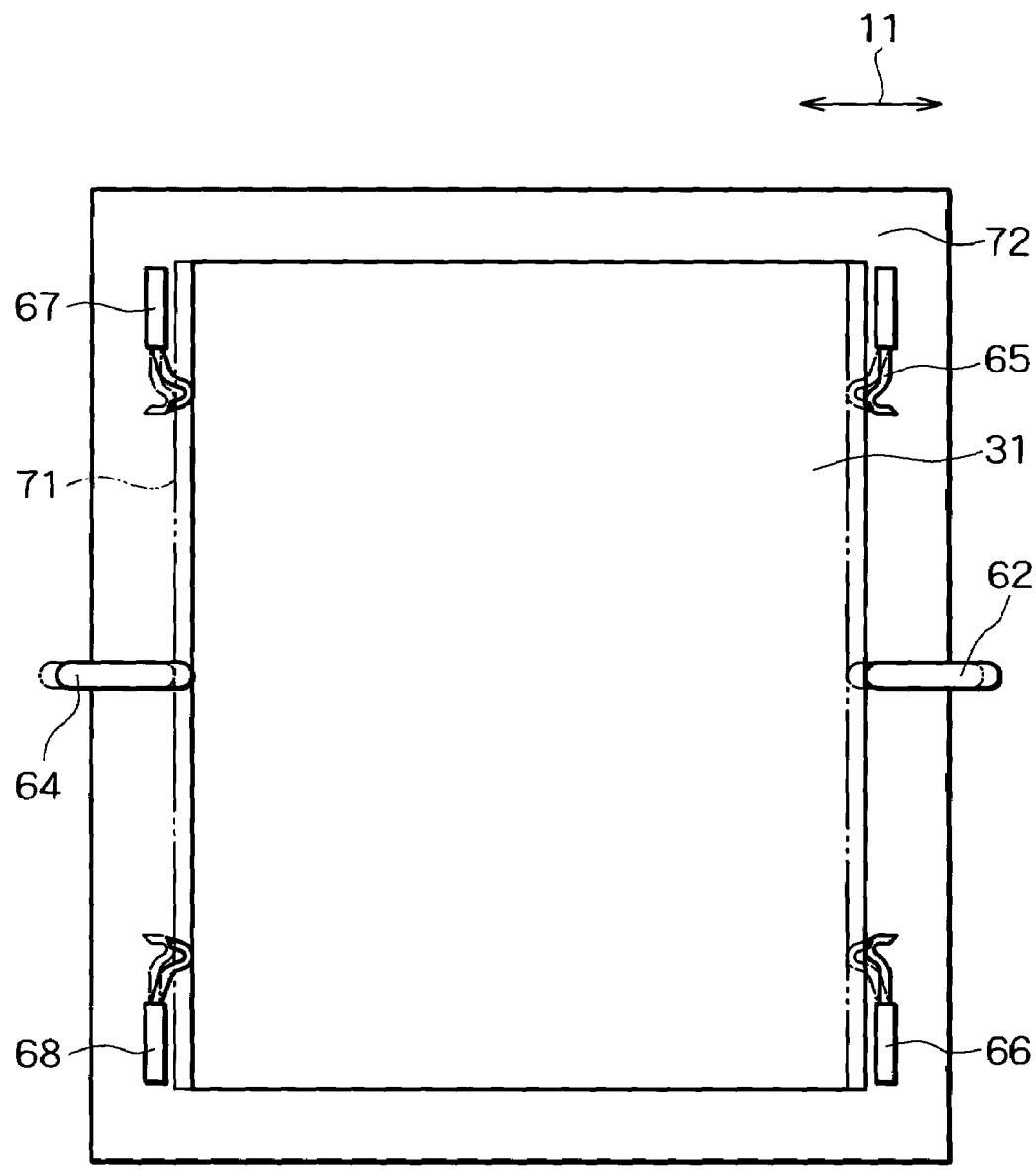
FIG. 36 is a top view showing a 3D image/2D image switching display apparatus according to an eleventh embodiment of the invention.
Figure 37:
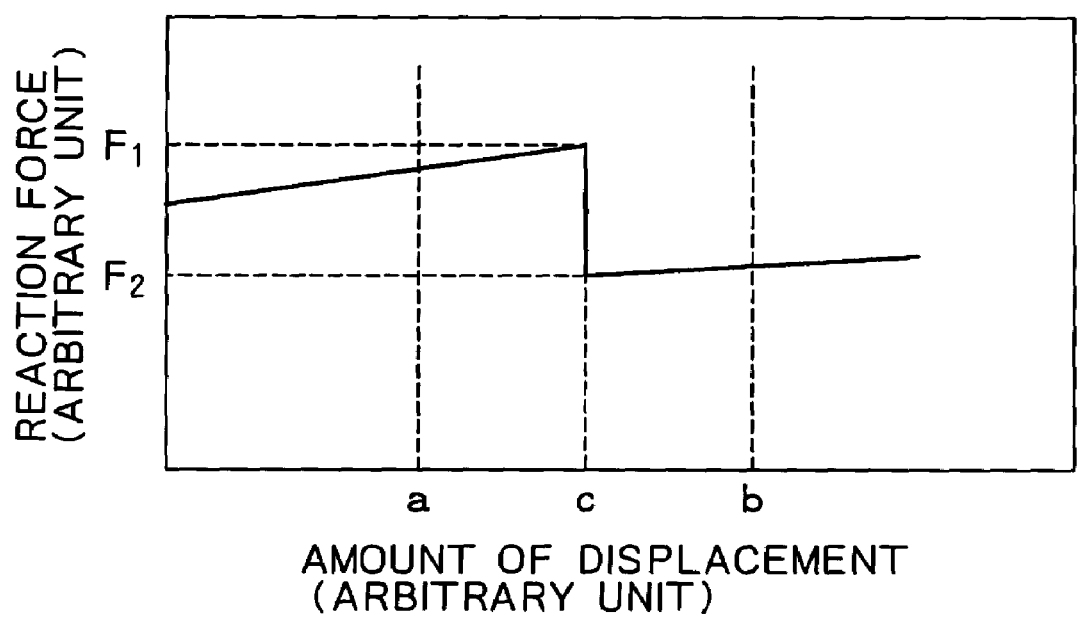
FIG. 37 is a graph showing the characteristics of a non-linear spring with the position of displacement taken on the horizontal axis and the reaction force taken on the vertical axis.

The eleventh embodiment of the invention will be described below. FIG. 36 is a top view showing a 3D image/2D image switching display apparatus according to the embodiment, and FIG. 37 is a graph showing the characteristics of a non-linear spring with the position of displacement taken on the horizontal axis and the reaction force taken on the vertical axis. As shown in FIG. 36, the switching display apparatus according to the embodiment differs from the switching display apparatus of the first embodiment in the structure of the actuator.

For example, while the display of a 3D image and the display of a 2D image are switched from one to the other by moving the observer side lenticular lens 31 in the first embodiment, the position of the lenticular lens 31 should be arranged stably at the position for making 3D display or the position at which the optical axis of the lenticular lens 31 coincides with the optical axis of the lenticular lens 32 or at the position for making 2D display or the position at which the optical axis of the lenticular lens 31 is shifted from the optical axis of the lenticular lens 32. That is, neither a 3D image nor a 2D image can be displayed stably if the lenticular lens 31 stays at a midway position between those two positions.

A fixed frame 72 fixed to the casing (not shown) is provided in the switching display apparatus of the embodiment and the observer side lenticular lens 31 is retained in the opening portion of the fixed frame 72. The length of the opening portion of the fixed frame 72 in the direction 11 is longer than the length of the lenticular lens 31 in the direction 11 and the lenticular lens 31 is movable in the direction 11. Two pairs of or four non-linear springs 65 to 68 are provided between the edge of the lenticular lens 31 that is orthogonal to the moving direction 11 and the fixed frame 72. The non-linear springs 65 and 67 form a pair and are arranged in such a way as to face each other. The non-linear springs 66 and 68 form the other pair and are arranged in such a way as to face each other. The non-linear springs 65 and 66 are attached to one edge of the lenticular lens 31, and the non-linear springs 67 and 68 are attached to the other edge of the lenticular lens 31. The non-linear springs 65 to 68 press the lenticular lens 31 in the direction 11. A lever 62 which presses the lenticular lens 31 in the direction 11 is provided at the edge on that side where the non-linear springs 65 and 66 are attached, and a lever 64 which presses the lenticular lens 31 in the direction 11 is provided at the edge on that side where the non-linear springs 67 and 68 are attached. The lenticular lens 31 is restricted so as not to move in an undesirable direction or in the other directions than the direction 11 by a guide (not shown), and its moving range in the direction 11 may be restricted by a stopper (not shown).

As the pressing force to be applied to the non-linear springs is increased, the amount of displacement of the springs increases according to the pressing force, but when application of the pressing force which works against constant reaction force $F_1$ to the springs causes the amount of displacement of the springs to exceed a given value c, the reaction force of the springs changes from the value $F_1$ to a value $F_2$ smaller than $F_1$. As the pressing force to be applied to the springs is decreased gradually from the state where the amount of displacement of the springs is large, the amount of displacement of the springs decreases to the value c while showing weak reaction force $F_2$ and tends to return to the basic state while showing strong reaction force $F_1$ when the amount of displacement becomes equal to or smaller than c. In the embodiment, the amount of displacement of one of a pair of non-linear springs is set to a value a smaller than the value c and the amount of displacement of the other spring is set to a value b greater than the value c as shown in FIG. 37.

The operation of the switching display apparatus according to the embodiment will be described next. When the amount of displacement of the non-linear springs 65 and 66 is a and the amount of displacement of the non-linear springs 67 and 68 is b, as shown in FIG. 37, the reaction force of the non-linear springs 65 and 66 is larger than the reaction force of the non-linear springs 67 and 68 so that the lenticular lens 31 is pressed toward the non-linear springs 67 and 68. That is, the lenticular lens 31 is arranged at the first position indicated by the two-dot chain line in FIG. 37. When the lever 64 is pushed in this state, the lenticular lens 31 moves toward the non-linear springs 65 and 66. As a result, the amount of displacement of the non-linear springs 65 and 66 becomes b and the amount of displacement of the non-linear springs 67 and 68 becomes a, thus pressing the lenticular lens 31 toward the non-linear springs 65 and 66. That is, the lenticular lens 31 is arranged at the second position indicated by the solid line in FIG. 37. Even after the force applied to the lever 64 is released, the reaction force of the non-linear springs 67 and 68 is still greater than the reaction force of the non-linear springs 65 and 66, so that the lenticular lens 31 is kept stably at the second position. When the lever 62 is pushed in this state, the lenticular lens 31 moves to the first position again and is kept stably at the first position due to the difference between the reaction forces of the non-linear springs 65 to 68.

In the embodiment, the first position is treated as the position where, for example, 3D display is effected and the second position is treated as the position where, for example, 2D display is effected. According to the embodiment, as apparent from the above, the lenticular lens 31 can be held stably at either one of the 3D display position and the 2D display position with a simple structure. The other operation and effects of the embodiment than what have been discussed above are the same as those of the first embodiment.

Figure 38:
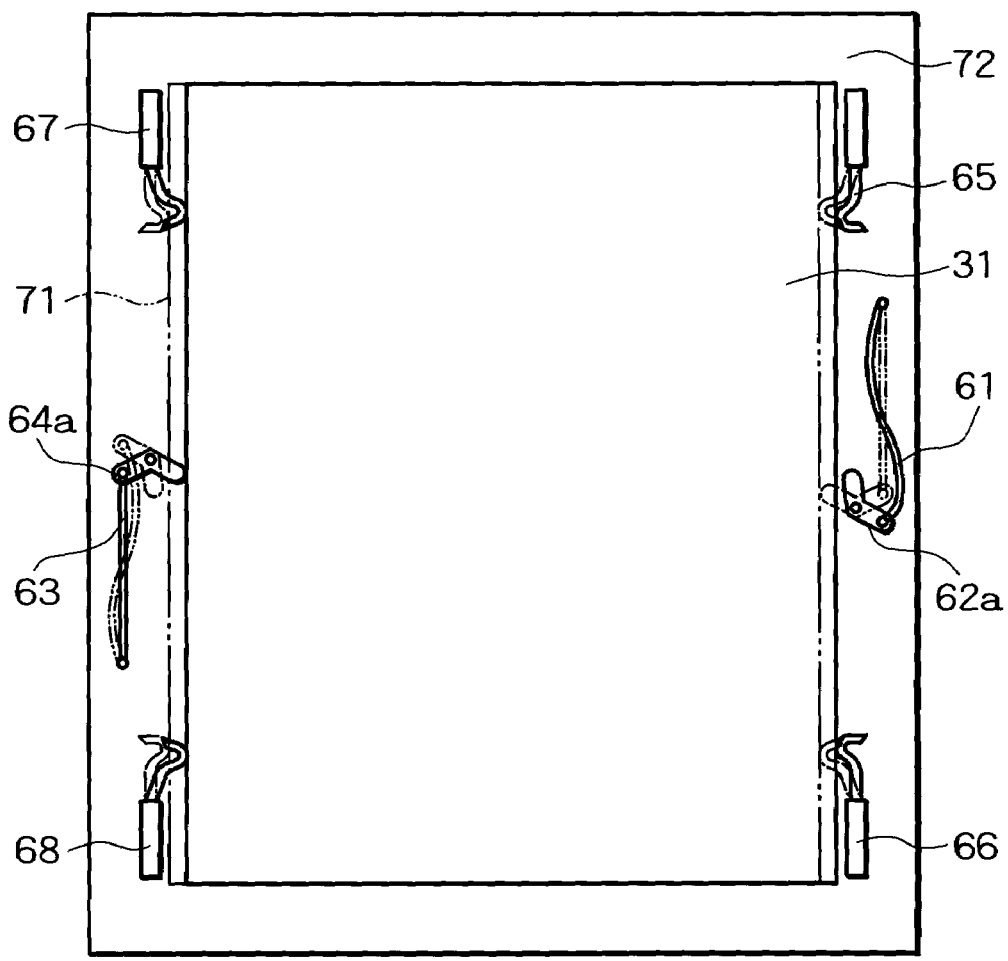
FIG. 38 is a top view showing a 3D image/2D image switching display apparatus according to a twelfth embodiment of the invention.

The twelfth embodiment of the invention will be described below. FIG. 38 is a top view showing a 3D image/2D image switching display apparatus according to the embodiment. As shown in FIG. 38, the switching display apparatus according to the embodiment is provided with cantilevers 62a and 64a with a "<" shape in place of the levers 62 and 64 used in the eleventh embodiment, and on end of each of the cantilevers 62a and 64a abuts on the lenticular lens 31. Each of the cantilevers 62*a* and 64*a* has a center portion supported rotatably on the fixed frame 72, and one ends of actuators 61 and 63 are coupled to the other ends of the cantilevers 62*a* and 64*a*. The actuators 61 and 63 are wires made of a shape memory alloy and are contracted in a conductive state but are deformable by external force in a non-conductive state. The actuators 61 and 63 are connected to a power supply (not shown) via respective switches (not shown) independently and the current flows as the switches are closed. The reference length of the actuator 61 is set to such a length at which in the non-conductive state, tensile force need not be applied to the cantilever 62*a* when the lenticular lens 31 moves to the position on that side of the actuator 61 or the second position indicated by the solid line in FIG. 38 and the actuator 61 is expanded, and in the conductive state, the actuator 61 is contracted to cause the lenticular lens 31 to be sufficiently pushed to the position on the other end side via the cantilever 62*a* or the first position indicated by the two-dot chain line in FIG. 38. The length of the actuator 63 is designed in the same way as the actuator 61.

The operation of the switching display apparatus according to the embodiment will be described next. First, it is assumed that as shown in FIG. 38, the lenticular lens 31 is at the first position indicated by the two-dot chain line in FIG. 38. At this time, the lenticular lens 31 is held stably at the first position due to the difference between the reaction forces of the non-linear springs 65 to 68. As the actuator 63 is energized, the actuator 63 is contracted to turn the cantilever 64*a* so that the cantilever 64*a* pushes the lenticular lens 31 toward the second position indicated by the solid line in FIG. 38. As a result, the lenticular lens moves to the second position from the first position. Although the movement of the lenticular lens 31 turns the cantilever 62*a* to expand the actuator 61, the actuator 61 which is in the non-conductive state is easily deformed and does not interfere with the movement of the lenticular lens 31. Even when energization of the actuator 63 is stopped thereafter, the lenticular lens 31 is kept stably at the second position due to the difference between the reaction forces of the non-linear springs 65 to 68. In case where the lenticular lens 31 is moved to the first position from the second position, likewise, the actuator 61 is energized. As a result, the actuator 61 is contracted, turning the cantilever 62*a* to push the lenticular lens 31 toward the first position. The other operation of the embodiment than has been discussed above is the same as that of the eleventh embodiment.

As apparent from the above, this embodiment can electrically control the movement of the lenticular lens 31. This can permit automatic switching between the display of a 3D image and the display of a 2D image. Because wires of a shape memory alloy are used as the actuators, the structures are simple and the switching display apparatus can be constructed smaller and lighter.

The springs may be connected in such a way that the actuators 61 and 63 are always expanded in the lengthwise direction. This causes the actuators to be contracted in the conductive state, thereby moving the lenticular lens 31, but allows the actuators to be expanded sufficient in the non-conductive state, so that the cantilevers can be prevented from pushing the lenticular lens 31. This can permit the no-drive side actuator not to become a load on the drive side actuator, thus ensuring faster driving of the lenticular lens 31.

In case where the outside size of the switching display apparatus need not be made small, an electric actuator, such as an electromagnetic solenoid or electromagnetic motor, may be used. Further, the eleventh embodiment and the twelfth embodiment can be combined with the second to tenth embodiments.

What is claimed is:

1. A three-dimensional (3D) image/two-dimensional (2D) image switching display apparatus comprising:
   display unit having a plural of pixel groups cyclically laid out each comprised of first to n-th pixels (n being an integer equal to or greater than 2);
   first optical unit which has first optical elements cyclically laid out in association with said individual pixel groups and refracts lights output from said pixels; and
   second optical unit which has second optical elements cyclically laid out in association with said individual pixel groups and refracts lights output from said first optical unit, wherein when images displayed by said first to n-th pixels differ from one another, said second optical unit is placed in relative to said first optical unit at a first position where said first and second optical unit output lights, output from said first to n-th pixels, in first to n-th directions different from one another, and when said first to n-th pixels display a same image independently, said second optical unit is placed in relative to said first optical unit at a second position which is set apart from said first position in a layout direction of said second optical elements by half a distance of a layout cycle of said second optical elements or by a distance equal to an integer multiple of said layout cycle of said second optical elements added to said half the distance and where said first and second optical unit output lights, output from said first to n-th pixels, in a same direction.

2. The 3D image/2D image switching display apparatus according to claim 1, wherein a layout cycle of said first optical elements is substantially equal to said layout cycle of said second optical elements.

3. The 3D image/2D image switching display apparatus according to claim 1, wherein said display unit has two kinds of pixels, right-eye pixels for a right eye and left-eye pixels for a left eye, and at a time of displaying a 3D image, said right-eye pixels display images for said right eye, said left-eye pixels display images for said left eye and said first and second optical unit output lights output from said right-eye pixels in a first direction and output lights output from said left-eye pixels in a second direction, and at a time of displaying a 2D image, said right-eye pixels and said left-eye pixels together display a same 2D image and said first and second optical unit output lights output from said right-eye pixels and said left-eye pixels in a same direction.

4. The 3D image/2D image switching display apparatus according to claim 3, wherein said first optical unit is a first lenticular lens portion which comprises one or plural convex type lenticular lenses and where said first optical elements are lens elements, said second optical unit is a second lenticular lens portion which comprises one or plural convex type lenticular lenses and where said second optical elements are lens elements, at a time of displaying a 3D image, an optical axis of that lens element which is located at a center of said second lenticular lens portion substantially coincides with an optical axis of one lens element of said first lenticular lens portion, and at a time of displaying a 2D image, said optical axis of said lens element located at said center of said second lenticular lens portion is shifted from an optical axis of that lens element which is located at a center of said first lenticular lens portion, by half a length of a layout cycle of said lens elements of said second lenticular lens portion or a length equal to an integer multiple of said layout cycle of said lens elements of said second lenticular lens portion added to said half the length.

5. The 3D image/2D image switching display apparatus according to claim 4, wherein at least one of said first and second lenticular lens portions comprises two or more lenticular lenses stacked one on another.

6. The 3D image/2D image switching display apparatus according to claim 4, wherein a lens side of said first lenticular lens portion is so arranged as to face a lens side of said second lenticular lens portion.

7. The 3D image/2D image switching display apparatus according to claim 4, wherein a lens side of said first lenticular lens portion and a lens side of said second lenticular lens portion are so arranged as to face in a same direction.

8. The 3D image/2D image switching display apparatus according to claim 4, wherein a curvature of said lens elements of said first lenticular lens portion is equal to a curvature of said lens elements of said second lenticular lens portion and in case where said first and second lenticular lens portions are considered as a single virtual lenticular lens, a curvature of lens elements of said virtual lenticular lens is twice said curvature of said lens elements of said first and second lenticular lens portions.

9. The 3D image/2D image switching display apparatus according to claim 4, wherein a curvature of said lens elements of said first lenticular lens portion is equal to a curvature of said lens elements of said second lenticular lens portion and in case where said first and second lenticular lens portions are considered as a single virtual lenticular lens, a clearance between said first and second lenticular lens portions is equal to or less than 20% of a focal distance of lens elements of said virtual lenticular lens.

10. The 3D image/2D image switching display apparatus according to claim 4, wherein at a time of displaying a 3D image, an amount of deviation between said optical axis of said lens element which is located at said center of said first lenticular lens portion and said optical axis of said lens element which is located at said center of said second lenticular lens portion is equal to or less than 12% of a layout cycle of said lens elements of said first lenticular lens portion.

11. The 3D image/2D image switching display apparatus according to claim 4, wherein said first and second lenticular lens portions are provided respectively movable in relative to said display unit, at a time of displaying a 3D image, said optical axes of said lens elements which are located at said centers of said first and second lenticular lens portions pass through a center of that pixel group, consisting of said right-eye pixels and said left-eye pixels which is located at a center of said display unit, and at a time of displaying a 2D image, said optical axis of said lens element which is located at said center of said first lenticular lens portion passes through a position shifted from said center of said pixel group by a length of ¼ times a layout cycle of said lens elements of said first lenticular lens portion or a length equal to an integer multiple of said layout cycle of said lens elements of said first lenticular lens portion added to said length of ¼ times said layout cycle and said optical axis of said lens element which is located at said center of said second lenticular lens portion passes through a position shifted, in an opposite direction to a direction of shifting done with respect to said display unit, from said center of said pixel group by a length of ¼ times said layout cycle or a length equal to an integer multiple of said layout cycle of said lens elements of said second lenticular lens portion added to said length of ¼ times said layout cycle.

12. The 3D image/2D image switching display apparatus according to claim 4, wherein at a time of displaying a 2D image, a width of a 2D visible range over which a light emitting section of a pixel is projected in magnification is set greater than a distance between both eyes of an observer.

13. The 3D image/2D image switching display apparatus according to claim 4, wherein at a time of displaying a 3D image, a width of a 3D visible range over which light output from a pixel is projected in magnification via that lens element which is closest to that pixel is set twice a distance between both eyes of an observer.

14. The 3D image/2D image switching display apparatus according to claim 1, wherein one of said first and second optical unit is a convex lenticular lens portion which comprises one or plural convex type lenticular lenses, the other one of said first and second optical unit is a concave lenticular lens portion which comprises one or plural concave type lenticular lenses, at a time said first to n-th pixels respectively display first to n-th images, an optical axis of that lens element which is located at a center of said convex lenticular lens portion is shifted from an optical axis of that lens element which is located at a center of said concave lenticular lens portion, by half a length of a layout cycle of said lens elements of said convex lenticular lens portion or a length equal to an integer multiple of said layout cycle of said lens elements of said convex lenticular lens portion added to said half the length, and at a time said first to n-th pixels respectively together display a same image, said optical axis of said lens element located at said center of said convex lenticular lens portion substantially coincides with an optical axis of one lens element of said concave lenticular lens portion.

15. The 3D image/2D image switching display apparatus according to claim 14, wherein at least one of said convex lenticular lens portion and said concave lenticular lens portion comprises two or more lenticular lenses stacked one on another.

16. The 3D image/2D image switching display apparatus according to claim 1, wherein said first optical unit is a first fly-eye lens portion which comprises one or plural fly-eye lenses, said second optical unit is a second fly-eye lens portion which comprises one or plural fly-eye lenses, and said second fly-eye lens portion is movable in all directions in which said pixels of said display unit are laid out in relative to said first fly-eye lens portion.

17. The 3D image/2D image switching display apparatus according to claim 16, wherein at least one of said first and second fly-eye lens portions comprises two or more fly-eye lenses stacked one on another.

18. The 3D image/2D image switching display apparatus according to claim 16, wherein said display unit has first to fourth pixels laid out in a matrix form of two rows by two columns and said first and second fly-eye lens portions comprise convex type fly-eye lenses.

19. The 3D image/2D image switching display apparatus according to claim 16, wherein at least one of said pixels is a right-eye pixel for a right eye and at least one of the other pixels is a left-eye pixel for a left eye, at a time of displaying a 3D image, said right-eye pixel displays an image for said right eye, said left-eye pixel displays an image for said left eye and an optical axis of that lens element which is located at a center of said second fly-eye lens portion substantially coincides with an optical axis of one lens element of said first fly-eye lens portion, and at a time of displaying a 2D image, said optical axis of said lens element located at said center of said second fly-eye lens portion is shifted from an optical axis of that lens element which is located at a center of said second fly-eye lens portion, in a direction going toward said image for said left eye from said image for said right eye or a direction opposite thereto, by half a length of a layout cycle of said lens elements of said second fly-eye lens portion or a length equal to an integer multiple of said layout cycle of said lens elements of said second fly-eye lens portion added to said half the length.

20. The 3D image/2D image switching display apparatus according to claim 1, wherein said first optical unit is a first prism plate on which prism elements are laid out, said second optical unit is a second prism plate on which prism elements are laid out, at a time of displaying a 3D image, a vertex of that prism element which is located at a center of said second prism plate, as seen from a direction perpendicular to a display surface of said display unit, substantially coincides with a trough portion between one prism element of said first prism plate and those prism elements which adjoin that one prism element, and at a time of displaying a 2D image, said vertex of said prism element which is located at said center of said second prism plate, as seen from said direction perpendicular to said display surface of said display unit, substantially coincides with a vertex of one prism element of said first prism plate.

21. The 3D image/2D image switching display apparatus according to claim 1, wherein said display unit has a color filter which colors lights output from said pixels and has a plurality of stripe portions colored to plural kinds of colors and cyclically laid out in parallel to one another and a lengthwise direction of said stripe portions is parallel to layout directions of said first and second optical elements.

22. The 3D image/2D image switching display apparatus according to claim 1, wherein said display unit displays an image by color field sequential display method.

23. The 3D image/2D image switching display apparatus according to claim 1, further comprising a casing which houses said display unit and said first and second optical unit and to which said second optical unit is fixed.

24. The 3D image/2D image switching display apparatus according to claim 23, wherein said second optical unit has a capability of a protection plate, a touch panel or a front-light for said display unit.

25. The 3D image/2D image switching display apparatus according to claim 1, wherein at least one part of said first optical unit is formed integral with a member which constitutes a display surface of said display unit.

26. The 3D image/2D image switching display apparatus according to claim 1, wherein at least one of said first and second optical unit is divided into a plurality of portions as seen from a direction perpendicular to a display surface of said display unit and said plurality of portions are movable independently of one another.

27. The 3D image/2D image switching display apparatus according to claim 1, wherein at least one of said first and second optical unit is provided with a frame.

28. The 3D image/2D image switching display apparatus according to claim 1, wherein an antireflection coating is formed on a surface of at least one of said first and second optical unit.

29. The 3D image/2D image switching display apparatus according to claim 1, further comprising an actuator, attached to at least one of said first and second optical unit, for moving said one of said first and second optical unit in relative to the other optical unit.

30. The 3D image/2D image switching display apparatus according to claim 29, wherein said actuator is a linear member made of a shape memory alloy and connected to a power supply.

31. The 3D image/2D image switching display apparatus according to claim 1, further comprising a casing for housing said display unit and said first and second optical unit, and one pair or plural pairs of non-linear springs which are located between said casing and at least one of said first and second optical unit in such a way as to be stretched and contracted in a layout direction of said first optical elements and whose reaction force is discontinuously reduced when an amount of displacement exceeds a threshold value, and which are provided in such a way that an amount of displacement of one of each pair of non-linear springs is greater than said threshold value while an amount of displacement of the other non-linear spring becomes smaller than said threshold value.

32. The 3D image/2D image switching display apparatus according to claim 31, wherein at least one pair of non-linear springs is coupled to an edge extending in a direction perpendicular to said layout direction in said one of said first and second optical unit.

33. The 3D image/2D image switching display apparatus according to claim 1, wherein said display unit is a liquid crystal display unit.

34. A portable terminal device having a 3D image/2D image switching display apparatus according to claim 1.

35. The portable terminal device according to claim 34, wherein said portable terminal device is a portable telephone, a portable terminal, PDA (Personal Digital Assistant), a game machine, a digital camera or a digital video.

* * * * *